(12) United States Patent
Tuffin et al.

(10) Patent No.: US 10,087,370 B2
(45) Date of Patent: *Oct. 2, 2018

(54) MESOGENIC MEDIA AND LIQUID CRYSTAL DISPLAY

(71) Applicant: MERCK PATENT GMBH, Darmstadt (DE)

(72) Inventors: Rachel Tuffin, Chandlers Ford (GB); Benjamin Snow, Chalfont St. Giles (GB); Owain Llyr Parri, Ringwood (GB); Simon Siemianowski, Southampton (GB); Rebecca Proctor, Southampton (GB); Kevin Adlem, Bournemouth (GB)

(73) Assignee: MERCK PATENT GMBH, Darmstadt (DE)

( * ) Notice: Subject to any disclaimer, the term of this patent is extended or adjusted under 35 U.S.C. 154(b) by 281 days.

This patent is subject to a terminal disclaimer.

(21) Appl. No.: 14/403,417

(22) PCT Filed: May 10, 2013

(86) PCT No.: PCT/EP2013/001390
§ 371 (c)(1),
(2) Date: Nov. 24, 2014

(87) PCT Pub. No.: WO2013/174481
PCT Pub. Date: Nov. 28, 2013

(65) Prior Publication Data
US 2015/0175886 A1  Jun. 25, 2015

(30) Foreign Application Priority Data
May 25, 2012  (EP) .................................. 12004080

(51) Int. Cl.
*G02F 1/1333* (2006.01)
*C09K 19/30* (2006.01)
(Continued)

(52) U.S. Cl.
CPC ...... *C09K 19/3068* (2013.01); *C09K 19/0258* (2013.01); *C09K 19/12* (2013.01);
(Continued)

(58) Field of Classification Search
CPC .... C09K 19/3068; C09K 19/42; C09K 19/44; C09K 19/586; C09K 19/588;
(Continued)

(56) References Cited

U.S. PATENT DOCUMENTS 7,544,400 B2 * 6/2009 Goulding ............... C09K 19/04
 252/299.63
9,127,200 B2 * 9/2015 Lee ......................... C09K 19/20
(Continued)

FOREIGN PATENT DOCUMENTS

GB  2356629 A  5/2001
GB  2387603 A  10/2003
(Continued)

OTHER PUBLICATIONS

International Search Report for PCT/EP2013/001390 dated Aug. 29, 2013.
(Continued)

*Primary Examiner* — Geraldina Visconti
(74) *Attorney, Agent, or Firm* — Millen White Zelano and Branigan, PC; Csaba Henter

(57) ABSTRACT

The invention relates to mesogenic media comprising a first component, component A, consisting of bimesogenic compounds selected from the group of compounds of formulae A-I to A-III

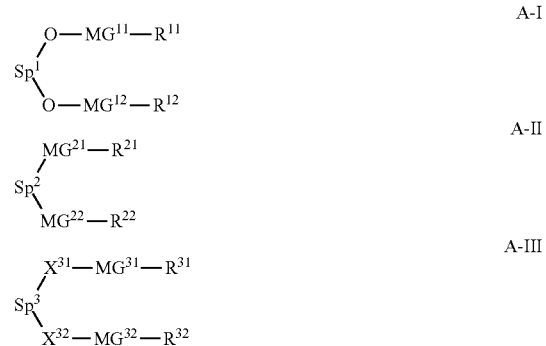

a second component, component B, consisting of nematogenic compounds, preferably selected from the group of compounds of formulae B-I to B-III

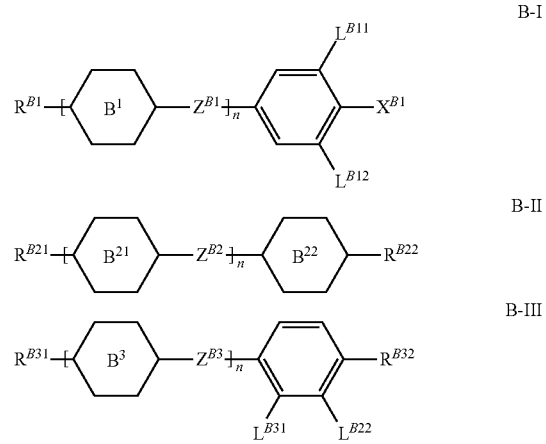

and
a third component, component C, consisting of one or more chiral molecules,
(Continued)

wherein the parameters have the meaning given in claim 1, to the use of mesogenic media in flexoelectric liquid crystal devices and to those devices comprising a liquid crystal medium according to the present invention.

20 Claims, 1 Drawing Sheet

(51) Int. Cl.
    *C09K 19/42*     (2006.01)
    *C09K 19/44*     (2006.01)
    *C09K 19/58*     (2006.01)
    *C09K 19/02*     (2006.01)
    *G02F 1/1343*     (2006.01)
    *C09K 19/04*     (2006.01)
    *C09K 19/12*     (2006.01)
    *C09K 19/18*     (2006.01)

(52) U.S. Cl.
    CPC .......... *C09K 19/3003* (2013.01); *C09K 19/42* (2013.01); *C09K 19/44* (2013.01); *C09K 19/586* (2013.01); *C09K 19/588* (2013.01); *G02F 1/134309* (2013.01); *C09K 2019/0444* (2013.01); *C09K 2019/122* (2013.01); *C09K 2019/123* (2013.01); *C09K 2019/181* (2013.01); *C09K 2019/183* (2013.01); *C09K 2019/301* (2013.01); *C09K 2019/3004* (2013.01); *C09K 2019/3009* (2013.01); *C09K 2019/3016* (2013.01); *C09K 2019/3021* (2013.01)

(58) Field of Classification Search
    CPC ................ C09K 19/0258; C09K 19/12; C09K 19/3003; C09K 2019/3016; C09K 2019/3021; C09K 2019/301; C09K 2019/3009; C09K 2019/3004; C09K 2019/183; C09K 2019/181; C09K 2019/123; C09K 2019/122; C09K 2019/0444; G02F 1/1333; G02F 1/134309
    USPC ......................................... 252/299.6; 428/1.1
    See application file for complete search history.

(56) References Cited

U.S. PATENT DOCUMENTS

| | | |
|---|---|---|
| 9,752,075 B2 * | 9/2017 | Tuffin ................ C09K 19/3068 |
| 2008/0142758 A1 | 6/2008 | Golding et al. |
| 2013/0056680 A1 | 3/2013 | Lee et al. |
| 2014/0232977 A1 | 8/2014 | Adlem et al. |
| 2015/0090935 A1 * | 4/2015 | Adlem ................ C09K 19/0258 252/299.6 |
| 2015/0329782 A1 | 11/2015 | Lee et al. |

FOREIGN PATENT DOCUMENTS

| | | |
|---|---|---|
| JP | 2003206485 A | 7/2003 |
| JP | 2008525331 A | 7/2008 |
| WO | 2011137986 A1 | 11/2011 |

OTHER PUBLICATIONS

Office Action for related Japanese Patent Application No. 2015-513038 dated Mar. 22, 2017.
English Abstract of JP2003206485, Publication Date: Jul. 22, 2003.

* cited by examiner

Fig 1: Schematic illustration of the "2Θ mode"
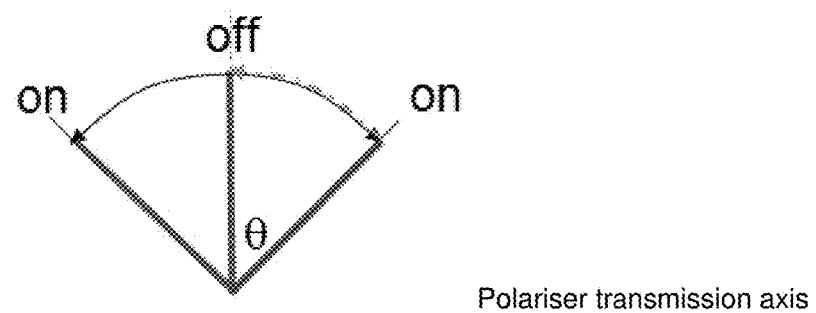
Polariser transmission axis
Fig 2: Schematic illustration of the "Θ mode"
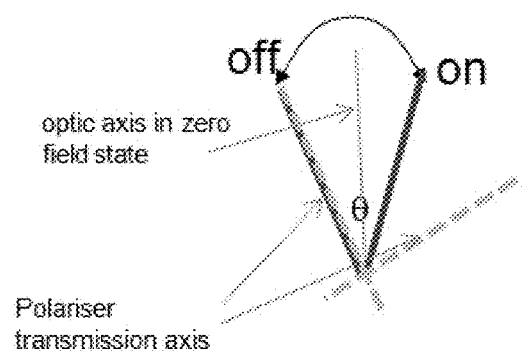

MESOGENIC MEDIA AND LIQUID CRYSTAL DISPLAY

The invention relates to mesogenic media comprising a first component, component A, consisting of bimesogenic compounds selected from the group of compounds of formulae A-I to A-III

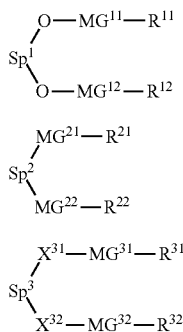

wherein the parameters have the meaning given herein below,
a second component, component B, consisting of nematogenic compounds, and
a third component, component C, consisting of one or more chiral molecules,
to the use of these mesogenic media in liquid crystal devices and in particular in flexoelectric liquid crystal devices, as well as to liquid crystal devices comprising a liquid crystal medium according to the present invention.

Bimesogenic compounds are also known as called "dimeric liquid crystals".

This invention particularly concerns a general method for improving the switching speed of liquid crystalline mixtures developed for modes that utilize the flexoelectric effect.

Liquid Crystal Displays (LCDs) are widely used to display information. LCDs are used for direct view displays, as well as for projection type displays. The electro-optical mode which is employed for most displays still is the twisted nematic (TN)-mode with its various modifications. Besides this mode, the super twisted nematic (STN)-mode and more recently the optically compensated bend (OCB)-mode and the electrically controlled birefringence (ECB)-mode with their various modifications, as e. g. the vertically aligned nematic (VAN), the patterned ITO vertically aligned nematic (PVA)-, the polymer stabilized vertically aligned nematic (PSVA)-mode and the multi domain vertically aligned nematic (MVA)-mode, as well as others, have been increasingly used. All these modes use an electrical field, which is substantially perpendicular to the substrates, respectively to the liquid crystal layer. Besides these modes there are also electro-optical modes employing an electrical field substantially parallel to the substrates, respectively the liquid crystal layer, like e.g. the In Plane Switching (short IPS) mode (as disclosed e.g. in DE 40 00 451 and EP 0 588 568) and the Fringe Field Switching (FFS) mode. Especially the latter mentioned electro-optical modes, which have good viewing angle properties and improved response times, are increasingly used for LCDs for modern desktop monitors and even for displays for TV and for multimedia applications and thus are competing with the TN-LCDs.

Further to these displays, new display modes using cholesteric liquid crystals having a relatively short cholesteric pitch have been proposed for use in displays exploiting the so called "flexo-electric" effect. The term "liquid crystal", "mesomorphic compound", or "mesogenic compound" (also shortly referred to as "mesogen") means a compound that under suitable conditions of temperature, pressure and concentration can exist as a mesophase (nematic, smectic, etc.) or in particular as a LC phase. Non-amphiphilic mesogenic compounds comprise for example one or more calamitic, banana-shaped or discotic mesogenic groups.

Flexoelectric liquid crystal materials are known in prior art. The flexoelectric effect is described inter alia by Chandrasekhar, "Liquid Crystals", 2nd edition, Cambridge University Press (1992) and P. G. deGennes et al., "The Physics of Liquid Crystals", 2nd edition, Oxford Science Publications (1995).

In these displays the cholesteric liquid crystals are oriented in the "uniformly lying helix" arrangement (ULH), which also give this display mode its name. For this purpose, a chiral substance which is mixed with a nematic material induces a helical twist transforming the material into a chiral nematic material, which is equivalent to a cholesteric material. The term "chiral" in general is used to describe an object that is non-superimposable on its mirror image. "Achiral" (non-chiral) objects are objects that are identical to their mirror image. The terms chiral nematic and cholesteric are used synonymously in this application, unless explicitly stated otherwise. The pitch induced by the chiral substance ($P_0$) is in a first approximation inversely proportional to the concentration (c) of the chiral material used. The constant of proportionality of this relation is called the helical twisting power (HTP) of the chiral substance and defined by equation (1)

$$\text{HTP} \equiv 1/(c \cdot P_0) \quad (1)$$

wherein
c is concentration of the chiral compound.

The uniform lying helix texture is realized using a chiral nematic liquid crystal with a short pitch, typically in the range from 0.2 µm to 1 µm, preferably of 1.0 µm or less, in particular of 0.5 µm or less, which is unidirectional aligned with its helical axis parallel to the substrates, e. g. glass plates, of a liquid crystal cell. In this configuration the helical axis of the chiral nematic liquid crystal is equivalent to the optical axis of a birefringent plate.

If an electrical field is applied to this configuration normal to the helical axis the optical axis is rotated in the plane of the cell, similar as the director of a ferroelectric liquid crystal rotate as in a surface stabilized ferroelectric liquid crystal display. The flexoelectric effect is characterized by fast response times typically ranging from 6 µs to 100 µs. It further features excellent grey scale capability.

The field induces a splay bend structure in the director which is accommodated by a tilt in the optical axis. The angle of the rotation of the axis is in first approximation directly and linearly proportional to the strength of the electrical field. The optical effect is best seen when the liquid crystal cell is placed between crossed polarizers with the optical axis in the unpowered state at an angle of 22.5° to the absorption axis of one of the polarizers. This angle of 22.5° is also the ideal angle of rotation of the electric field, as thus, by the inversion the electrical field, the optical axis is rotated by 45° and by appropriate selection of the relative orientations of the preferred direction of the axis of the helix, the absorption axis of the polarizer and the direction of the electric field, the optical axis can be switched from parallel to one polarizer to the center angle between both polarizers. The optimum contrast is then achieved when the total angle of the switching of the optical axis is 45°. In that case the arrangement can be used as a switchable quarter wave plate, provided the optical retardation, i. e. the product of the effective birefringence of the liquid crystal and the cell gap, is selected to be the quarter of the wave length. In this context the wavelength referred to is 550 nm, the wavelength for which the sensitivity of the human eye is highest, unless explicitly stated otherwise.

The angle of rotation of the optical axis ($\Phi$) is given in good approximation by formula (2)

$$\tan \Phi = \bar{e} P_0 E / (2\pi K) \tag{2}$$

wherein
$P_0$ is the undisturbed pitch of the cholesteric liquid crystal,
$\bar{e}$ is the average [$\bar{e} = \frac{1}{2}(e_{splay} + e_{bend})$] of the splay flexoelectric coefficient ($e_{splay}$) and the bend flexoelectric coefficient ($e_{bend}$),
E is the electrical field strength and
K is the average [$K = \frac{1}{2}(k_{11} + k_{33})$] of the splay elastic constant ($k_{11}$) and the bend elastic constant ($K_{33}$)
and wherein
$\bar{e}/K$ is called the flexo-elastic ratio.

This angle of rotation is half the switching angle in a flexoelectric switching element.

The response time ($\tau$) of this electro-optical effect is given in good approximation by formula (3)

$$\tau = [P_0/(2\pi)]^2 \gamma/K \tag{3}$$

wherein
$\gamma$ is the effective viscosity coefficient associated with the distortion of the helix.

There is a critical field ($E_c$) to unwind the helix, which can be obtained from equation (4)

$$E_c = (\pi^2/P_0) \cdot [k_{22}/(\epsilon_0 \cdot \Delta\epsilon)]^{1/2} \tag{4}$$

wherein
$k_{22}$ is the twist elastic constant,
$\epsilon_0$ is the permittivity of vacuum and
$\Delta\epsilon$ is the dielectric anisotropy of the liquid crystal.

In this mode, however several problems still have to be resolved, which are, amongst others, difficulties in obtaining the required uniform orientation, an unfavorably high voltage required for addressing, which is incompatible with common driving electronics, a not really dark "off state", which deteriorates the contrast, and, last not least, a pronounced hysteresis in the electro-optical characteristics.

A relatively new display mode, the so-called "uniformly standing helix" (USH) mode, may be considered as an alternative mode to succeed the IPS, as it can show improved black levels, even compared to other display mode providing wide viewing angles (e.g. IPS, VA etc.).

For the USH mode, like for the ULH mode, flexoelectric switching has been proposed, using bimesogenic liquid crystal materials. Bimesogenic compounds are known in general from prior art (cf. also Hori, K., Iimuro, M., Nakao, A., Toriumi, H., J. Mol. Struc. 2004, 699, 23-29). The term "bimesogenic compound" relates to compounds comprising two mesogenic groups in the molecule. Just like normal mesogens they can form many mesophases, depending on their structure. In particular compounds of formula A-II induce a second nematic phase, when added to a nematic liquid crystal medium.

The term "mesogenic group" means in this context, a group with the ability to induce liquid crystal (LC) phase behaviour. The compounds comprising mesogenic groups do not necessarily have to exhibit an LC phase themselves. It is also possible that they show LC phase behaviour only in mixtures with other compounds. For the sake of simplicity, the term "liquid crystal" is used hereinafter for both mesogenic and LC materials.

However, due to the unfavorably high driving voltage required, to the relatively narrow phase range of the chiral nematic materials and to their irreversible switching properties, materials from prior art are not compatible for the use with current LCD driving schemes.

For displays of the USH and ULH mode, new liquid crystalline media with improved properties are required. Especially the birefringence ($\Delta n$) should be optimized for the optical mode. The birefringence $\Delta n$ herein is defined in equation (5)

$$\Delta n = n_e - n_o \tag{5}$$

wherein $n_e$ is the extraordinary refractive index and $n_o$ is the ordinary refractive index, and the average refractive index $n_{av.}$ is given by the following equation (6).

$$n_{av.} = [(2n_o^2 + n_e^2)/3]^{1/2} \tag{6}$$

The extraordinary refractive index $n_e$ and the ordinary refractive index $n_o$ can be measured using an Abbe refractometer. $\Delta n$ can then be calculated from equation (5).

Furthermore, for displays utilizing the USH or ULH mode the optical retardation d*$\Delta n$ (effective) of the liquid crystal media should preferably be such that the equation (7)

$$\sin 2(\pi \cdot d \cdot \Delta n/\lambda) = 1 \tag{7}$$

wherein
d is the cell gap and
$\lambda$ is the wave length of light
is satisfied. The allowance of deviation for the right hand side of equation (7) is +/−3%.

The wave length of light generally referred to in this application is 550 nm, unless explicitly specified otherwise.

The cell gap of the cells preferably is in the range from 1 μm to 20 μm, in particular within the range from 2.0 μm to 10 μm.

For the ULH/USH mode, the dielectric anisotropy ($\Delta\epsilon$) should be as small as possible, to prevent unwinding of the helix upon application of the addressing voltage. Preferably $\Delta\epsilon$ should be slightly higher than 0 and very preferably be 0.1 or more, but preferably 10 or less, more preferably 7 or less and most preferably 5 or less. In the present application the term "dielectrically positive" is used for compounds or components with $\Delta\epsilon > 3.0$, "dielectrically neutral" with $-1.5 \leq \Delta\epsilon \leq 3.0$ and "dielectrically negative" with $\Delta\epsilon < -1.5$. $\Delta\epsilon$ is determined at a frequency of 1 kHz and at 20° C. The dielectric anisotropy of the respective compound is determined from the results of a solution of 10% of the respective individual compound in a nematic host mixture. In case the solubility of the respective compound in the host medium is less than 10% its concentration is reduced by a factor of 2 until the resultant medium is stable enough at least to allow the determination of its properties. Preferably the concentration is kept at least at 5%, however, in order to keep the significance of the results a high as possible. The capacitance of the test mixtures are determined both in a cell with homeotropic and with homogeneous alignment. The cell gap of both types of cells is approximately 20 μm. The voltage applied is a rectangular wave with a frequency of 1 kHz and a root mean square value typically of 0.5 V to 1.0 V, however, it is always selected to be below the capacitive threshold of the respective test mixture.

$\Delta\epsilon$ is defined as ($\epsilon_\parallel - \epsilon_\perp$), whereas $\epsilon_{av.}$ is ($\epsilon_\parallel + 2\epsilon_\perp$)/3. The dielectric permittivity of the compounds is determined from the change of the respective values of a host medium upon addition of the compounds of interest. The values are extrapolated to a concentration of the compounds of interest of 100%. The host mixture is disclosed in H. J. Coles et al., J. Appl. Phys. 2006, 99, 034104 and has the composition given in the table 1.

TABLE 1

Host mixture composition

| Compound | Concentration |
| --- | --- |
| F-PGI-ZI-9-ZGP-F | 25% |
| F-PGI-ZI-11-ZGP-F | 25% |
| FPGI-O-5-O-PP-N | 9.5% |
| FPGI-O-7-O-PP-N | 39% |
| CD-1 | 1.5% |

Besides the above mentioned parameters, the media have to exhibit a suitably wide range of the nematic phase, a rather small rotational viscosity and an at least moderately high specific resistivity.

Similar liquid crystal compositions with short cholesteric pitch for flexoelectric devices are known from EP 0 971 016, GB 2 356 629 and Coles, H. J., Musgrave, B., Coles, M. J., and Willmott, J., J. Mater. Chem., 11, p. 2709-2716 (2001). EP 0 971 016 reports on mesogenic estradiols, which, as such, have a high flexoelectric coefficient. GB 2 356 629 suggests the use of bimesogenic compounds in flexoelectric devices. The flexoelectric effect herein has been investigated in pure cholesteric liquid crystal compounds and in mixtures of homologous compounds only so far. Most of these compounds were used in binary mixtures consisting of a chiral additive and a nematic liquid crystal material being either a simple, conventional monomesogenic material or a bimesogenic one. These materials do have several drawbacks for practical applications, like insufficiently wide temperature ranges of the chiral nematic—or cholesteric phase, too small flexoelectric ratios, small angles of rotation.

One aim of the invention was to provide improved flexoelectric devices that exhibit high switching angles and fast response times. Another aim was to provide liquid crystal materials with advantageous properties, in particular for use in flexoelectric displays that enable good uniform alignment over the entire area of the display cell without the use of a mechanical shearing process, good contrast, high switching angles and fast response times also at low temperatures. The liquid crystal materials should exhibit low melting points, broad chiral nematic phase ranges, short temperature independent pitch lengths and high flexoelectric coefficients.

It is well known that flexoelectric-optic effects can be used as modes for liquid crystal displays. The most common examples of such effects are the ULH and USH effects. The ULH mode was originally described by Meyer and Patel in 1987 (J. S. Patel, R. B. Meyer, Phys. Rev. Lett., 1987, 58, 1538), and further work in this field is described in Rudquist et al in 1997 (P. Rudquist and S. T. Largerwall, Liquid Crystal 1997, 23, 503). Materials that can be used for this mode is e.g. disclosed in GB 23 56 629. A paper outlining the properties of flexo mixtures composed primarily of bimesogens was published by Coles et al (H. J. Coles, a M. J. Clarke, S. M. Morris, b B. J. Broughton, and A. E. Blatch, J. of Applied Physics 2006, 99, 034104) in which the switching speed of ULH mixtures is discussed in some detail.

It is known that the use of bimesogens having alkylene spacer groups and similar bimesogens exhibit a lower temperature phase below a nematic phase. This phase has been assigned to a twist bend nematic phase, see e.g. Luckhurst et al., 2011 Physical Review E 2011, 84, 031704. When looking to exploit the flexoelectric properties of mixtures of bimesogens the twist bend nematic phase can restrict the lower working temperature of the mixtures. The addition of small amounts of low molar mass liquid crystal, in addition to increasing the switching speed, can be used to reduce the temperature to the twist bend phase while at the same time allowing the use of this phase, respectively of its the pre-transitional effects, to increase the desirable properties of these mixtures as described in not yet laid open patent application EP 11 00 54 89.7.

It has also been found that aligning liquid crystals in the ULH mode is difficult, and an alternative flexoelectric-optic mode, the USH mode was proposed by Coles et al in WO2006/003441, and in SID2009 (F. Castles, S. M. Morris, and H. J. Coles, SID 09 DIGEST, 2009, 582) as well as in Coles et al 2011 (D. J. Gardiner, S. M. Morris, F. Castles, M. M. Qasim, W. S. Kim, S S. Choi, H. J. Park, I. J. Chung, H. J. Coles, Applied Physics Letter, 2011, 98, 263508). The material requirements for both ULH and USH are similar. Recently, the Coles group published a paper on the structure-property relationship for dimeric liquid crystals. Coles et al., 2012 (Physical Review E 2012, 85, 012701).

One drawback of flexoelectric liquid crystal devices is their insufficient response time. Several papers and patents describe mixtures, which have a switching time of less than 1 ms, however in most cases the switching times are quoted at temperature well above ambient temperature, or the voltage required to achieve this switching speed is relatively high. The materials used in these mixtures tend to be bimesogens. One of the drawbacks of the use of these compounds is that in some cases the switching speeds are slow especially at temperature close to ambient. The reason for this is believed to be related to the high viscosity of the mixtures at ambient temperature. As will be discussed later, theory indicates that viscosity is an important variable in the equations that describe the switching speed of chiral flexo modes such as the Uniform Lying Helix and the Uniform Standing Helix modes. It's not clear from the literature which viscosity this is, but it is believed to be the rotational viscosity ($\gamma_1$).

One aim of this invention is to provide mixtures for displays designed for modes that exploit the flexoelectric effect consisting predominantly of bimesogens and showing improved switching speed, achieved or achievable by use liquid crystals exhibiting of low rotational viscosity in combination with more conventional bimesogens.

Another aim of the present invention is to provide mixtures for such displays showing significantly improved properties by the use of specially selected bimesogens.

In liquid crystal displays exploiting the flexoelectric modes the tilt angle ($\Theta$) describes the rotation of the optic axis in the x-y plane of the cell. There are two basic methods of using this effect to generate a white and dark state. The biggest difference between these two methods resides in the tilt angle that is required and in the orientation of the transmission axis of the polariser relative the optic axis for the ULH in the zero field state. The two different methods are briefly described below with reference to FIGS. 1 and 2.

The main difference between the "$\Theta$ mode" (illustrated in FIG. 2) and the "2$\Theta$ mode" (shown in FIG. 1) is that the optical axis of the liquid crystal in the state at zero field is either parallel to one of the polariser axis (in the case of the 2$\Theta$ mode) or at an angle of 22.5° to axis one of the polarisers (in the case of the $\Theta$ mode). The advantage of the 2$\Theta$ mode over the Θ mode is that the liquid crystal display appears black when there is no field applied to the cell. The advantage of the Θ mode, however, is that e/K may be lower because only half of the switching angle is required for this mode compared to the 2Θ mode.

Comparing the switching speed of ULH mixtures it is important to also know the switching angle associated with the respective effect.

The other mixture variables should also be considered. Higher temperature usually leads to faster switching times, usually because the viscosity of the mixture decreases. The field used is also important. Faster switching speed can usually be achieved with higher fields in ULH flexoelectric mode.

Yet another factor which has to be considered are the details of the switching mode. Contrary to most commercial LC mode, the ULH $T_{off}$ time can be driven, therefore there are at least two possible switching regimes:

Switching time=$T_{on}+T_{off(driven)}$

Switching time=$T_{on}+T_{off(non-driven)}$

If both switching on and switching off are driven the response times are much shorter, typically in the range of 2 ms compared to 5 ms.

The present invention allows to reduce the switching times in both of these regimes by adding additives having a low rotational viscosity.

As already mentioned above the present invention discloses a method of improving the switching speed of chiral flexo mixtures. It has been reported in the literature that the relaxation switching time of such mixtures can be described by the following equation $$\tau = \frac{\gamma}{K} \frac{p^2}{|4\pi^2|},$$

Where γ is the "effective viscosity associated with the distortion of the helix" (Coles et al 2006). Furthermore in a paper from Coles et al. (B Musgrave, P. Lehmann, H. J. Coles, *Liquid Crystals*, (1999), 28 (8), 1235) the viscosity term is referred to as $\gamma_1$.

E.g. in J. Appl. Phys. 99, 034104 (2006) it is shown that the switching speed of a mixture of bimesogens mixture increases significantly with decreasing temperature. Though this can be counteracted to a certain degree by increasing the field applied the switching speed is still longer at lower temperature compared to higher temperatures.

This invention shows that the addition of viscosity modifiers can improve the switching speed of mixtures containing dimers. Surprisingly even a small amount of a viscosity modifier can have a very large effect on the speed of switching. In addition the use of these compounds also lowers the temperature of the nematic to second nematic (twist bend) phase or other phases and reduces melting points and may also be used to increase the clearing point of the mixture.

Liquid crystalline media comprising both bimesogens and nematogens are disclosed in GB 2 387 603. However these media have relatively low values of the flexoelectric ratio e/K.

Other aims of the present invention are immediately evident to the person skilled in the art from the following detailed description.

The inventors have found out that the above aims can be surprisingly achieved by providing bimesogenic compounds according to the present invention. These compounds, when used in chiral nematic liquid crystal mixtures, lead to low melting points, broad chiral nematic phases. In particular, they exhibit relatively high values of the elastic constant $k_{11}$, low values of the bend elastic constant $k_{33}$ and high values of the flexoelectric coefficient.

The present invention relates to mesogenic materials comprising
a first component, component A, consisting of bimesogenic compounds selected from the group of compounds of formulae A-I to A-III

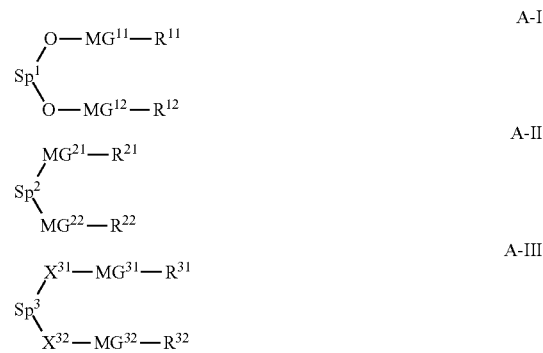

wherein
$R^{11}$ and $R^{12}$, $R^{21}$ and $R^{22}$ and $R^{31}$ and $R^{32}$ are each independently H, F, Cl, CN, NCS or a straight-chain or branched alkyl group with 1 to 25 C atoms which may be unsubstituted, mono- or polysubstituted by halogen or CN, it being also possible for one or more non-adjacent $CH_2$ groups to be replaced, in each occurrence independently from one another, by —O—, —S—, —NH—, —N($CH_3$)—, —CO—, —COO—, —OCO—, —O—CO—O—, —S—CO—, —CO—S—, —CH═CH—, —CH═CF—, —CF═CF— or —C≡C— in such a manner that oxygen atoms are not linked directly to one another,
$MG^{11}$ and $MG^{12}$, $MG^{21}$ and $MG^{22}$ and $MG^{31}$ and $MG^{32}$ are each independently a mesogenic group,
$Sp^1$, $Sp^2$ and $Sp^3$ are each independently a spacer group comprising 5 to 40 C atoms, wherein one or more non-adjacent $CH_2$ groups, with the exception of the $CH_2$ groups of $Sp^1$ linked to O-$MG^{11}$ and/or O-$MG^{12}$, of $Sp^2$ linked to $MG^{21}$ and/or $MG^{22}$ and of $Sp^3$ linked to $X^{31}$ and $X^{32}$, may also be replaced by —O—, —S—, —NH—, —N($CH_3$)—, —CO—, —O—CO—, —S—CO—, —O—COO—, —CO—S—, —CO—O—, —CH(halogen)—, —CH(CN)—, —CH═CH— or —C≡C—, however in such a way that (in the molecules?) no two O-atoms are adjacent to one another, no two —CH═CH— groups are adjacent to each other, and no two groups selected from —O—CO—, —S—CO—, —O—COO—, —CO—S—, —CO—O— and —CH═CH— are adjacent to each other and
$X^{31}$ and $X^{32}$ are independently from one another a linking group selected from —CO—O—, —O—CO—, —CH═CH—, —C≡C— or —S—, and, alternatively, one of them may also be either —O— or a single bond, and, again alternatively, one of them may be —O— and the other one a single bond,
a second component, component B, consisting of nematogenic compounds, preferably selected from the group of compounds of formulae B-I to B-III

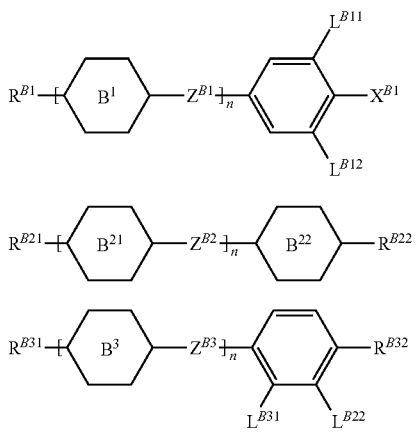

B-I

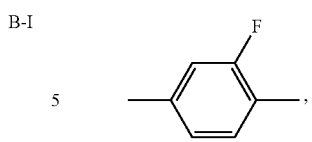

B-II

wherein $R^{B1}$, $R^{B21}$ and $R^{B22}$ and $R^{B31}$ and $R^{B32}$ are each independently H, F, Cl, CN, NCS or a straight-chain or branched alkyl group with 1 to 25 C atoms which may be unsubstituted, mono- or polysubstituted by halogen or CN, it being also possible for one or more non-adjacent $CH_2$ groups to be replaced, in each occurrence independently from one another, by —O—, —S—, —NH—, —N($CH_3$)—, —CO—, —COO—, —OCO—, —O—CO—O—, —S—CO—, —CO—S—, —CH=CH—, —CH=CF—, —CF=CF— or —C≡C— in such a manner that oxygen atoms are not linked directly to one another, $X^{B1}$ is F, Cl, CN, NCS, preferably CN, $Z^{B1}$, $Z^{B2}$ and $Z^{B3}$ are in each occurrence independently —$CH_2$—$CH_2$—, —CO—O—, —O—CO—, —$CF_2$—O—, —O—$CF_2$—, —CH=CH— or a single bond, preferably —$CH_2$—$CH_2$—, —CO—O—, —CH=CH— or a single bond, more preferably —$CH_2$—$CH_2$— or a single bond, even more preferably one of the groups present in one compound is —$CH_2$—$CH_2$— and the others are a single bond, most preferably all are a single bond,

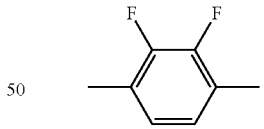

and

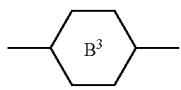

are in each occurrence independently

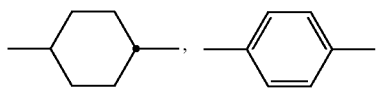

or

B-I

preferably

or

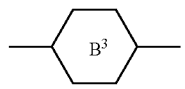

most preferably

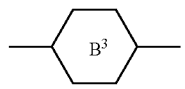, alternatively one or more of

are

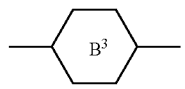

and n is 1, 2 or 3, preferably 1 or 2, and a third component, component C, consisting of one or more chiral molecules.

The chiral compounds of component C are preferably selected from the group of compounds of formulae C-I to C-III Especially preferred for component C are chiral compounds, also called chiral dopants selected from formulae C-I to and C-III,

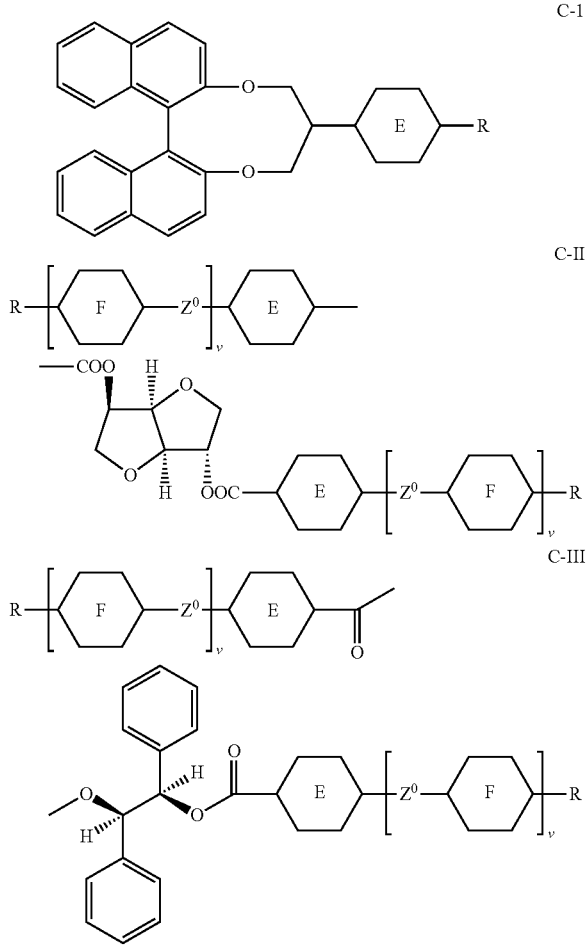

the latter ones including the respective (S,S) enantiomers, wherein E and F are each independently 1,4-phenylene or trans-1,4-cyclohexylene, v is 0 or 1, $Z^0$ is —COO—, —OCO—, —$CH_2CH_2$— or a single bond, and R is alkyl, alkoxy or alkanoyl with 1 to 12 C atoms.

Preferably used are compounds of formulae A-I to A-III wherein $Sp^1$, $Sp^2$ and $Sp^3$ are each independently —$(CH_2)_n$— with n an integer from 1 to 15, most preferably an uneven integer, wherein one or more —$CH_2$— groups may be replaced by —CO—.

Especially preferably used are compounds of formula A-III wherein

—$X^{31}$-$Sp^3$-$X^{32}$— is -$Sp^3$-O—, -$Sp^3$-CO—O—, -$Sp^3$-O—CO—, —O-$Sp^3$-, —O-$Sp^3$-CO—O—, —O-$Sp^3$-O—CO—, —O—CO-$Sp^3$-O—, —O—CO-$Sp^3$-O—CO—, —CO—O-$Sp^3$-O— or —CO—O-$Sp^3$-CO—O—, however under the condition that in —$X^{31}$-$Sp^3$-$X^{32}$— no two O-atoms are adjacent to one another, no two —CH=CH— groups are adjacent to each other and no two groups selected from —O—CO—, —S—CO—, —O—OCO—, —CO—S—, —CO—O— and —CH=CH— are adjacent to each other.

Preferably used are compounds of formula A-I in which $MG^{11}$ and $MG^{12}$ are independently from one another -$A^{11}$-$(Z^1$-$A^{12})_m$- wherein $Z^1$ is —COO—, —OCO—, —O—CO—O—, —$OCH_2$—, —$CH_2O$—, —$CH_2CH_2$—, —$(CH_2)_4$—, —$CF_2CF_2$—, —CH=CH—, —CF=CF—, —CH=CH—COO—, —OCO—CH=CH—, —C≡C— or a single bond, $A^{11}$ and $A^{12}$ are each independently in each occurrence 1,4-phenylene, wherein in addition one or more CH groups may be replaced by N,trans-1,4-cyclo-hexylene in which, in addition, one or two non-adjacent $CH_2$ groups may be replaced by O and/or S, 1,4-cyclohexenylene, 1,4-bicyclo-(2,2,2)-octylene, piperidine-1,4-diyl, naphthalene-2,6-diyl, decahydro-naphthalene-2,6-diyl, 1,2,3,4-tetrahydro-naphthalene-2,6-diyl, cyclobutane-1,3-diyl, spiro[3.3]heptane-2,6-diyl or dispiro[3.1.3.1]decane-2,8-diyl, it being possible for all these groups to be unsubstituted, mono-, di-, tri- or tetrasubstituted with F, Cl, CN or alkyl, alkoxy, alkylcarbonyl or alkoxycarbonyl groups with 1 to 7 C atoms, wherein one or more H atoms may be substituted by F or Cl, and m is 0, 1, 2 or 3.

Preferably used are compounds of formula A-II in which $MG^{21}$ and $MG^{22}$ are independently from one another -$A^{21}$-$(Z^2$-$A^{22})_m$- wherein $Z^2$ is —COO—, —OCO—, —O—CO—O—, —$OCH_2$—, —$CH_2O$—, —$CH_2CH_2$—, —$(CH_2)_4$—, —$CF_2CF_2$—, —CH=CH—, —CF=CF—, —CH=CH—COO—, —OCO—CH=CH—, —C≡C— or a single bond, $A^{21}$ and $A^{22}$ are each independently in each occurrence 1,4-phenylene, wherein in addition one or more CH groups may be replaced by N,trans-1,4-cyclo-hexylene in which, in addition, one or two non-adjacent $CH_2$ groups may be replaced by O and/or S, 1,4-cyclohexenylene, 1,4-bicyclo-(2,2,2)-octylene, piperidine-1,4-diyl, naphthalene-2,6-diyl, decahydro-naphthalene-2,6-diyl, 1,2,3,4-tetrahydro-naphthalene-2,6-diyl, cyclobutane-1,3-diyl, spiro[3.3]heptane-2,6-diyl or dispiro[3.1.3.1]decane-2,8-diyl, it being possible for all these groups to be unsubstituted, mono-, di-, tri- or tetrasubstituted with F, Cl, CN or alkyl, alkoxy, alkylcarbonyl or alkoxycarbonyl groups with 1 to 7 C atoms, wherein one or more H atoms may be substituted by F or Cl, and m is 0, 1, 2 or 3.

Most preferably used are compounds of formula A-III in which $MG^{31}$ and $MG^{32}$ are independently from one another -$A^{31}$-$(Z^3$-$A^{32})_m$- wherein $Z^3$ is —COO—, —OCO—, —O—CO—O—, —$OCH_2$—, —$CH_2O$—, —$CH_2CH_2$—, —$(CH_2)_4$—, —$CF_2CF_2$—, —CH=CH—, —CF=CF—, —CH=CH—COO—, —OCO—CH=CH—, —C≡C— or a single bond, $A^{31}$ and $A^{32}$ are each independently in each occurrence 1,4-phenylene, wherein in addition one or more CH groups may be replaced by N,trans-1,4-cyclo-hexylene in which, in addition, one or two non-adjacent $CH_2$ groups may be replaced by O and/or S, 1,4-cyclohexenylene, 1,4-bicyclo-(2,2,2)-octylene, piperidine-1,4-diyl, naphthalene-2,6-diyl, decahydro-naphthalene-2,6-diyl, 1,2,3,4-tetrahydro-naphthalene-2,6-diyl, cyclobutane-1,3-diyl, spiro[3.3]heptane-2,6-diyl or dispiro[3.1.3.1]decane-2,8-diyl, it being possible for all these groups to be unsubstituted, mono-, di-, tri- or tetrasubstituted with F, Cl, CN or alkyl, alkoxy, alkylcarbonyl or alkoxycarbonyl groups with 1 to 7 C atoms, wherein one or more H atoms may be substituted by F or Cl, and m is 0, 1, 2 or 3.

Preferably the compounds of formula A-III are unsymmetric compounds, preferably having different mesogenic groups $MG^{31}$ and $MG^{32}$.

Generally preferred are compounds of formulae A-I to A-III in which the dipoles of the ester groups present in the mesogenic groups are all oriented in the same direction, i.e. all —CO—O— or all —O—CO—.

Especially preferred are compounds of formulae A-I and/or A-II and/or A-III wherein the respective pairs of mesogenic groups (MG$^{11}$ and MG$^{12}$) and (MG$^{21}$ and MG$^{22}$) and (MG$^{31}$ and MG$^{32}$) at each occurrence independently from each other comprise one, two or three six-atomic rings, preferably two or three six-atomic rings.

A smaller group of preferred mesogenic groups of formula II is listed below. For reasons of simplicity, Phe in these groups is 1,4-phenylene, PheL is a 1,4-phenylene group which is substituted by 1 to 4 groups L, with L being preferably F, Cl, CN, OH, NO$_2$ or an optionally fluorinated alkyl, alkoxy or alkanoyl group with 1 to 7 C atoms, very preferably F, Cl, CN, OH, NO$_2$, CH$_3$, C$_2$H$_5$, OCH$_3$, OC$_2$H$_5$, COCH$_3$, COC$_2$H$_5$, COOCH$_3$, COOC$_2$H$_5$, CF$_3$, OCF$_3$, OCHF$_2$, OC$_2$F$_5$, in particular F, Cl, CN, CH$_3$, C$_2$H$_5$, OCH$_3$, COCH$_3$ and OCF$_3$ most preferably F, Cl, CH$_3$, OCH$_3$ and COCH$_3$ and Cyc is 1,4-cyclohexylene. This list comprises the sub-formulae shown below as well as their mirror images

| | |
|---|---|
| -Phe-Z-Phe- | II-1 |
| -Phe-Z-Cyc- | II-2 |
| -Cyc-Z-Cyc- | II-3 |
| -PheL-Z-Phe- | II-4 |
| -PheL-Z-Cyc- | II-5 |
| -PheL-Z-PheL- | II-6 |
| -Phe-Z-Phe-Z-Phe- | II-7 |
| -Phe-Z-Phe-Z-Cyc- | II-8 |
| -Phe-Z-Cyc-Z-Phe- | II-9 |
| -Cyc-Z-Phe-Z-Cyc- | II-10 |
| -Phe-Z-Cyc-Z-Cyc- | II-11 |
| -Cyc-Z-Cyc-Z-Cyc- | II-12 |
| -Phe-Z-Phe-Z-PheL- | II-13 |
| -Phe-Z-PheL-Z-Phe- | II-14 |
| -PheL-Z-Phe-Z-Phe- | II-15 |
| -PheL-Z-Phe-Z-PheL- | II-16 |
| -PheL-Z-PheL-Z-Phe- | II-17 |
| -PheL-Z-PheL-Z-PheL- | II-18 |
| -Phe-Z-PheL-Z-Cyc- | II-19 |
| -Phe-Z-Cyc-Z-PheL- | II-20 |
| -Cyc-Z-Phe-Z-PheL- | II-21 |
| -PheL-Z-Cyc-Z-PheL- | II-22 |
| -PheL-Z-PheL-Z-Cyc- | II-23 |
| -PheL-Z-Cyc-Z-Cyc- | II-24 |
| -Cyc-Z-PheL-Z-Cyc- | II-25 |

Particularly preferred are the subformulae II-1, II-4, II-6, II-7, II-13, II-14, II-15, II-16, II-17 and II-18.

In these preferred groups Z in each case independently has one of the meanings of Z$^1$ as given in formula II. Preferably Z is —COO—, —OCO—, —CH$_2$CH$_2$—, —C≡C— or a single bond, especially preferred is a single bond.

Very preferably the mesogenic groups MG$^{11}$ and MG$^{12}$, MG$^{21}$ and MG$^{22}$ and MG$^{31}$ and MG$^{32}$ are each and independently selected from the following formulae and their mirror images Very preferably at least one of the respective pairs of mesogenic groups MG$^{11}$ and MG$^{12}$, MG$^{21}$ and MG$^{22}$ and MG$^{31}$ and MG$^{32}$ is, and preferably both of them are each and independently, selected from the following formulae IIa to IIn (the two reference Nos. "II i" and "II I" being deliberately omitted to avoid any confusion) and their mirror images

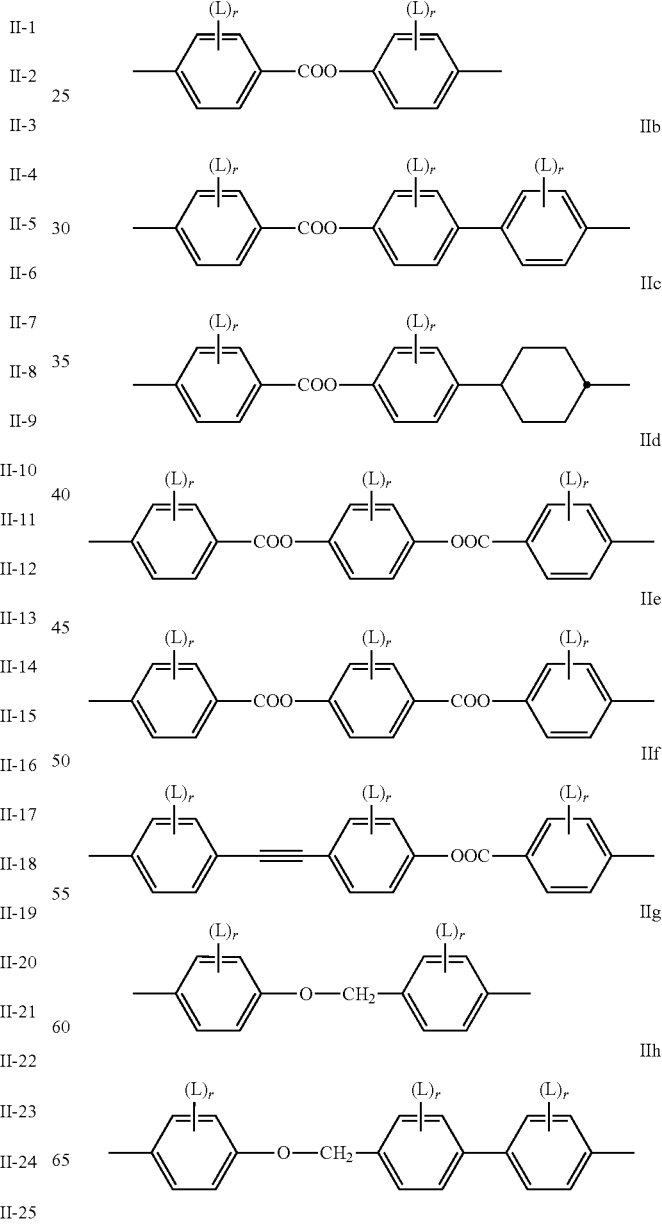

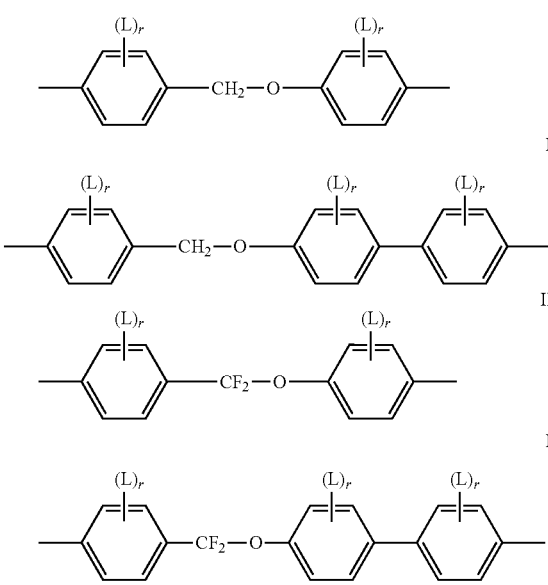

wherein
L is in each occurrence independently of each other F or Cl, preferably F and
r is in each occurrence independently of each other 0, 1, 2 or 3, preferably 0, 1 or 2.
The group

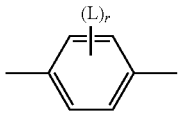

in these preferred formulae is very preferably denoting

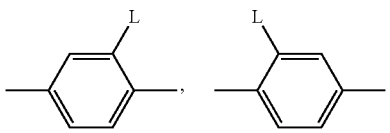

furthermore

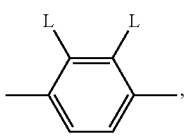

or

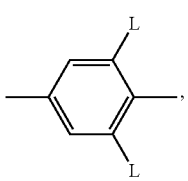

Particularly preferred are the subformulae IIa, IId, IIg, IIh, IIi, IIk and IIo, in particular the subformulae IIa and IIg.

In case of compounds with an non-polar group, $R^{11}$ and $R^{12}$, $R^{21}$ and $R^{22}$ and $R^{31}$ and $R^{32}$ are preferably alkyl with up to 15 C atoms or alkoxy with 2 to 15 C atoms.

If $R^{11}$ and $R^{12}$, $R^{21}$ and $R^{22}$ and $R^{31}$ and $R^{32}$ are an alkyl or alkoxy radical, i.e. where the terminal $CH_2$ group is replaced by —O—, this may be straight-chain or branched. It is preferably straight-chain, has 2, 3, 4, 5, 6, 7 or 8 carbon atoms and accordingly is preferably ethyl, propyl, butyl, pentyl, hexyl, heptyl, octyl, ethoxy, propoxy, butoxy, pentoxy, hexoxy, heptoxy, or octoxy, furthermore methyl, nonyl, decyl, undecyl, dodecyl, tridecyl, tetradecyl, pentadecyl, nonoxy, decoxy, undecoxy, dodecoxy, tridecoxy or tetradecoxy, for example.

Oxaalkyl, i.e. where one $CH_2$ group is replaced by —O—, is preferably straight-chain 2-oxapropyl (=methoxymethyl), 2- (=ethoxymethyl) or 3-oxabutyl (=2-methoxyethyl), 2-, 3-, or 4-oxapentyl, 2-, 3-, 4-, or 5-oxahexyl, 2-, 3-, 4-, 5-, or 6-oxaheptyl, 2-, 3-, 4-, 5-, 6- or 7-oxaoctyl, 2-, 3-, 4-, 5-, 6-, 7- or 8-oxanonyl or 2-, 3-, 4-, 5-, 6-, 7-, 8- or 9-oxadecyl, for example.

In case of a compounds with a terminal polar group, $R^{11}$ and $R^{12}$, $R^{21}$ and $R^{22}$ and $R^{31}$ and $R^{32}$ are selected from CN, $NO_2$, halogen, $OCH_3$, OCN, SCN, $COR^x$, $COOR^x$ or a mono-oligo- or polyfluorinated alkyl or alkoxy group with 1 to 4 C atoms. $R^x$ is optionally fluorinated alkyl with 1 to 4, preferably 1 to 3 C atoms. Halogen is preferably F or Cl.

Especially preferably $R^{11}$ and $R^{12}$, $R^{21}$ and $R^{22}$ and $R^{31}$ and $R^{32}$ in formulae A-I, A-II, respectively A-III are selected of H, F, Cl, CN, $NO_2$, $OCH_3$, $COCH_3$, $COC_2H_5$, $COOCH_3$, $COOC_2H_5$, $CF_3$, $C_2F_5$, $OCF_3$, $OCHF_2$, and $OC_2F_5$, in particular of H, F, Cl, CN, $OCH_3$ and $OCF_3$, especially of H, F, CN and $OCF_3$.

In addition, compounds of formulae A-I, A-II, respectively A-III containing an achiral branched group $R^{11}$ and/or $R^{21}$ and/or $R^{31}$ may occasionally be of importance, for example, due to a reduction in the tendency towards crystallization. Branched groups of this type generally do not contain more than one chain branch. Preferred achiral branched groups are isopropyl, isobutyl (=methylpropyl), isopentyl (=3-methylbutyl), isopropoxy, 2-methyl-propoxy and 3-methylbutoxy.

The spacer groups $Sp^1$, $Sp^2$ and $Sp^3$ are preferably a linear or branched alkylene group having 5 to 40 C atoms, in particular 5 to 25 C atoms, very preferably 5 to 15 C atoms, in which, in addition, one or more non-adjacent and non-terminal $CH_2$ groups may be replaced by —O—, —S—, —NH—, —N($CH_3$)—, —CO—, —O—CO—, —S—CO—, —O—COO—, —CO—S—, —CO—O—, —CH(halogen)—, —CH(CN)—, —CH=CH— or —C≡C—.

"Terminal" $CH_2$ groups are those directly bonded to the mesogenic groups. Accordingly, "non-terminal" $CH_2$ groups are not directly bonded to the mesogenic groups $R^{11}$ and $R^{12}$, $R^{21}$ and $R^{22}$ and $R^{31}$ and $R^{32}$.

Typical spacer groups are for example —$(CH_2)_o$—, —$(CH_2CH_2O)_p$—$CH_2CH_2$—, with o being an integer from 5 to 40, in particular from 5 to 25, very preferably from 5 to 15, and p being an integer from 1 to 8, in particular 1, 2, 3 or 4.

Preferred spacer groups are pentylene, hexylene, heptylene, octylene, nonylene, decylene, undecylene, dodecylene, octadecylene, diethyleneoxyethylene, dimethyleneoxybutylene, pentenylene, heptenylene, nonenylene and undecenylene, for example.

Especially preferred are compounds of formulae A-I, A-II and A-III wherein $Sp^1$, $Sp^2$, respectively $Sp^3$ are alkylene with 5 to 15 C atoms. Straight-chain alkylene groups are especially preferred.

Preferred are spacer groups with even numbers of a straight-chain alkylene having 6, 8, 10, 12 and 14 C atoms.

In another embodiment of the present invention are the spacer groups preferably with odd numbers of a straight-chain alkylene having 5, 7, 9, 11, 13 and 15 C atoms. Very preferred are straight-chain alkylene spacers having 5, 7, or 9 C atoms.

Especially preferred are compounds of formulae A-I, A-II and A-III wherein $Sp^1$, $Sp^2$, respectively $Sp^3$ are completely deuterated alkylene with 5 to 15 C atoms. Very preferred are deuterated straight-chain alkylene groups. Most preferred are partially deuterated straight-chain alkylene groups.

Preferred are compounds of formula A-I wherein the mesogenic groups $R^{11}$-$MG^{11}$- and $R^{12}$-$MG^1$- are different. Especially preferred are compounds of formula A-I wherein $R^{11}$-$MG^{11}$- and $R^{12}$-$MG^{12}$- in formula A-I are identical.

Preferred compounds of formula A-I are selected from the group of compounds of formulae A-I-1 to A-I-3

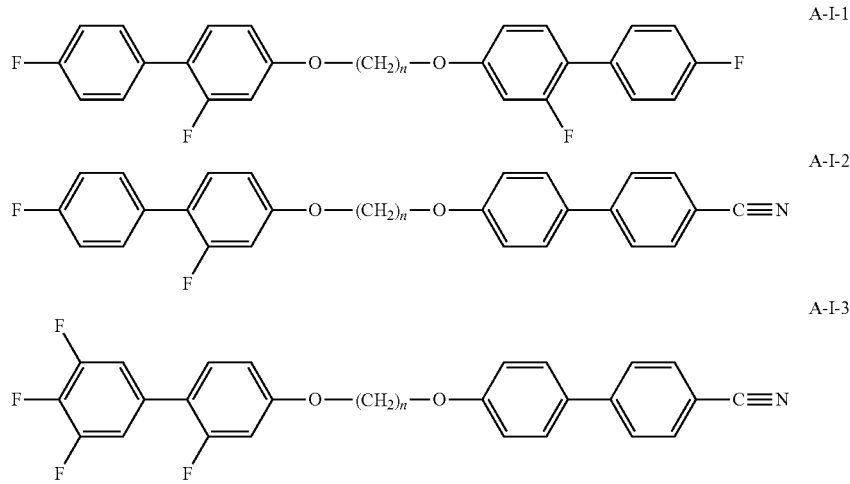

wherein the parameter n has the meaning given above and preferably is 3, 5, 7 or 9, more preferably 5, 7 or 9.

Preferred compounds of formula A-II are selected from the group of compounds of formulae A-II-1 to A-II-4

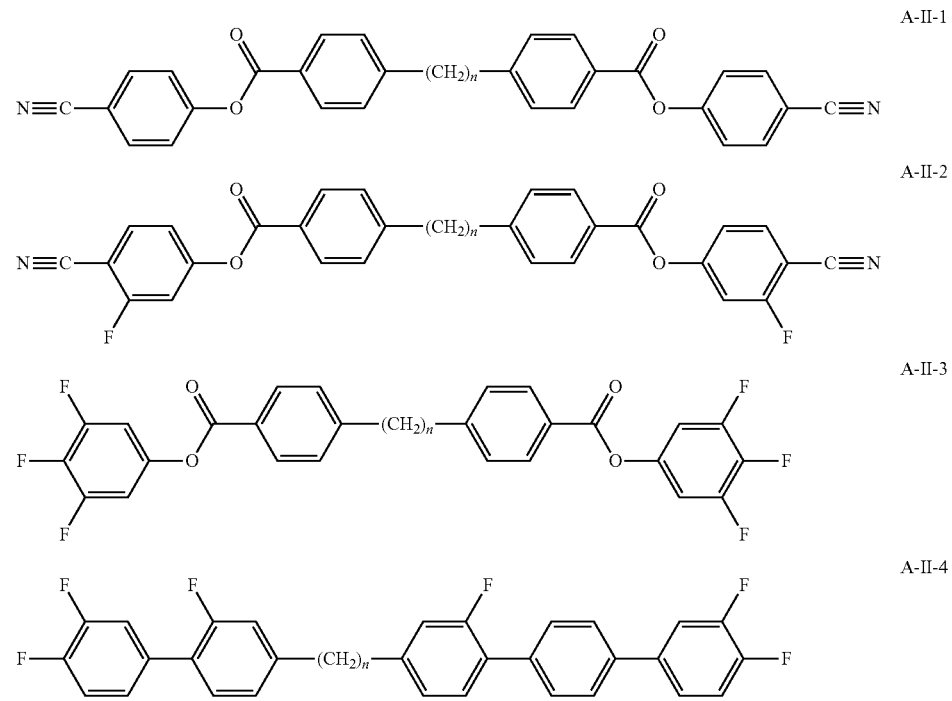

wherein the parameter n has the meaning given above and preferably is 3, 5, 7 or 9, more preferably 5, 7 or 9.
Preferred compounds of formula A-III are selected from the group of compounds of formulae A-III-1 to A-III-11
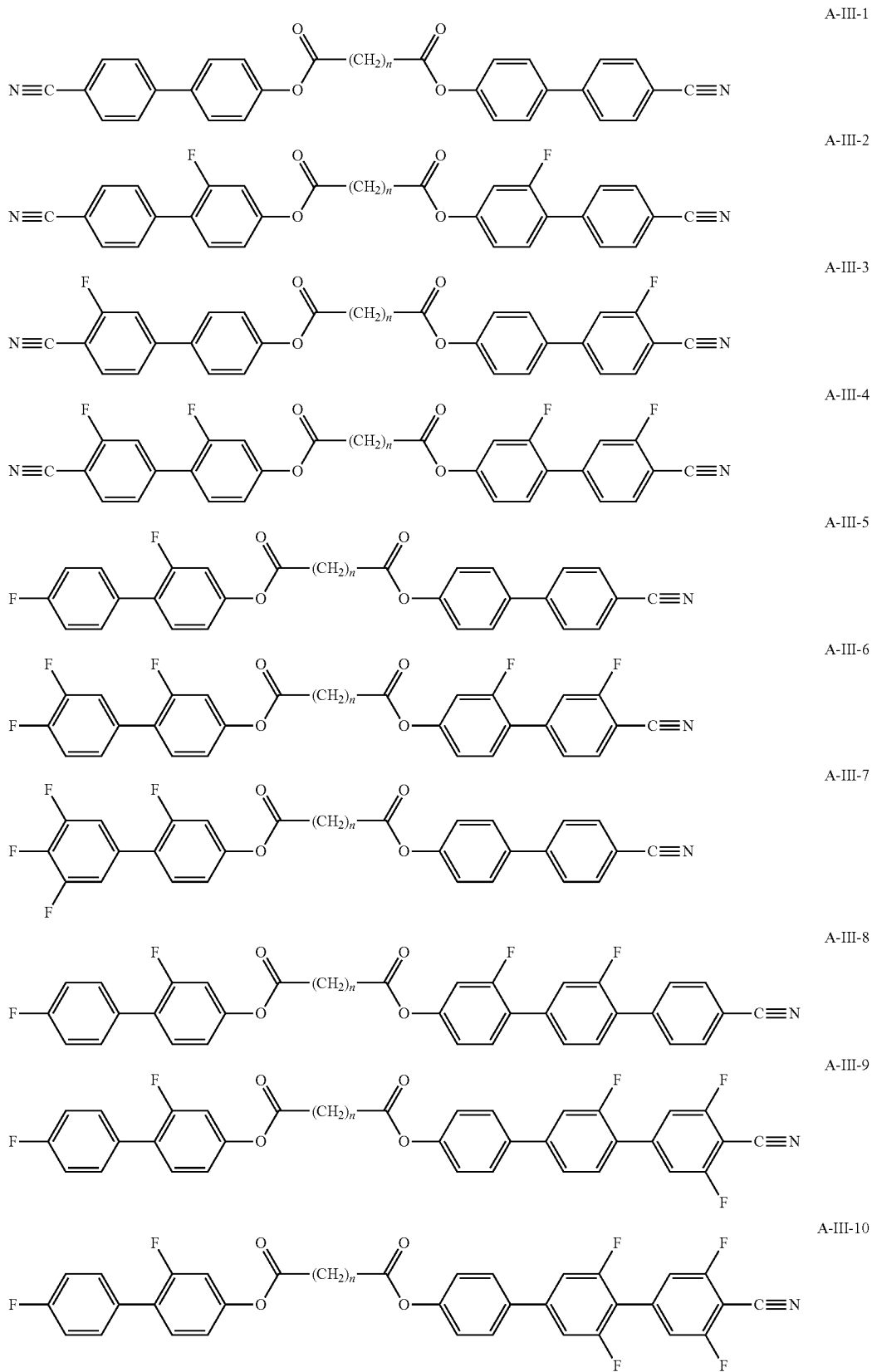

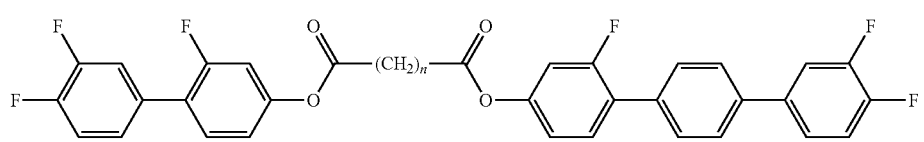
A-III-11
wherein the parameter n has the meaning given above and preferably is 3, 5, 7 or 9, more preferably 5, 7 or 9.
Particularly preferred exemplary compounds of formulae A-I are the following compounds:
symmetrical ones:
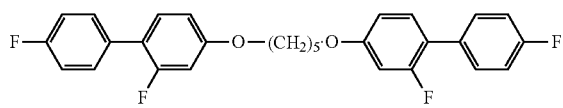
-continued
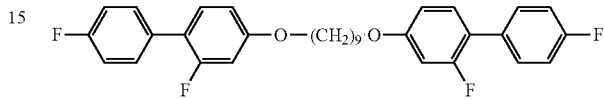
and non-symmetrical ones:
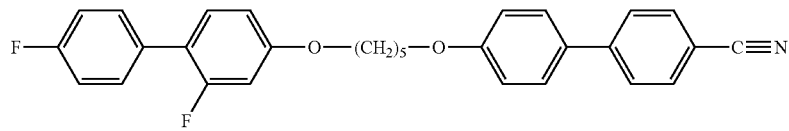
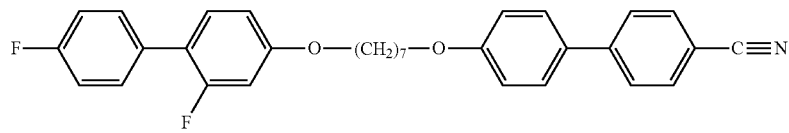
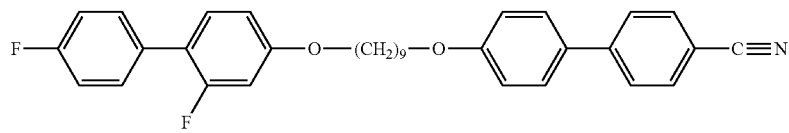
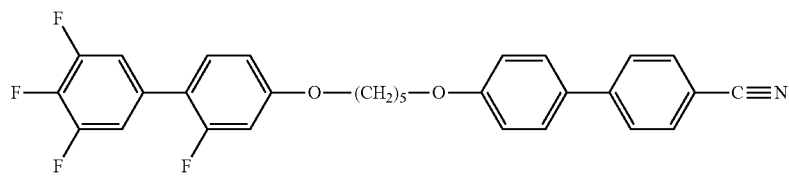
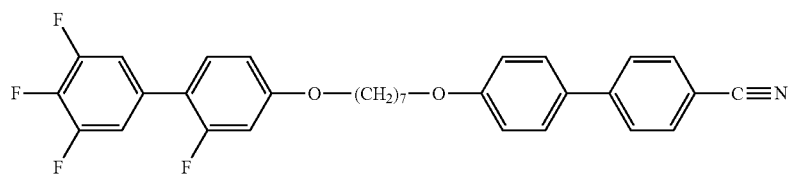
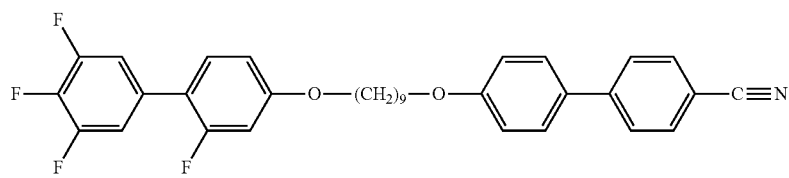

Particularly preferred exemplary compounds of formulae A-II are the following compounds:
symmetrical ones:
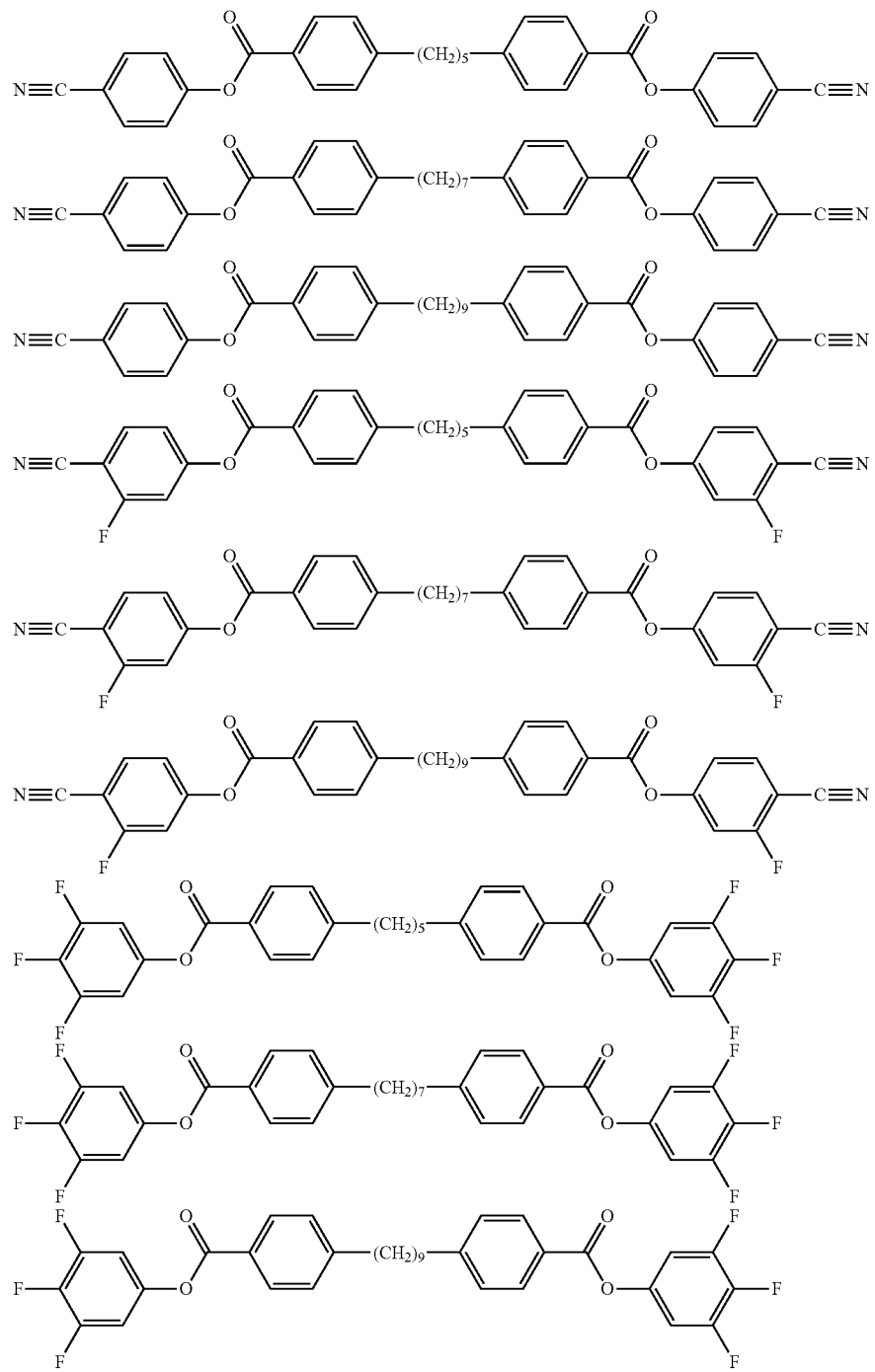
and non-symmetrical ones:
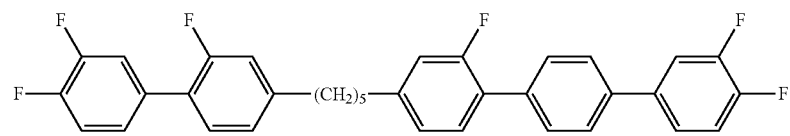

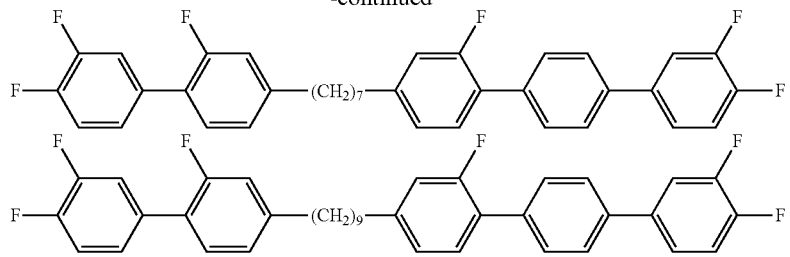
Particularly preferred exemplary compounds of formulae A-III are the following compounds:
symmetrical ones:
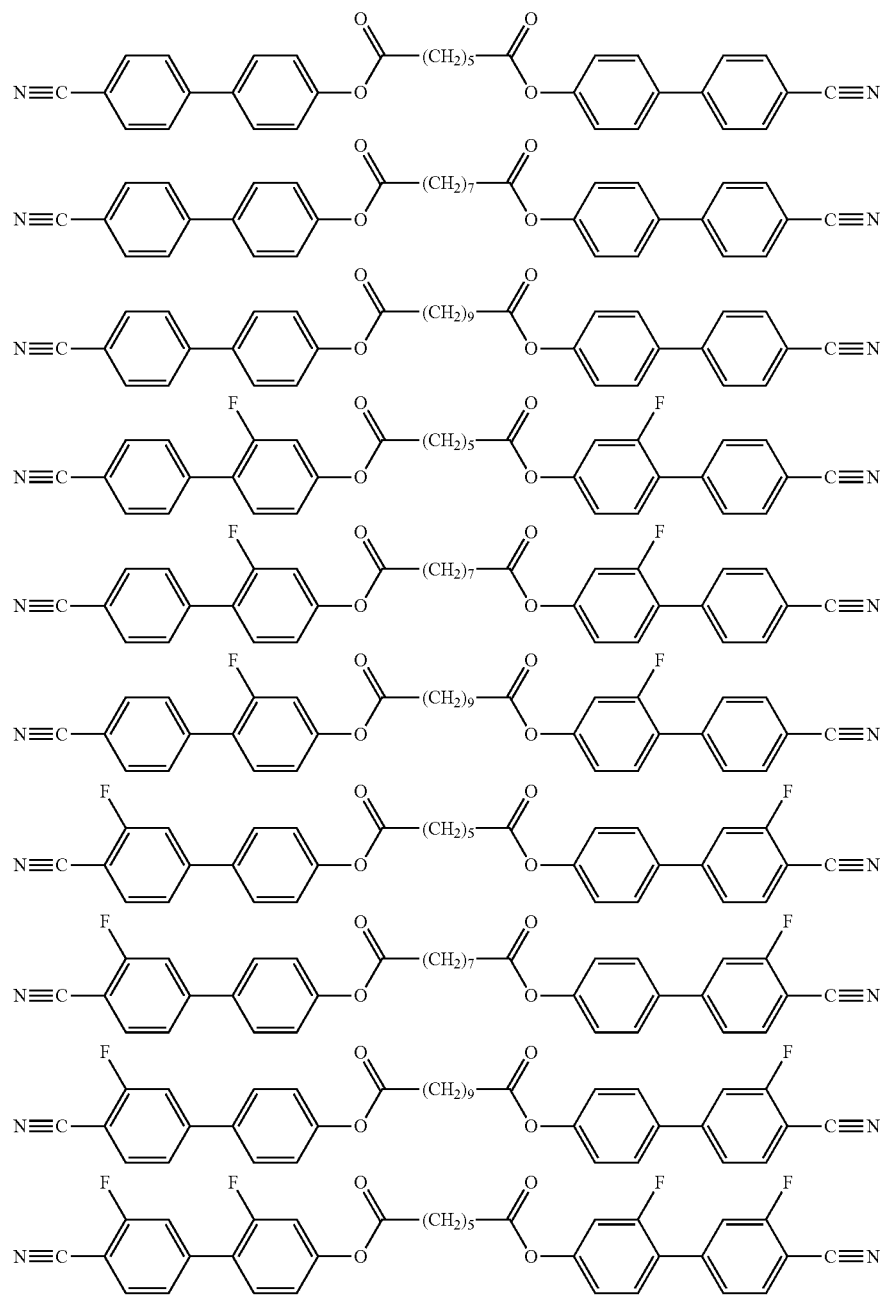

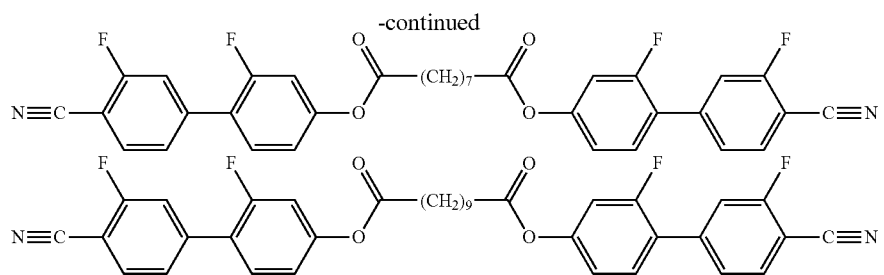
and non-symmetrical ones:
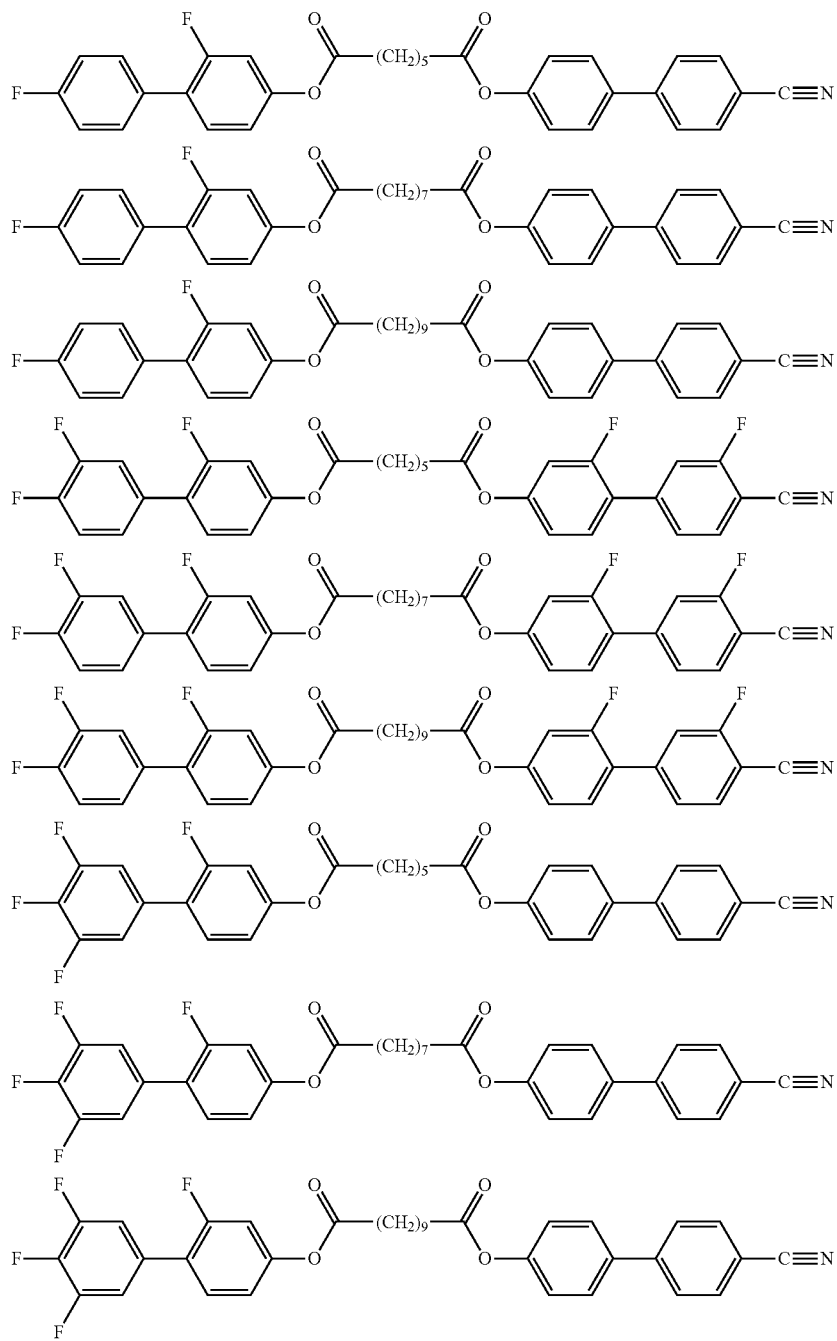

-continued
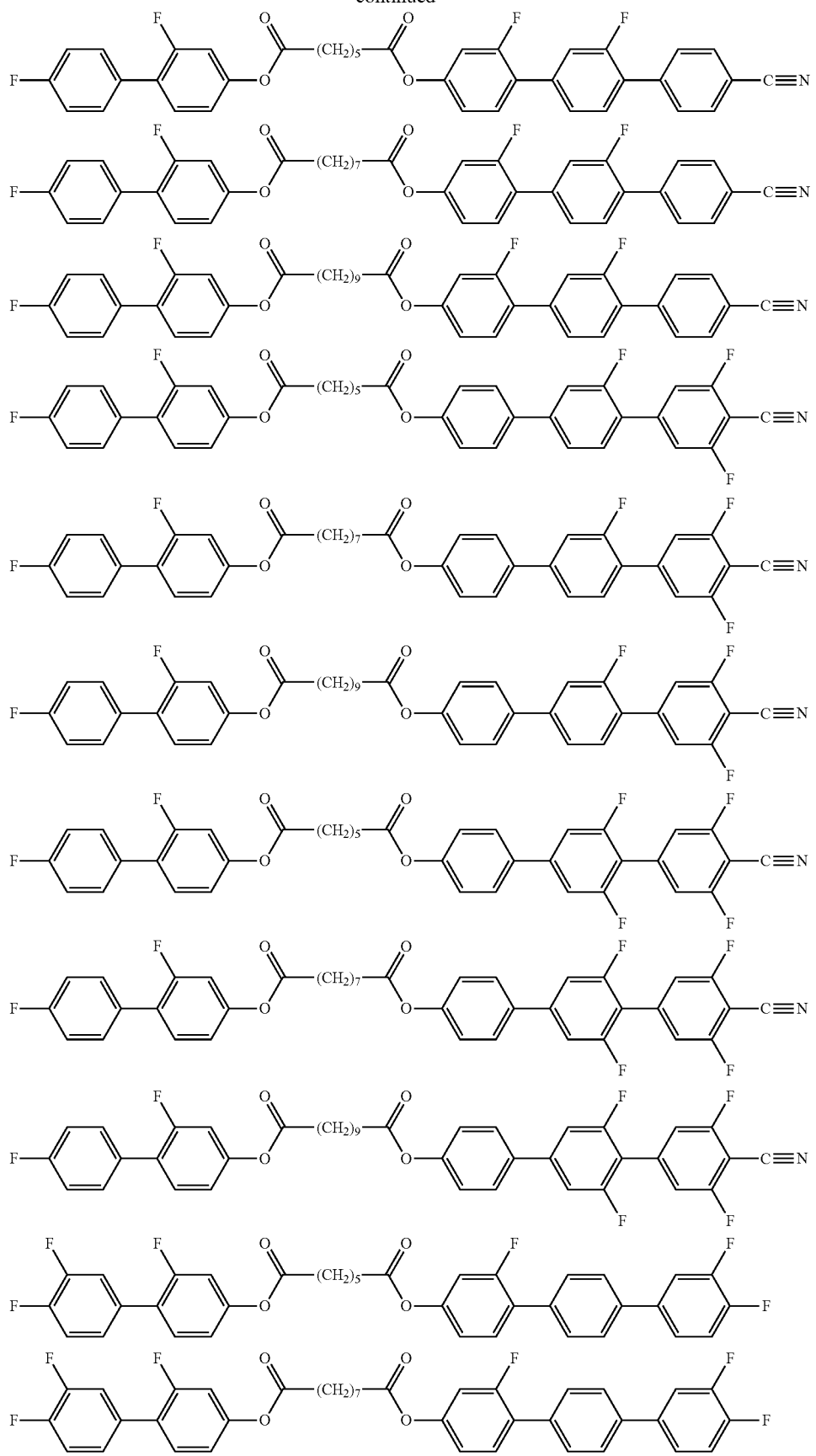

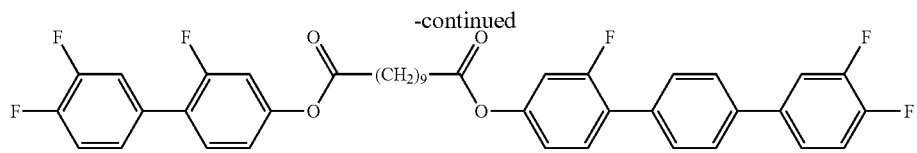

The compounds of formulae B-I to B-III are either known to the expert and can be synthesized according to or in analogy to methods which are known per se and which are described in standard works of organic chemistry such as, for example, Houben-Weyl, Methoden der organischen Chemie, Thieme-Verlag, Stuttgart.

Methoden der organischen Chemie, Thieme-Verlag, Stuttgart. A preferred method of preparation can be taken from the following synthesis scheme.

The bimesogenic compounds of formulae A-I to A-III are either known to the expert, can be prepared by known methods analogously to known compounds or are prepared according to the following general reaction schemes.

Reaction Scheme I

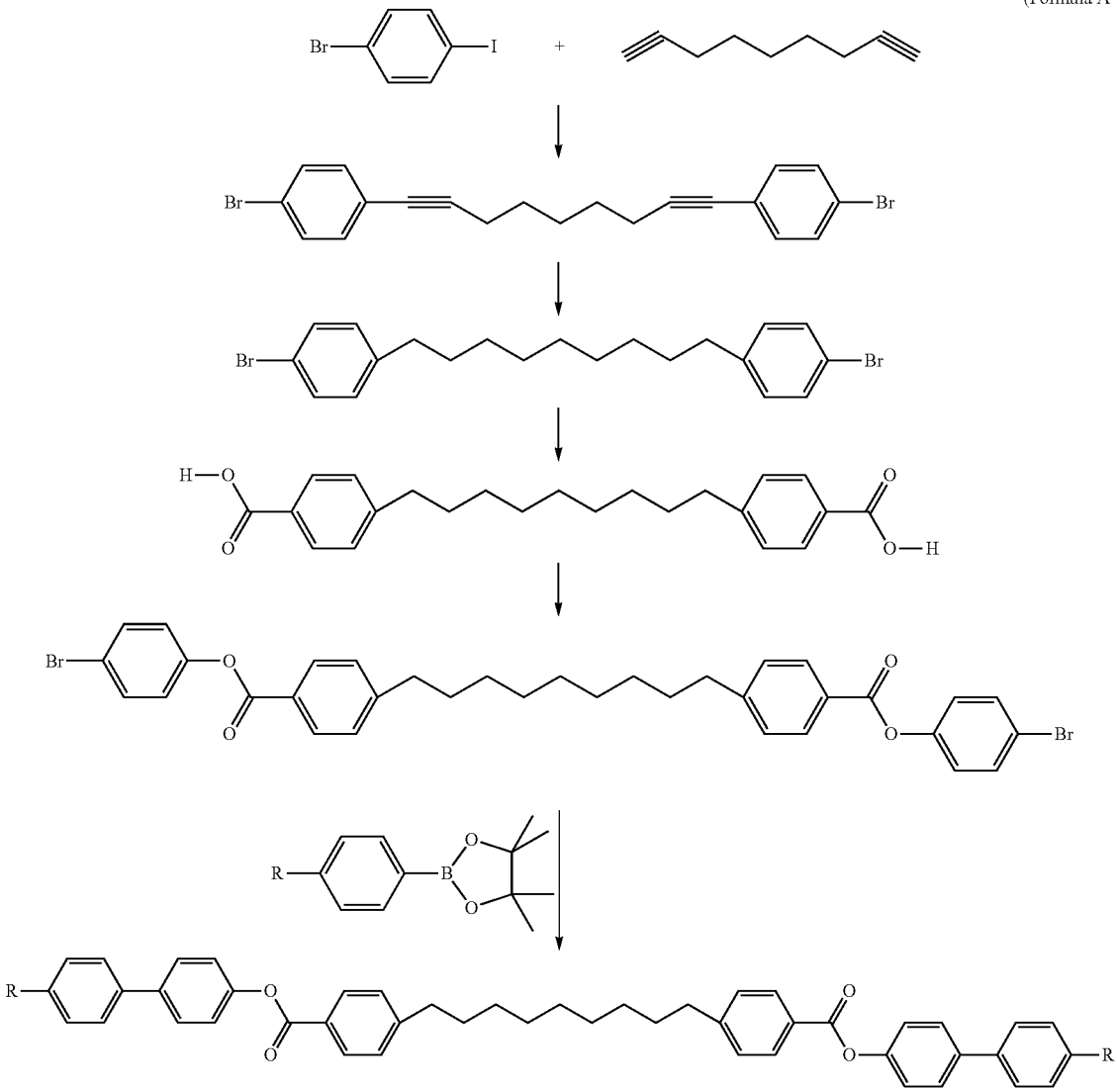

The compounds of formulae A-I to A-III can be synthesized according to or in analogy to methods which are known per se and which are described in standard works of organic chemistry such as, for example, Houben-Weyl, wherein R independently in each appearance has the meaning given for $R^{11}$ and $R^{12}$ including the preferred meanings of these groups, most preferably is F or CN, and the conditions of the successive reactions are as follows:

a) CuI, Pd(PPh$_3$)$_2$Cl$_2$, Triethylamine, 30° C.;
b) [H$_2$], Pd/C;
c) n-BuLi, CO$_2$, −70° C.;
d) DCC, DMAP, DCM, 25° C.; and
e) Pd(PPh$_3$)$_2$Cl$_2$, NaCO3, THF, under reflux.

All phenylene moieties shown in this scheme and in the following schemes may independently of each other be optionally bearing one, two or three, preferably one or two, F atoms or one Cl atom or one Cl and one F atom.

An exemplary reaction scheme for the preparation of such a fluorinated compound is shown in the following scheme.

Reaction Scheme II (Formula A-II)

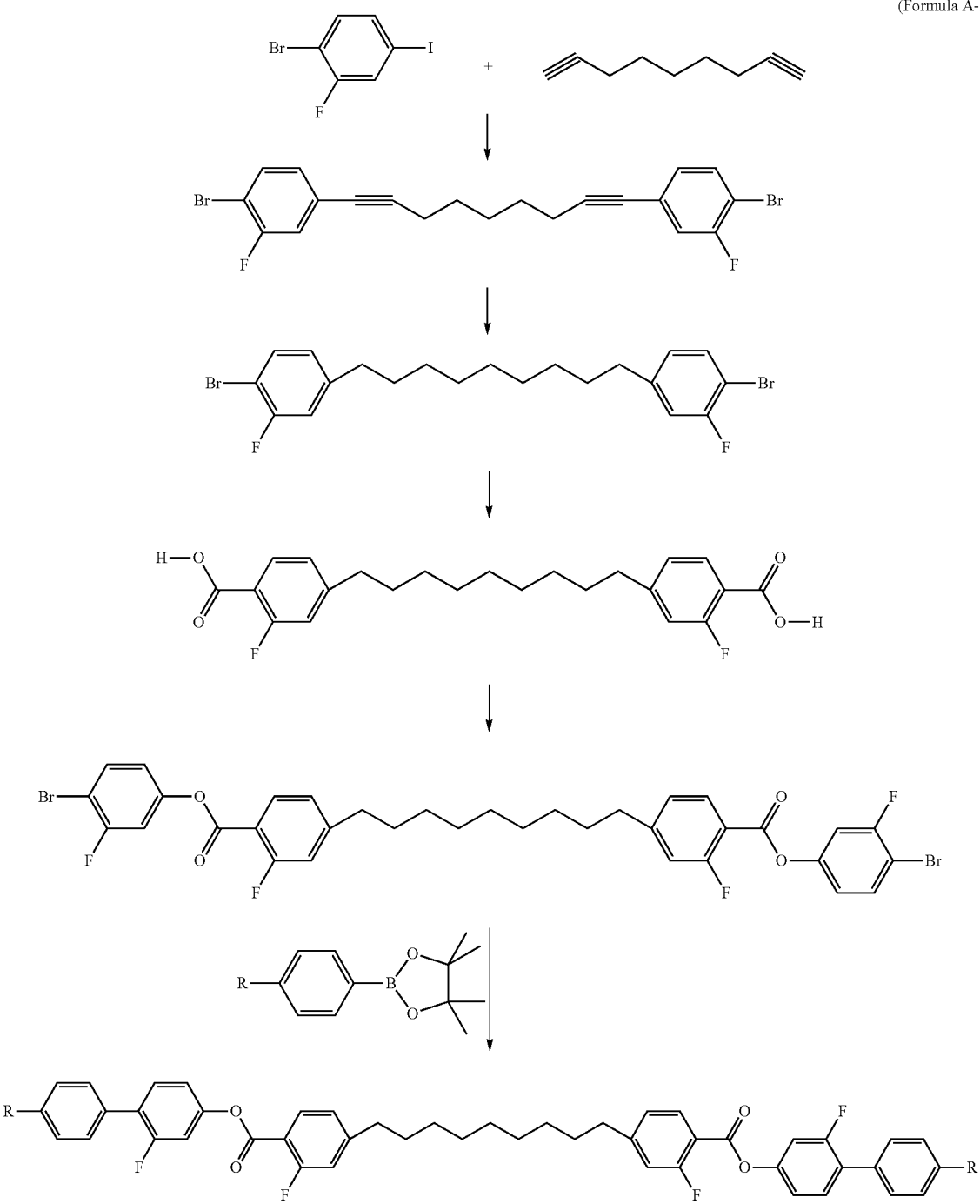

wherein R independently in each appearance has the meaning given under scheme I and the conditions of the successive reactions are also as given under scheme I.

Reaction Scheme III

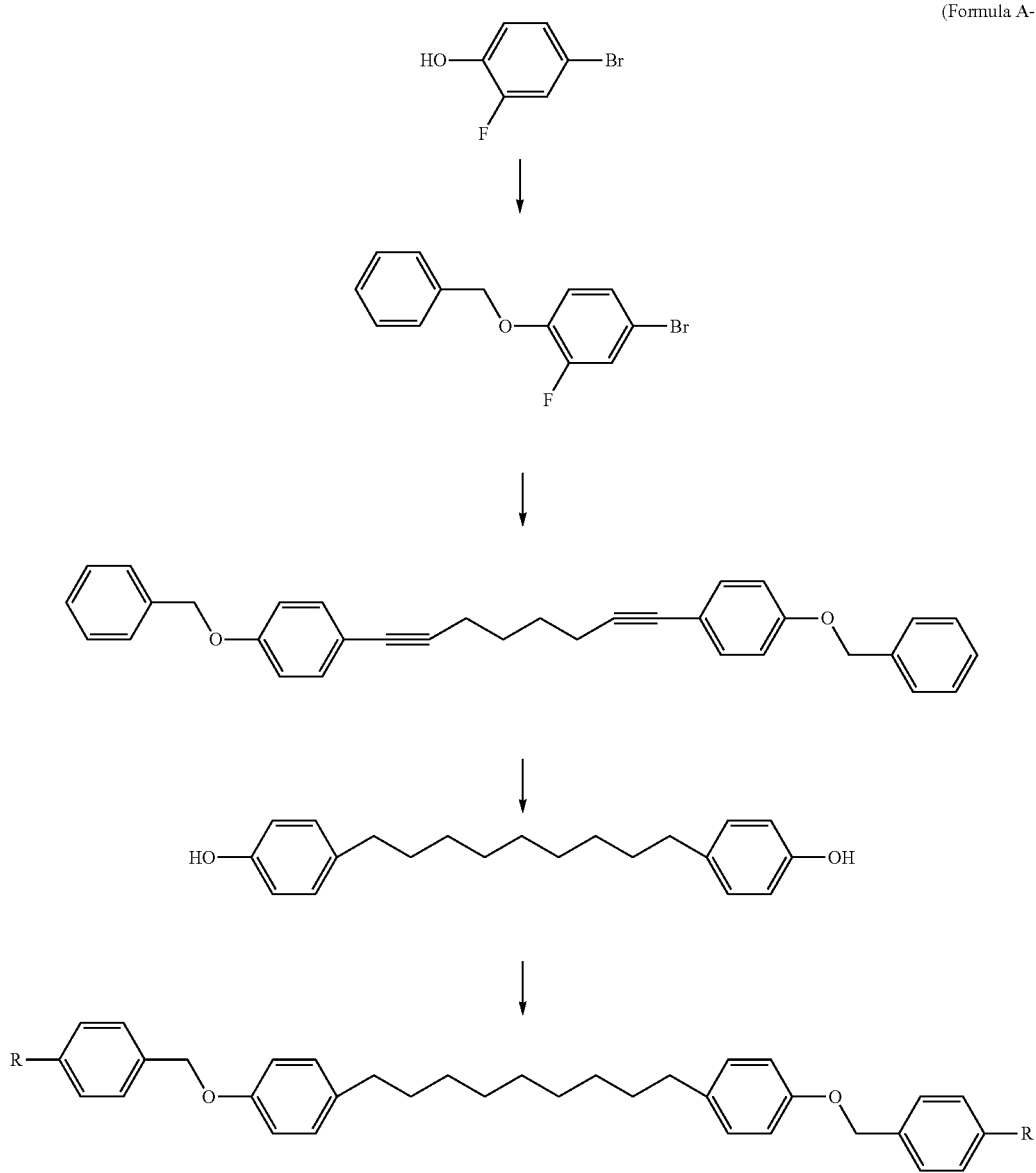

(Formula A-II)

wherein R independently in each appearance has the meaning given for $R^{11}$ and $R^{12}$ including the preferred meanings of these groups, most preferably is F or CN, and the conditions of the successive reactions are as follows:

a) benzylbromide, $K_2CO_3$, butanone, 80° C.;
b) CuI, $Pd(PPh_3)_2Cl_2$, Triethylamine, 30° C.;
c) $[H_2]$, Pd/C; and
d) $K_2CO_3$, butanone, 80° C.

Reaction Scheme IV

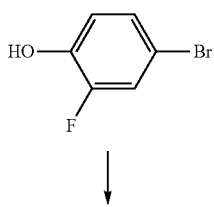

(Formula A-II)

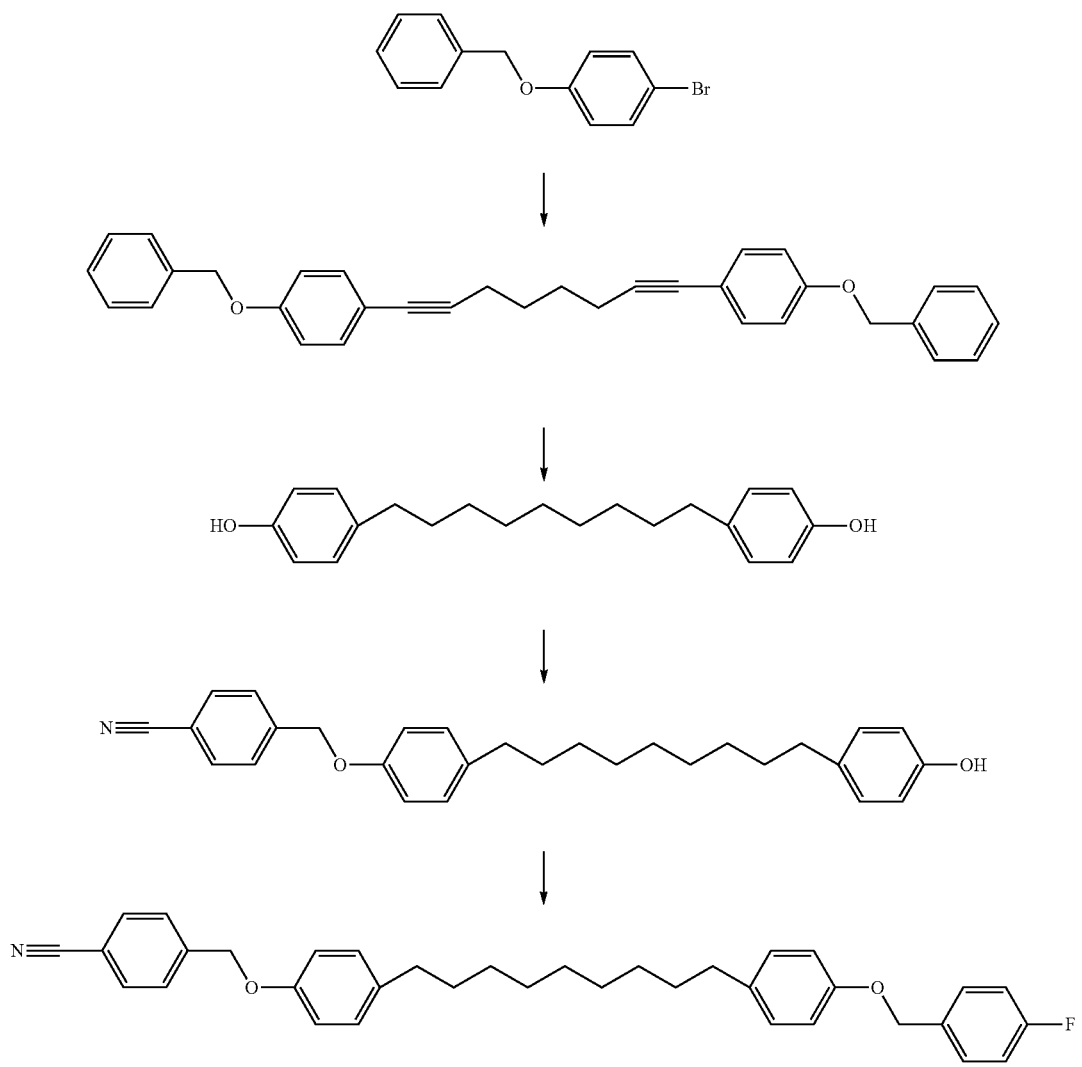
wherein the conditions of the successive reactions are as given under scheme III. Steps d) and e) are performed under the same conditions.
Reaction Scheme V
(Formula A-II)
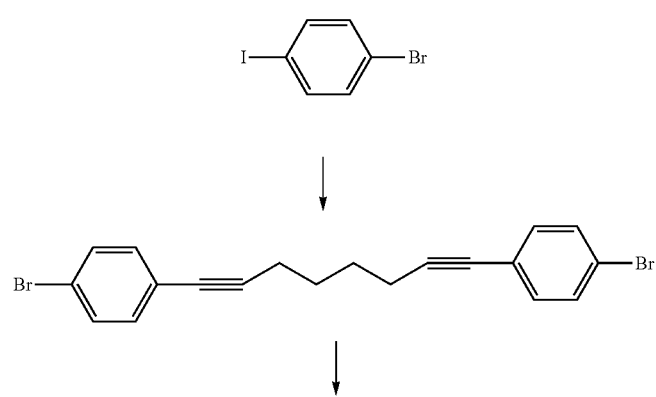

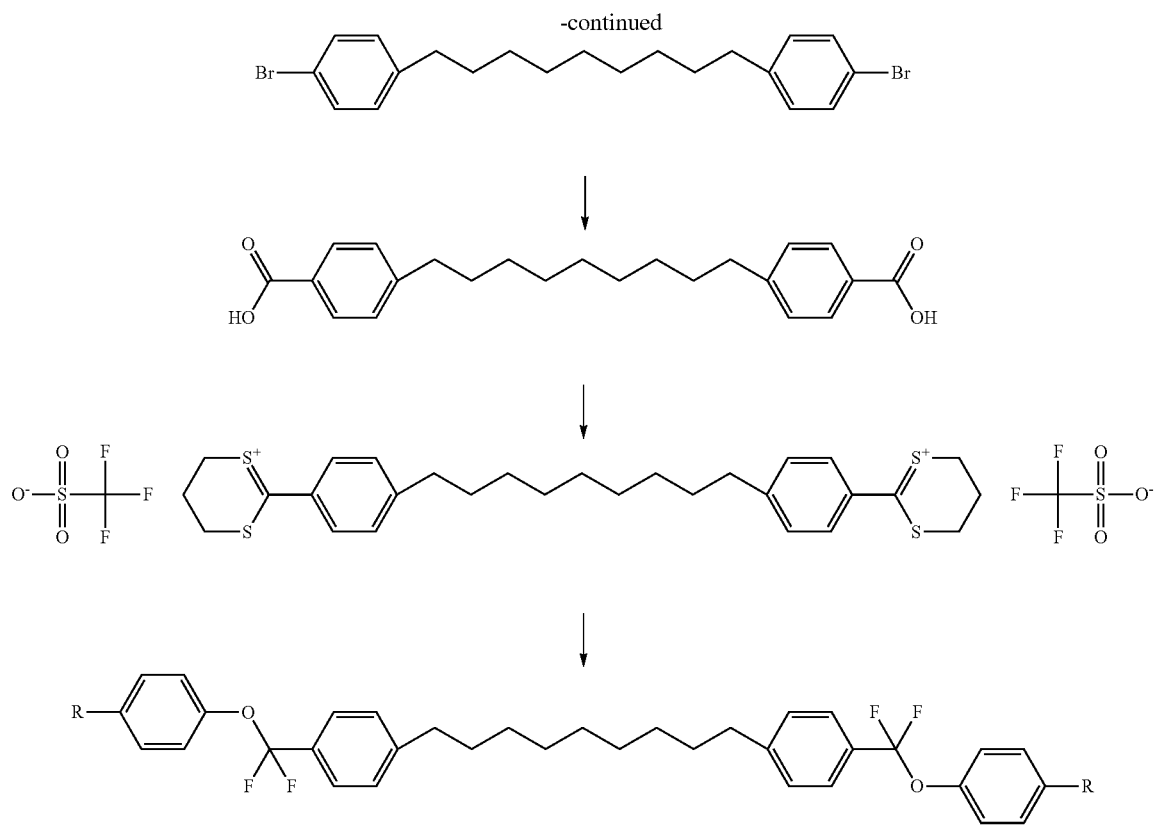

wherein R independently in each appearance has the meaning given for $R^{11}$ and $R^{12}$ including the preferred meanings of these groups, most preferably is F or CN, and the conditions of the successive reactions are as follows:

a) CuI, Pd(PPh$_3$)$_2$Cl$_2$, Triethylamine, 30° C.;
b) [H$_2$], Pd/C;
c) n-BuLi, THF, −70 0° C., CO$_2$;
d) HSC$_3$H$_6$SH, CF$_3$SO$_3$H, 130° C.; and
e) N(C$_2$H$_5$)$_3$, 3HF.N(C$_2$H$_5$)$_3$, −70° C.

Reaction Scheme VI (Formula A-I)

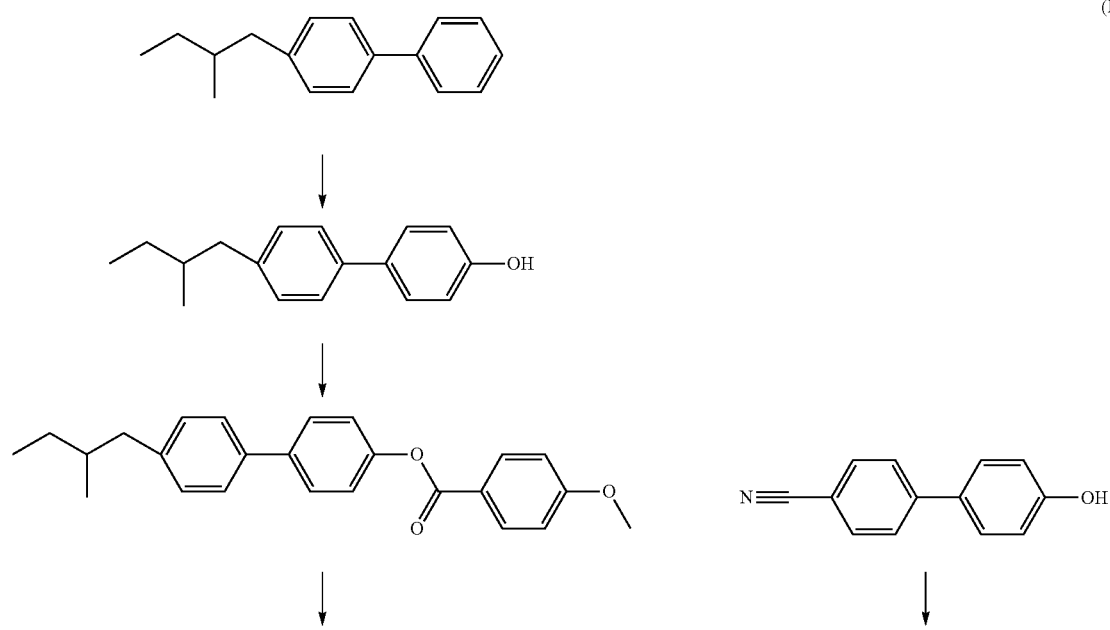

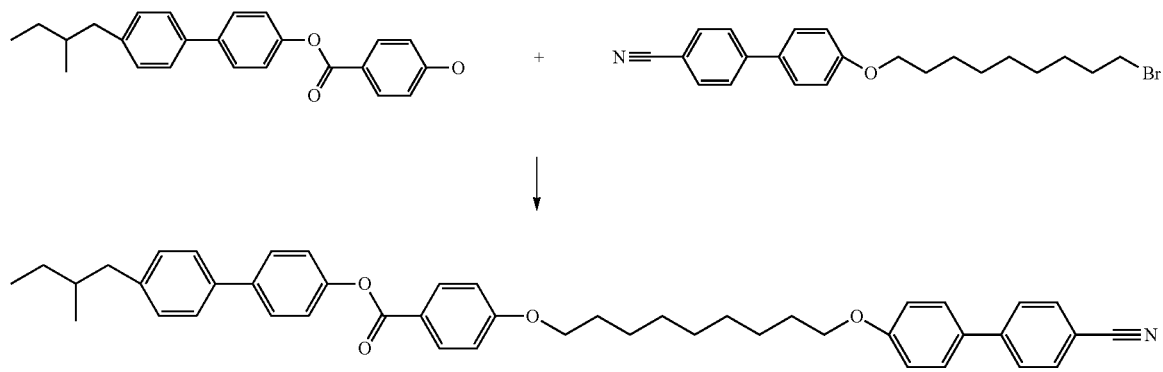
wherein the conditions of the successive reactions are as follows:
a) (i) HBr, 0° C.; (ii) H$_2$O$_2$, 0° C.;
b) DCC, DMAP, DCM;
c1) AlCl$_3$, S(CH$_3$)$_2$, DCM, 0° C.;
c2) K$_2$CO$_3$, butanone, 80° C.; and
d) K$_2$CO$_3$, butanone, 80° C.
The compounds of formula A-II can be synthesized preferably by the method shown in following synthesis scheme, reaction scheme VII.
Reaction Scheme VII
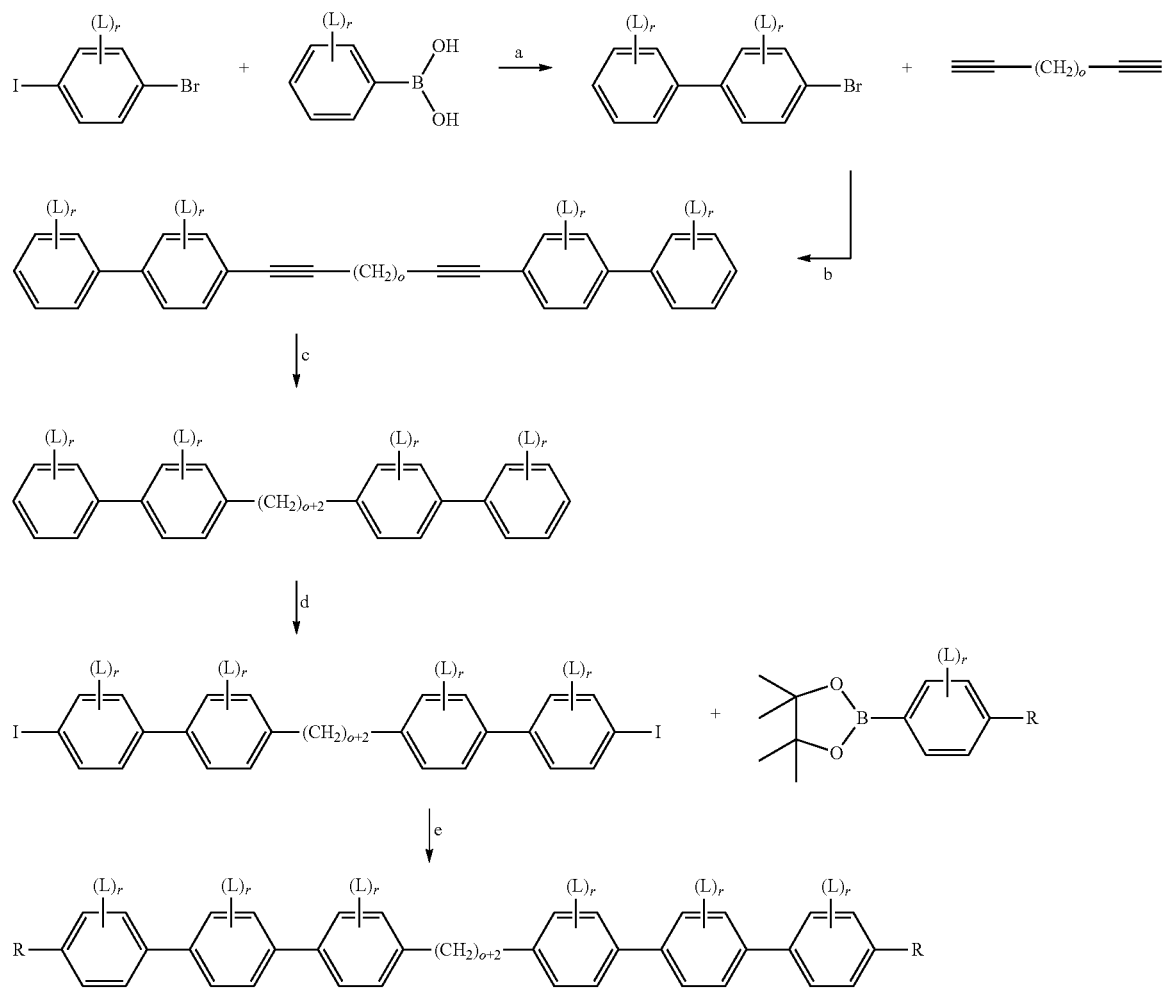

a) K$_2$CO$_3$, THF, H$_2$O, Pd catalyst, 80° C., 24 hours
b) THF, Et$_3$N, CuI, Pd catalyst, 40° C., 24 hours
c) THF, Pd/C, H$_2$, 60° C., 95 bar
d) n-BuLi, THF, I$_2$. −70° C.
e) Na$_2$CO$_3$, THF, H$_2$O, Pd catalyst, 80° C., 24 hours wherein R independently in each occurrence has the meaning of R$^{11}$ and R$^{12}$, o, L and r are at each occurrence independently from each other as defined above, including the preferred meanings of these groups.

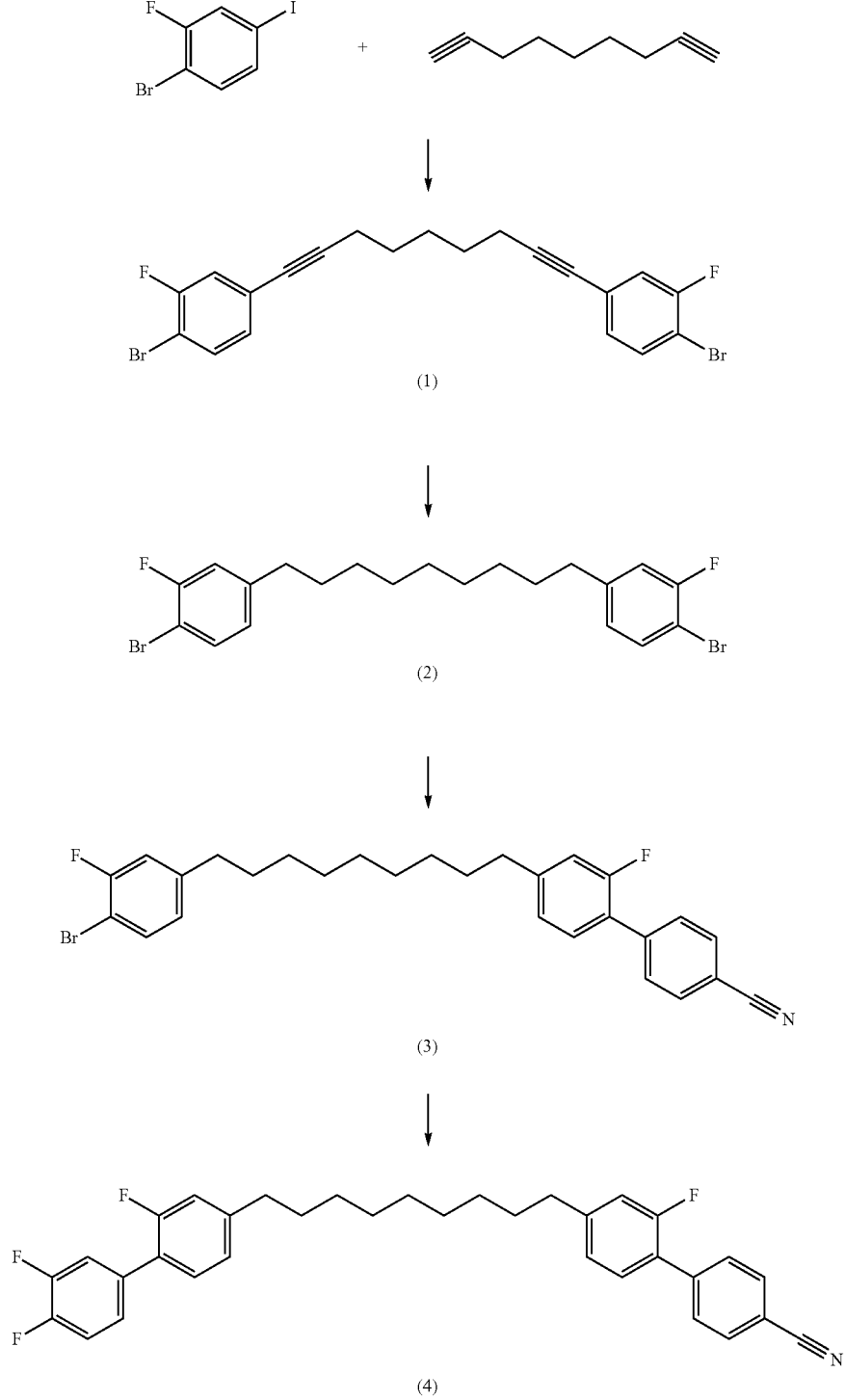

Reaction Scheme VIII (Formula A-II)

COMPOUND AND SYNTHESIS EXAMPLES

Synthesis Example 1

Preparation of N-PGIZIGI-9-GZGP-N

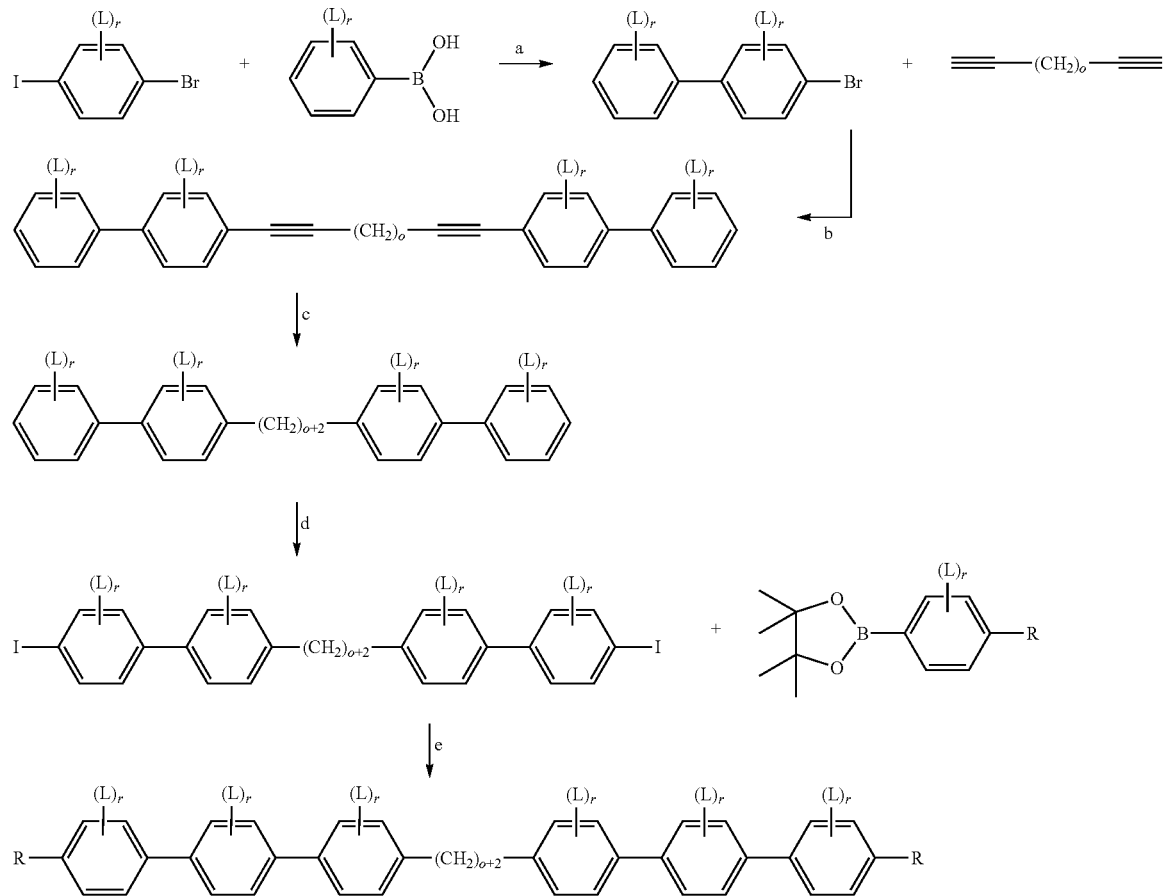

Step 1.1

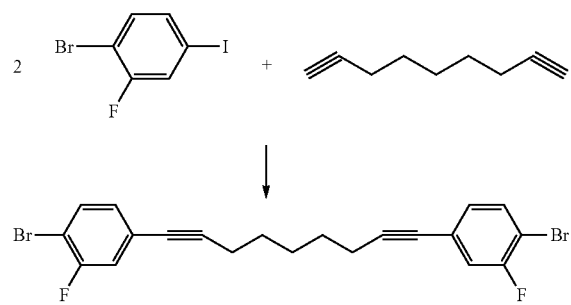

55.1 g (183 mmol) of the iodobromofluorobenzene and 60 ml tetrahydrofuran are added to a reaction flask, which is evacuated three times and subsequently filled with nitrogen, then treated in an ultrasonic bath to degas the reaction mixture, a procedure shortly referred to as "ultasonication" in this application, for 10 min. with additional evacuation/purging with nitrogen. Pd(PPh$_3$)$_2$Cl$_2$ (1.8 g, 2.6 mmol) and CuI (0.4 g, 2.1 mmol) as catalysts and diisopropylamine (60 ml) are added and the reaction vessel is purged again before being "ultrasonicated" for 10 minutes and then placed in a large water bath to control the reaction temperature. 1,8-nonadiyne (10 g, 83 mmol) are added slowly over a time span of 15 minutes a fine precipitate is formed. The reaction mixture is stirred overnight at ambient temperature.

The reaction mixture is then filtered under vacuum and the filter pad washed with Dichloromethane. The filtrate is concentrated to a semi-solid, which is re-dissolved in dichloromethane before being passed through a silica column to purify. The target product is eluted with additional dichloromethane before final isolation by re-crystallisation from petroleum ether.

Step 1.2

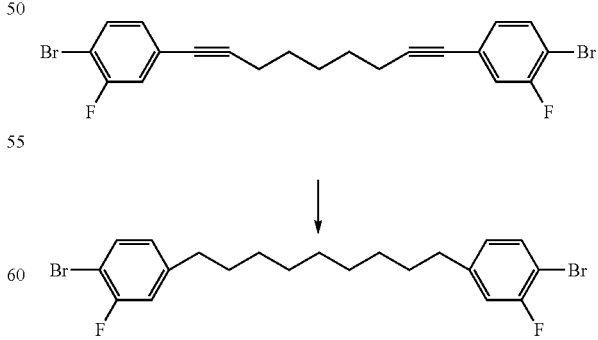

The hydrogenation reaction is performed in an "H-Cube"-hydrogenation apparatus. The parameters of the reaction are as follows: Flow rate: 7 ml/min, Mode: 100% H$_2$, Catalysts: Pt/C, Temperature: 50° C. and Pressure: 30 bar.

Step 1.3

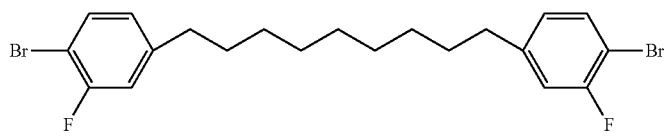

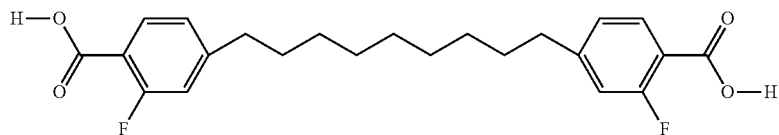

Anhydrous tetrahydrofuran is charged into a three neck flask together with 9.4 g (19.8 mmol) of the dibromide with the saturated spacer. The flask is evacuated and filled with nitrogen. The reaction mixture is stirred and cooled to a temperature of −75° C. in a bath of acetone cooled by solid $CO_2$.

Then 31 ml 1.6 M, (49.5 mmol) n-butyl lithium are added drop wise over a time span of 30 minutes while keeping the temperature at −75° C. After 3 hours further stirring 8.7 g (200 mmol) of crushed, solid $CO_2$ are cautiously added to the reaction mixture. A thick white sludge develops and this is stirred for a further 30 minutes before it is hydrolysed by the addition of dilute HCl. The mixture is extracted three times with diethyl ether, and the combined organic material washed with water until neutral. Then toluene is added and the whole solvent is solution is evaporated. The solid the product is isolated and used in the following without further purification.

Step 1.4

4.9 g (24 mmol) of the acid intermediate are added to flask filled with 50 ml dichloromethane. This mixture is thoroughly stirred before 6.5 g (31 mmol) of trifluoroacetic anhydride are added dropwise over a time span of 5 minutes. The reaction mixture is then stirred further for 5 minutes.

Then 4.6 g (24.4 mmol) of solid 4-hydroxy-3-fluorobromobenzene are added and the reaction mixture is stirred at a temperature of 35° C. After complete reaction, water is added. The organic and aqueous layers are separated and the aqueous solution is extracted three times with dichloromethane. The combined organic solutions are washed with a solution of sodium carbonate before being dried over magnesium sulphate, filtered and concentrated. The crude product is purified by passing through a silica plug and eluting with a mixture of petrol and dichloromethane (1:2). The final purification is carried out by re-crystallisation from MeCN.

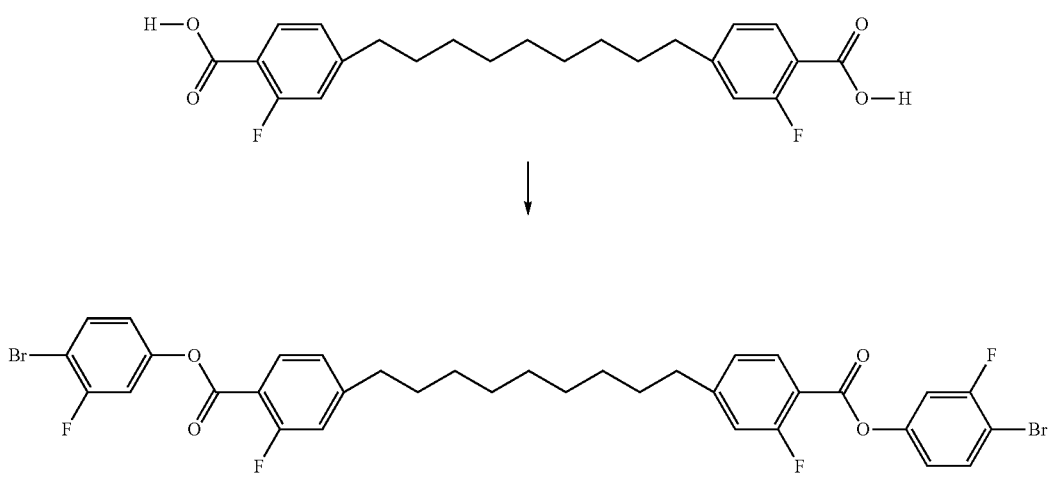

Step 1.5

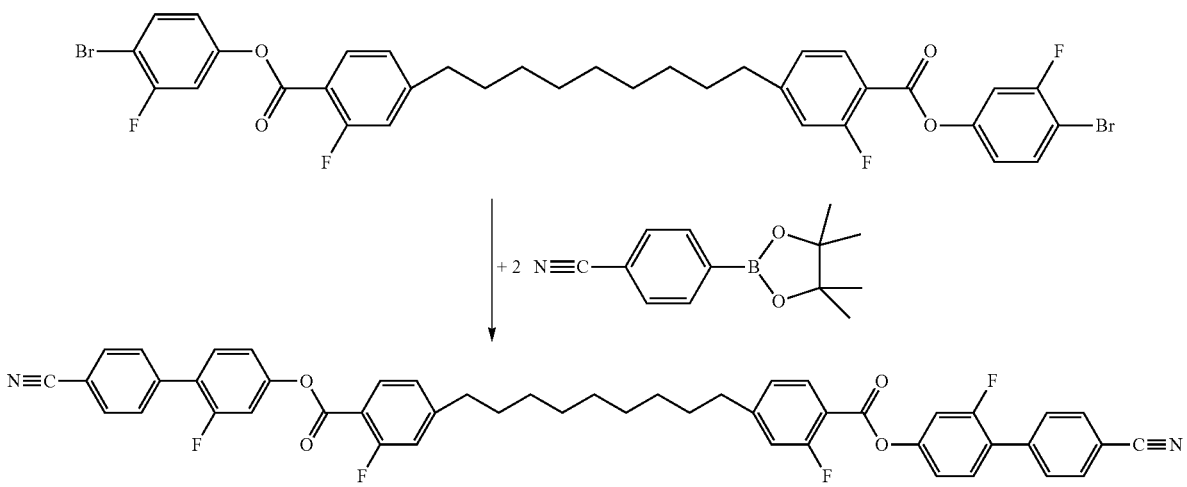

1.0 g (1.33 mmol) of the bromide intermediate, 0.61 g (2.67 mmol) of 4-cyanophenyl boronate ester, 0.63 g (2.66 mmol) of sodium metaborate octahydrate, 9.0 ml (499 mmol) of water and 37.5 ml (463 mmol) of tetrahydrofuran are filled into a round bottom flask. This mixture is stirred, the flask is evacuated and filled with nitrogen before being "untrasonicated" for 30 minutes. Then 0.075 g (0.107 mmol) of palladium dichloride-(bistriphenylphosphine) are added and the vessel is evacuated then filled with nitrogen. The reaction mixture is heated to a temperature of 80° C. for 72 hours under reflux. Then the reaction mixture is cooled, water and diethyl ether are added subsequently. Then the resulting phases are separated. The aqueous phase is extracted twice with diethyl ether, and the combined organic phases are washed twice with water and once with an aqueous solution of NaCl. The organic solution is dried over sodium sulphate, filtered and the solvent evaporated. The crude product is purified over a short silica column, eluted with first petrol then with a mixture of petrol/dichloromethane (2:1). The product is isolated after repeated re-crystallisation from acetonitrile.

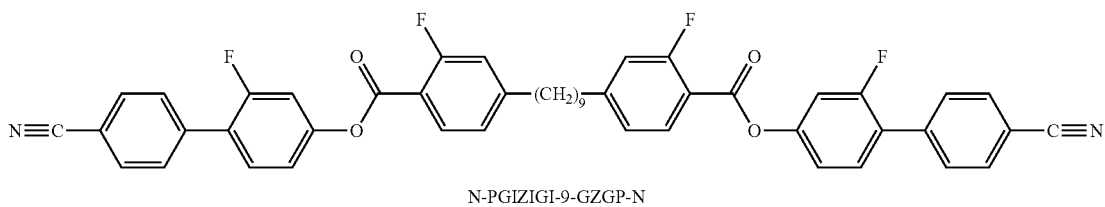

N-PGIZIGI-9-GZGP-N

This compound has the phase sequence: K 130 Sm 255 N 271 I.

Scheme for Synthesis Example 2—Preparation of N-PO1GI-9-GO1P-N

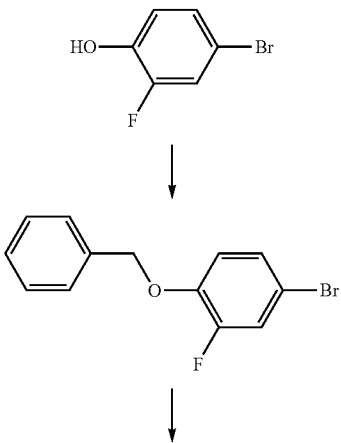

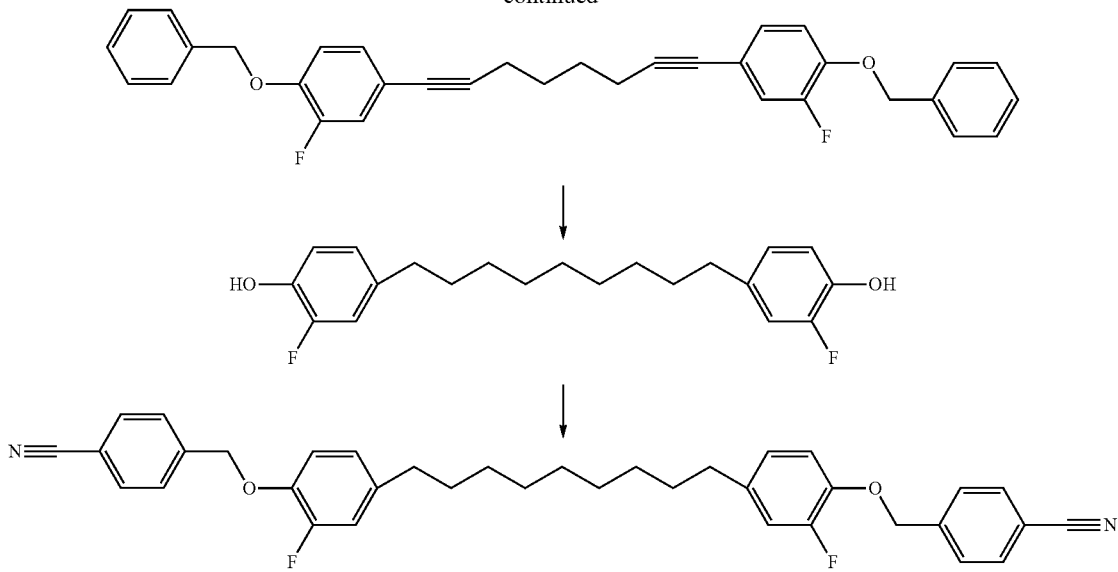

Synthesis Example 2

Step 2.1

4-bromofluorophenol (33.9 g, 0.178 moles), benzylbromide (21.1 ml, 0.178 moles), potassium carbonate (34.4 g, 0.25 moles) and butan-2-one (300 ml) are heated together at a temperature of 85° C. under reflux overnight. The mixture is cooled, filtered, washed with butanone and diethyl ether and the solvent removed in vacuo. The material is re-crystallised from heptane at −20° C.

Step 2.2

The bromide (44.5 g, 115.8 mmol) from the previous step, triethylamine (89 ml), tetrahydrofuran (45 ml), Copper(I) Iodide (0.694 g, 3.6 mmol) and bis(triphenylphosphine) Palladium(II)dichloride (3.5 g, 4.91 mmol) are added to a flask and then 1,8-Nonadiyne (9.14 g, 76.0 mmol) in tetrahydrofuran (45 ml) is slowly added over a time of 30 minutes. The reaction-mixture is warmed to 40° C. overnight. The mixture is then cooled, filtered and the filter pad washed with diethyl ether. The filtrate is acidified with dilute Hydrochloric acid and then neutralized with sodium hydroxide before drying over sodium sulphate. This was filtered and the solvent from the filtrate removed in vacuo to give a solid product. The solid was pre-adsorbed onto 50 g silica from a dichloromethane solution and columned through a short silica column using 10% DCM in petrol as eluent. The fractions containing the product were collected and re-crystallised first from petrol and then from acetonitrile to afford the clean product.

Step 2.3

The hydrogenation reaction is again performed in a an "H-Cube" Hydrogenator.

Parameters: Flow: 10 ml/min., Mode: 100% $H_2$ Catalysts: Pd/C

Temp.: 50° C., Pressure: 30 bar Rising to 80 CC and 80 bar at the end of the reaction.

Stage 2.4

The phenol from stage 3 (2.80 g, 8.04 mmol), 4-bromomethylbenzonitrile (3.94 g, 20.09 mmol) and potassium carbonate (1.66 g, 12 mmol) are added to a flask with dimethylformamide (5.87 g) and ethyl methyl ketone (50 ml). The mixture is heated at 85° C. overnight. The mixture is cooled, filtered and the filter pad washed with diethyl ether and the solvent from the filtrate removed in vacuo to give a solid product. This solid crude product is purified over a short silica column using 33% DCM in petrol as eluent. The fractions containing the product are collected and re-crystallised from acetonitrile to afford the clean product.

Scheme for Synthesis Example 3—Preparation of N-PO1GI-9-GO1P-F

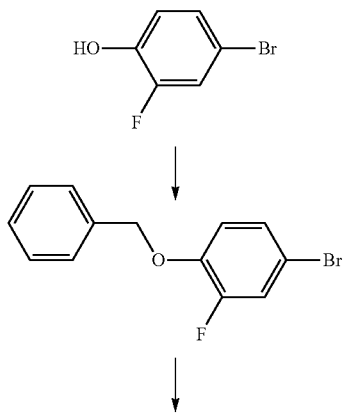

-continued

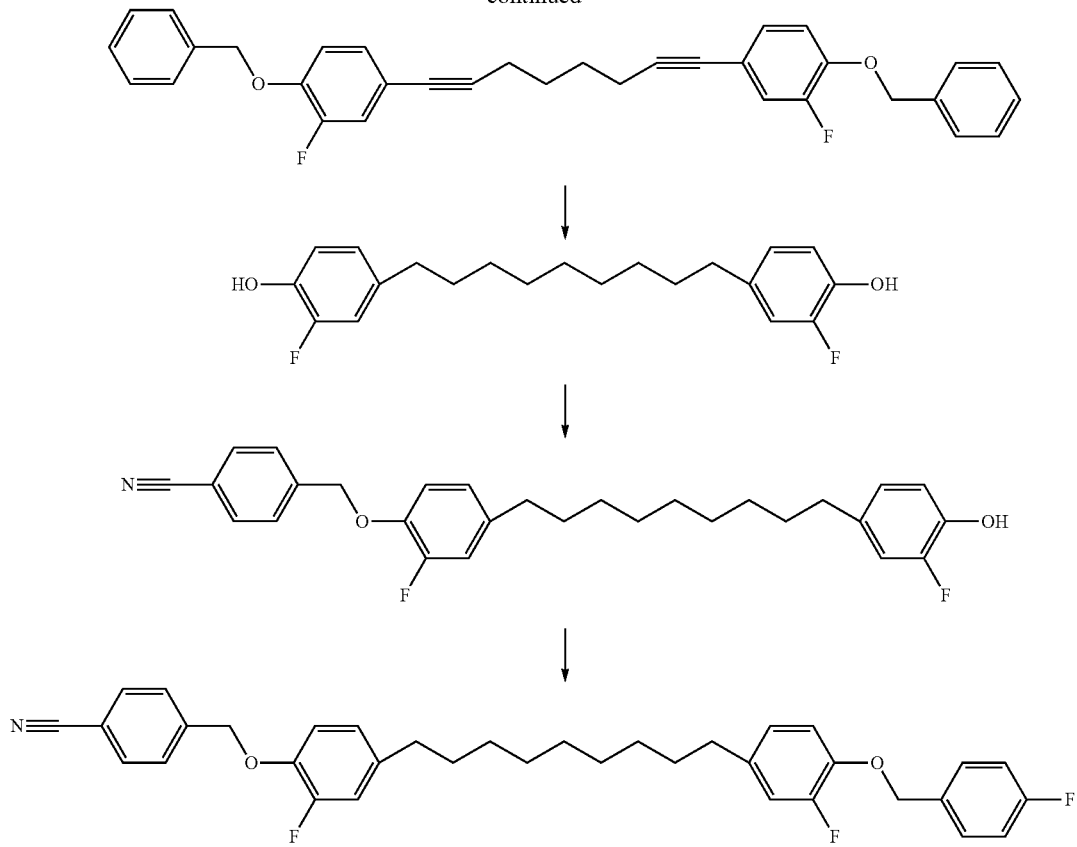

Synthesis Example 3

Steps 3.1 to 3.3 are identical to those of Synthesis example 2.

Step 3.4

The product of the synthesis example 2, step 2.3 (2.50 g, 7.18 mmol), 4-bromomethyl-benzonitrile (2.81 g, 14.4 mmol) and potassium carbonate (1.79 g, 19.9 mmol) are mixed together in ethylmethylketone (50 ml). The reaction mixture is heated under reflux at 80° C. for 12 hours. The reaction-mixture is then cooled and the solid precipitate formed is filtered off under vacuum, the filter pad is washed with ether then the solution is concentrated under reduced pressure. The crude product is purified by chromatography through silica, eluted with 30% DCM in petroleum ether (40-60). The material is then re-crystallised from acetonitrile to yield the desired non symmetrical intermediate alcohol.

Step 3.5

The product from the previous step, step 3.4 (2.15 g, 4.64 mmol), 1-bromomethyl-4-fluorobenzene (1.05 g, 5.56 mmol) and potassium carbonate (1.92 g, 14.0 mmol) are mixed together in ethylmethylketone (50 ml). The reaction mixture is heated under reflux at 80° C. for 18 hours. The reaction-mixture is then cooled and solids filtered off under vacuum, the filter pad is washed with diethyl ether then concentrated under reduced pressure. The crude product is purified by chromatography through silica, eluted with 30% DCM in petroleum ether (40-60). The material was then re-crystallised twice from acetonitrile to afford the product.

Scheme for Synthesis Example 4-Preparation of N-PQIP-9-PQP-N

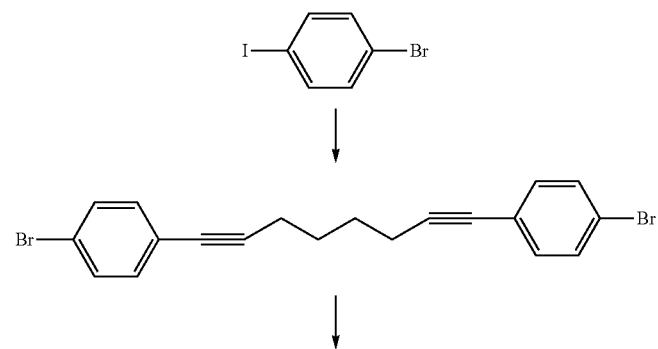

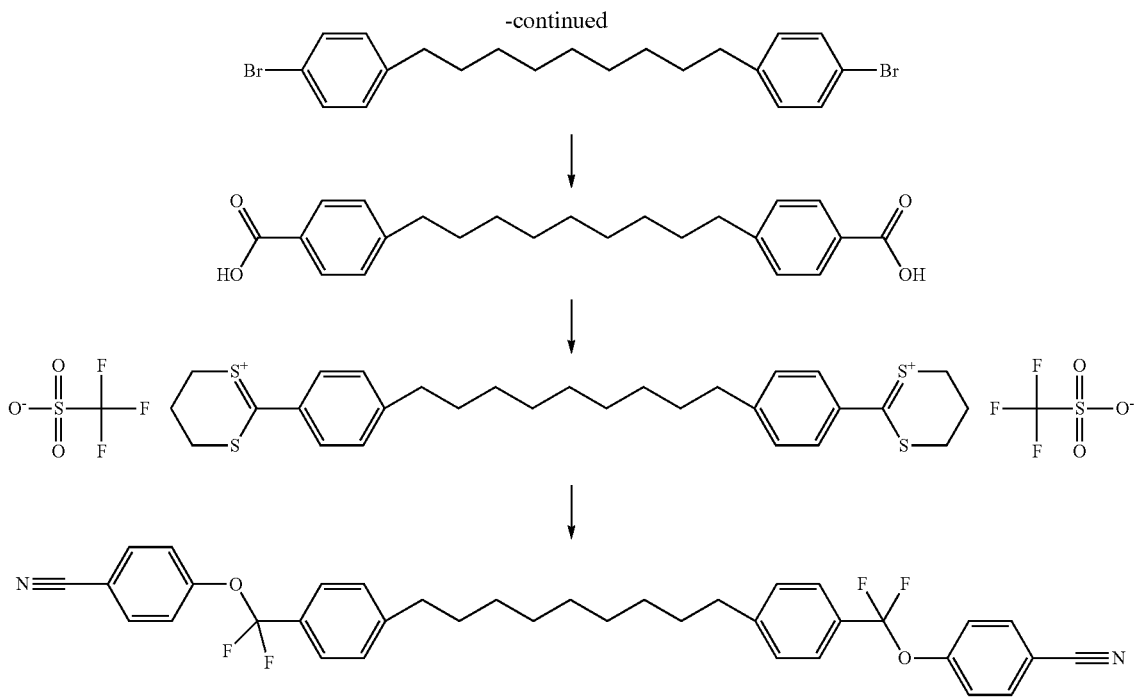

Step 4.1

25.0 g (88.4 mmol) of iodobromobenzene and 80 ml tetrahydrofuran are added to a reaction flask, which is evacuated three times and subsequently filled with nitrogen each time, then "ultasonicated" for 10 min. with additional evacuation/purging with nitrogen. $Pd(PPh_3)_2Cl_2$ (0.9 g, 1.3 mmol) and CuI (0.2 g, 1.1 mmol) as catalysts and diisopropylamine (14 ml) are added and the reaction vessel is purged again before being placed back in an ultrasonic bath for 10 minutes and then placed in a large water bath to control the reaction temperature.

1,8-nonadiyne (5.0 g, 41.6 mmol) is mixed with tetrahydrofuran (20 ml) and added slowly over a time span of 15 minutes. A fine precipitate is formed. The reaction mixture is stirred overnight at ambient temperature. The reaction mixture is then filtered under vacuum and the filter pad washed with tetrahydrofuran. The filtrate is concentrated to a semi-solid, which is re-dissolved in dichloromethane before being passed through a silica column for purification. The target product is eluted with additional dichloromethane to afford a yellow crystalline solid.

Step 4.2

The hydrogenation reaction is performed in an "H-Cube"-hydrogenation apparatus. The parameters of the reaction are as follows: Flow rate: 7 ml/min., Mode: 100% $H_2$, Catalysts: Pt/C, Temperature: 50° C., and Pressure: 30 bar.

Step 4.3

Anhydrous tetrahydrofuran is charged into a three neck flask together with 9.4 g (19.8 mmol) of the dibromide from the previous stage. The flask is evacuated and filled with nitrogen. The reaction mixture is stirred and cooled to a temperature of −75° C. in a bath of acetone cooled by solid $CO_2$.

Then n-butyl lithium (1.6 M, 31 ml, 49.5 mmol) are added drop wise over a time span of 30 minutes while keeping the temperature at −75° C. After 3 hours further stirring 8.7 g (200 mmol) of crushed, solid $CO_2$ are cautiously added to the reaction mixture. A thick white sludge develops and this is stirred for a further 30 minutes before it is hydrolysed by the addition of dilute HCl. The mixture is extracted three times with diethyl ether, and the combined organic material washed with water until neutral. Then toluene is added and the whole solvent is solution is evaporated. The solid the product is isolated and used in the following without further purification.

Step 4.4

The intermediate product from the previous stage (5.5 g, 15 mmol) and propandithiol (3.6 g, 33 mmol) are added to flask before adding trifluoromethanesulphonic acid (6.8 g, 45 mmol) and starting to stir the mixture. The mixture is heated to 120° C. and the now clear orange mixture is then cooled to ambient before being treated with diethyl ether (300 ml). The resultant solution is added to a flask of vigorously stirred diethyl ether (700 ml) pre-cooled to −70° C. Within 30 minutes fine crystals appear in the stirred mixture. The solid is isolated by filtration under vacuum and washed with ether to give a pale yellow powder which is used immediately.

Step 4.5

The intermediate (10.1 g 12 mmol) from the previous stage is added to a flask with dichloromethane (50 ml) and then cooled to −70° C. A mixture of 4-cyanophenol (3.5 g, 30 mmol), dichloromethane (40 ml) and triethylamine (3.5 g, 34 mmol) is added dropwise. After 90 minutes further stirring triethylaminehydrogen fluoride (20 g, 125 mmol) is added dropwise. After a further hour of stirring bromine (19.9 g, 125 mmol) in dichloromethane (100 ml) is added dropwise. The reaction mixture is stirred for 30 minutes and allowed to warm to −30° C. before adding morpholine (10.9 g, 125 mmol) and finally warming to 0° C. where it is stirred for a further time span of 1 hour. The mixture is carefully poured onto a mixture of ice, water and potassium hydroxide, and the layers are separated. The organic material is washed with water, dried over sodium sulphate and concentrated in vacuo. The crude material is purified by flash chromatography, eluting with a solution of 30% DCM in petroleum ether. Final purification is carried out by repeated re-crystallisation from acetonitrile to afford the desired product.

Scheme for Synthesis Example 5—Preparation of N-PQIG-9-GQP-N

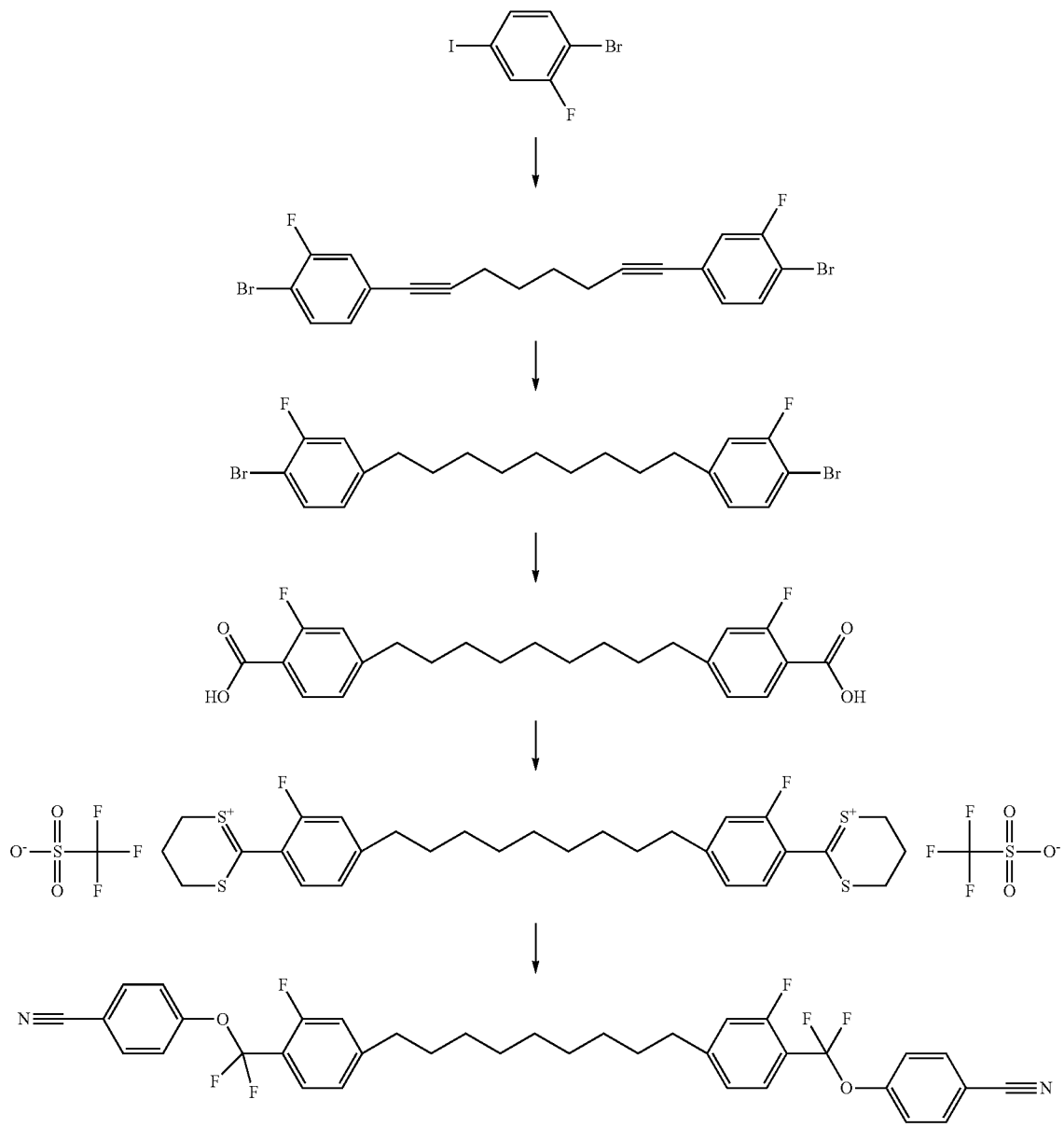

Steps 5.1 to 5.3 are identical to the respective steps of Synthesis Example 1.

Step 5.4

The intermediate product of Synthesis Example 1, step 1.3 (5.5 g, 15 mmol) and propandithiol (3.6 g, 33 mmol) are added to flask before adding trifluoromethanesulphonic acid (6.8 g, 45 mmol) and starting to stir the mixture. The mixture is heated to 120° C. and the then clear orange mixture is cooled to ambient before being treated with diethyl ether (300 ml). The resultant solution is added to a flask of vigorously stirred diethyl ether (700 ml) pre-cooled to −70° C. Within 30 minutes fine crystals appear in the stirred mixture. The solid is isolated by filtration under vacuum and washed with ether to give a pale yellow powder which is used immediately.

Step 5.5

The intermediate (10.1 g 12 mmol) from the previous step is added to a flask with dichloromethane (50 ml) and then cooled to −70° C. A mixture of 4-cyanophenol (3.5 g, 30 mmol), dichloromethane (40 ml) and triethylamine (3.5 g, 34 mmol) is added dropwise. After 90 minutes further stirring triethylaminehydrogen fluoride (20 g, 125 mmol) is added dropwise. After a further hour of stirring bromine (19.9 g, 125 mmol) in dichloromethane (100 ml) is added dropwise. The reaction mixture is stirred for 30 minutes and allowed to warm to −30° C. before adding morpholine (10.9 g, 125 mmol) and finally warming to 0° C. where it is stirred for a further time span of 1 hour. The mixture is carefully poured onto a mixture of ice, water and potassium hydroxide, and the layers are separated. The organic material is washed with water, dried over sodium sulphate and concentrated in vacuo. The crude material is purified by flash chromatography, eluting with a solution of 30% DCM in petroleum ether. Final purification is carried out by repeated re-crystallisation from acetonitrile to afford the desired product.

Scheme for Synthesis Example 6—Preparation of Chiral

The residue is then dissolved in 150 ml ethanol and heated for 3 hours under reflux.

The solution is drained and cooled in an ice bath. The resulting crystals are filtered off and dried under ambient atmosphere.

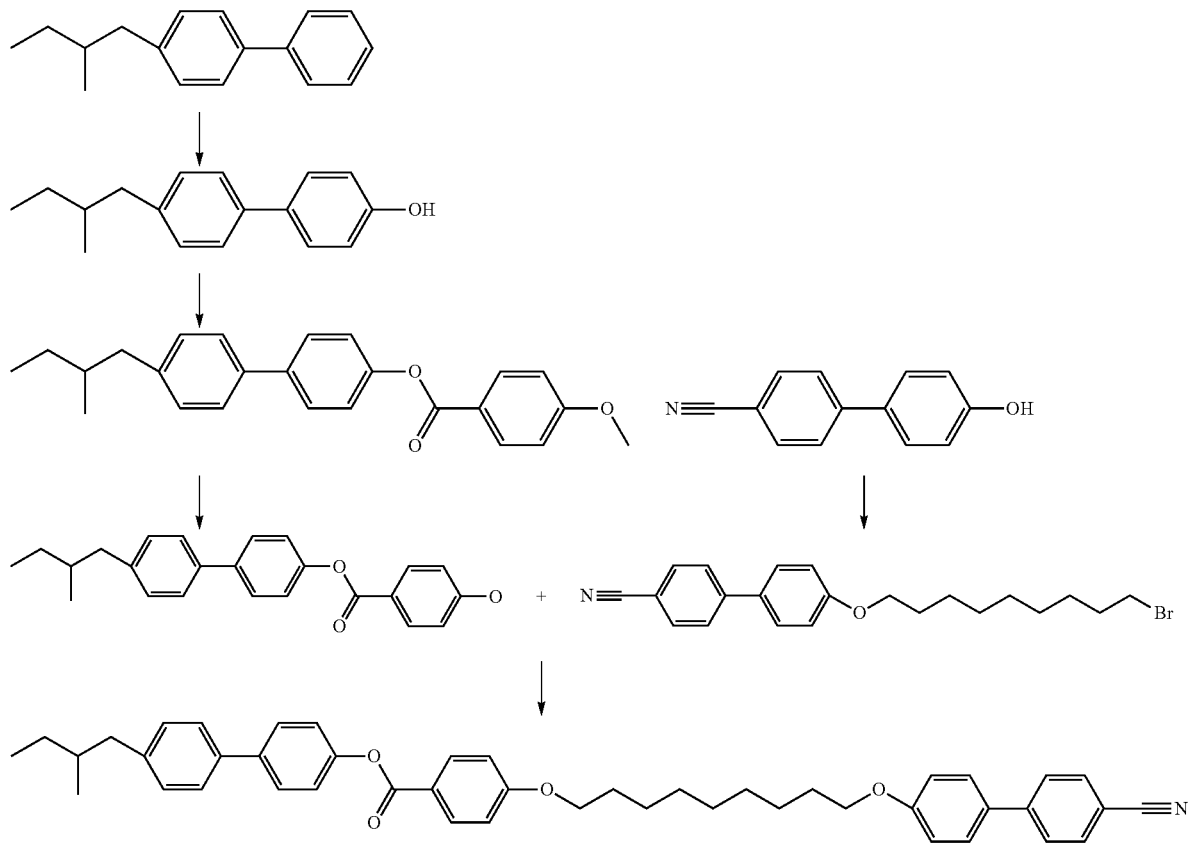

Step 6.1

Step 6.2

Methylbutylbiphenyl (44.8 g, 0.2 mol), dichloromethane (250 ml), tetraethyl-ammonium bromide (2.1 g, 10 mmol) and hydrogen bromide (51.6 g, 0.3 mol) are introduced into a reaction flask and cooled to 0° C. Hydrogen peroxide (48.6 g, 0.5 mol) is added with a dosage of 0.1 ml/min.

After the reaction is shown to have completed (by TLC analysis), the reaction is cooled to 0-10° C. and sodium sulfite (17.8 g, 014 mol) as an aqueous solution is added until de-coloration occurs. Thereby, the temperature is maintained at 10° C. The solution turns green. Then the reaction mixture is stirred for 2 hours. Subsequently a 10% sodium carbonate solution is prepared and added. The resultant two phases are separated. The aqueous phase is extracted with 100 ml of dichloromethane and added to the organic phase. The material is washed with sodium carbonate solution and then water before being concentrated in vacuo.

To a stirred solution of the cyano biphenol (25.0 g, 128 mmol) in acetone (625 ml), potassium carbonate (37.5 g, 271 mmol) is added, heated under reflux for 1 hour under a nitrogen atmosphere, and then cooled to ambient temperature. Dibromononane (200 ml, 961 mmol) is then added in a single portion. The reaction mixture is heated again to reflux. After heating under reflux overnight the reaction was cooled and filtered under vacuum, the filter pad washed with dcm, and the filtrate evaporated under reduced pressure to afford the crude material. This was vacuum distilled on Kugelrohr apparatus to remove excess dibromononane affording a solid pale yellow product.

Step 6.3

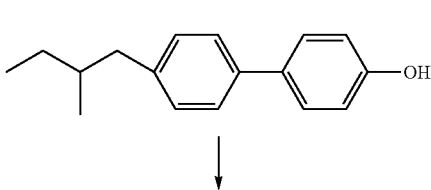

Step 6.4

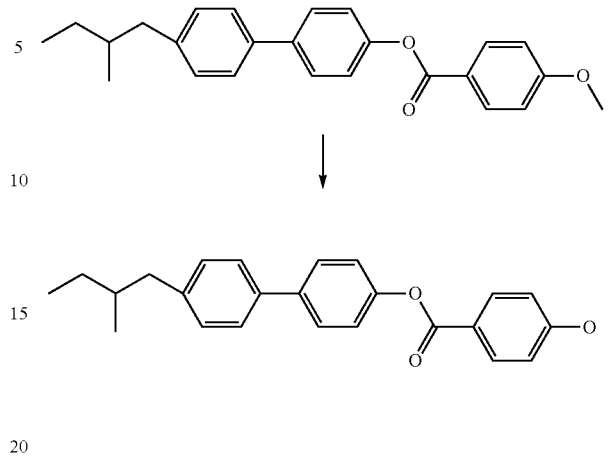

4-methoxybenzoic acid (10 g, 65.7 mmol), intermediate from step 6.1 (15.7 g, 65.3 mmol), Dicyclohexylcarbodiimide (13.5 g, 65.4 mmol), Dimethylamino pyridine (0.5 g) and Dichloromethane (250 ml) are added to a flask under nitrogen atmosphere stirred at 30° C. overnight. The progress of the reaction procedure is monitored by TLC. When the reaction appears complete, Oxalic acid (5.9 g, 65.7 mmol) is added, then the reaction mixture is filtered using vacuum and the filtrate evaporated to dryness in vacuo. The product is isolated as a white solid.

The ester from step 6.3 (20 g, 53.4 mmol) is dissolved in Dichloromethane (80 ml) and added to a suspension of aluminium chloride (35 g, 262 mmol) in Dichloromethane (80 ml) at a temperature in the range from 0° C. to −5° C. Dimethyl sulphide (21 ml, 284 mmol)) is then added dropwise, while the temperature is maintained below 0° C. and the resulting mixture (brown solution) is stirred overnight.

The reaction is quenched by the addition (which is exothermic) of (saturated) ammonium chloride solution until the resultant mixture is acidic leading to a white solid precipitate, diluted with Dichloromethane and filtered off under vacuum collecting the precipitate.

Step 6.5

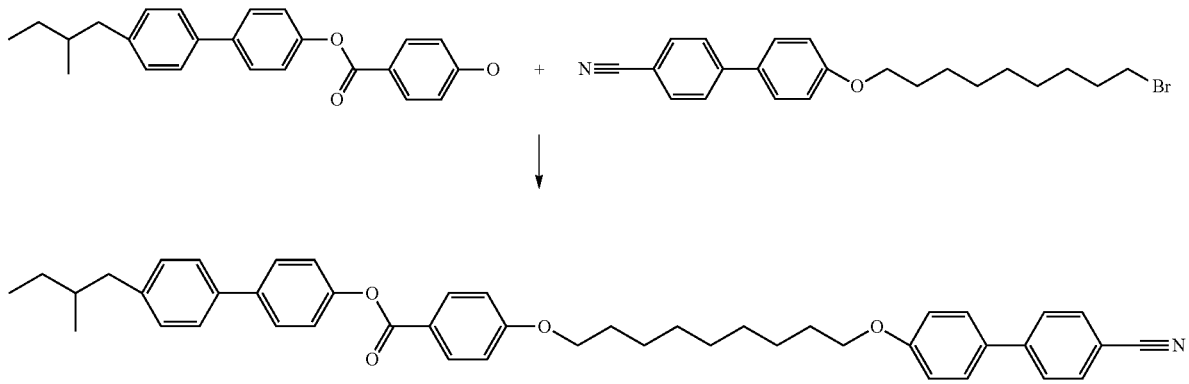

The intermediate from Step 6.4 (3.5 g, 9.71 mmol), the intermediate from step 5.2 (4.0 g, 9.9 mmol), potassium iodide (1.8 g, 10.9 mmol), potassium carbonate (0.9 g, 6.5 mmol) and dimethylformamide (100 ml) are added to a flask and heated at 100° C. under reflux for 48 hours.

The reaction is cooled, the reaction mixture poured into a mixture of dichloromethane and water, the layers are separated and the organic solution is washed with water, the organics are dried over sodium sulphate, filtered and concentrated in vacuo to yield a yellow solid.

The material is purified by column chromatography, eluting with DCM with increasing amounts of Industrial methylated spirits. The product is re-crystallized from acetone to give the final material.

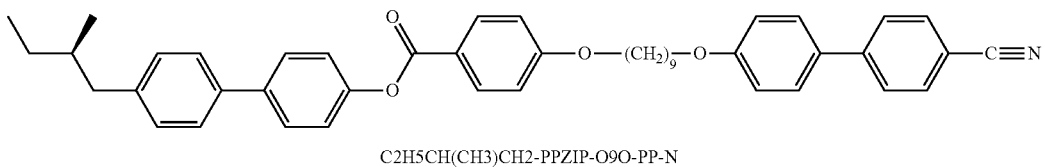

C2H5CH(CH3)CH2-PPZIP-O9O-PP-N

Phase sequence: to be determined.

Compound Examples 7 to 24

The following compounds of formula I are prepared analogously.

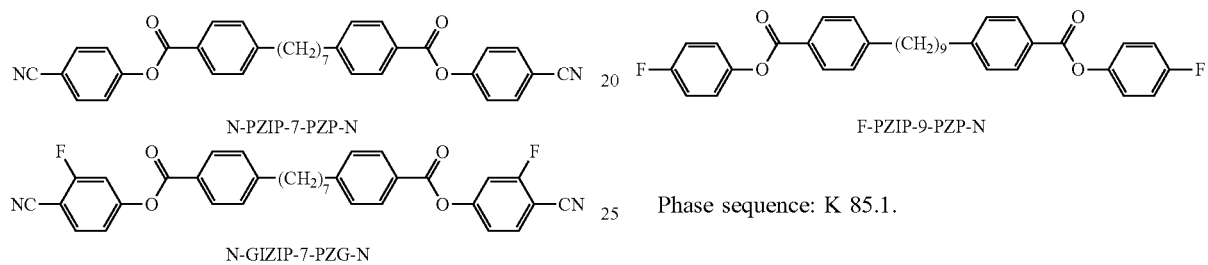

N-PZIP-7-PZP-N

N-GIZIP-7-PZG-N

Phase sequence: K 108.7 (N₂ 60 N 86) I.

N-PZIP-9-PZP-N

Phase sequence: K 118.6 N 135.8 I.

N-GIZIP-9-PZG-N

N-PZIGI-9-GZP-N

-continued

N-GIZIGI-9-GZG-N

F-PZIP-9-PZP-N

Phase sequence: K 85.1.

F-GIZIP-9-PZG-F

F-PZIGI-9-GZP-F

F-GIZIGI-9-GZG-F

F-UIZIP-9-PZU-F

Phase sequence: K 69.9 I.

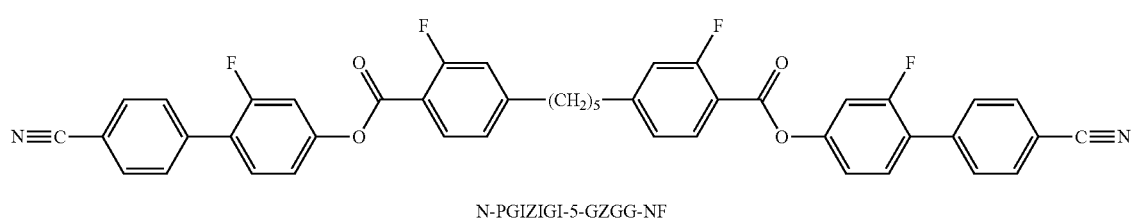

N-PGIZIGI-5-GZGG-NF

-continued
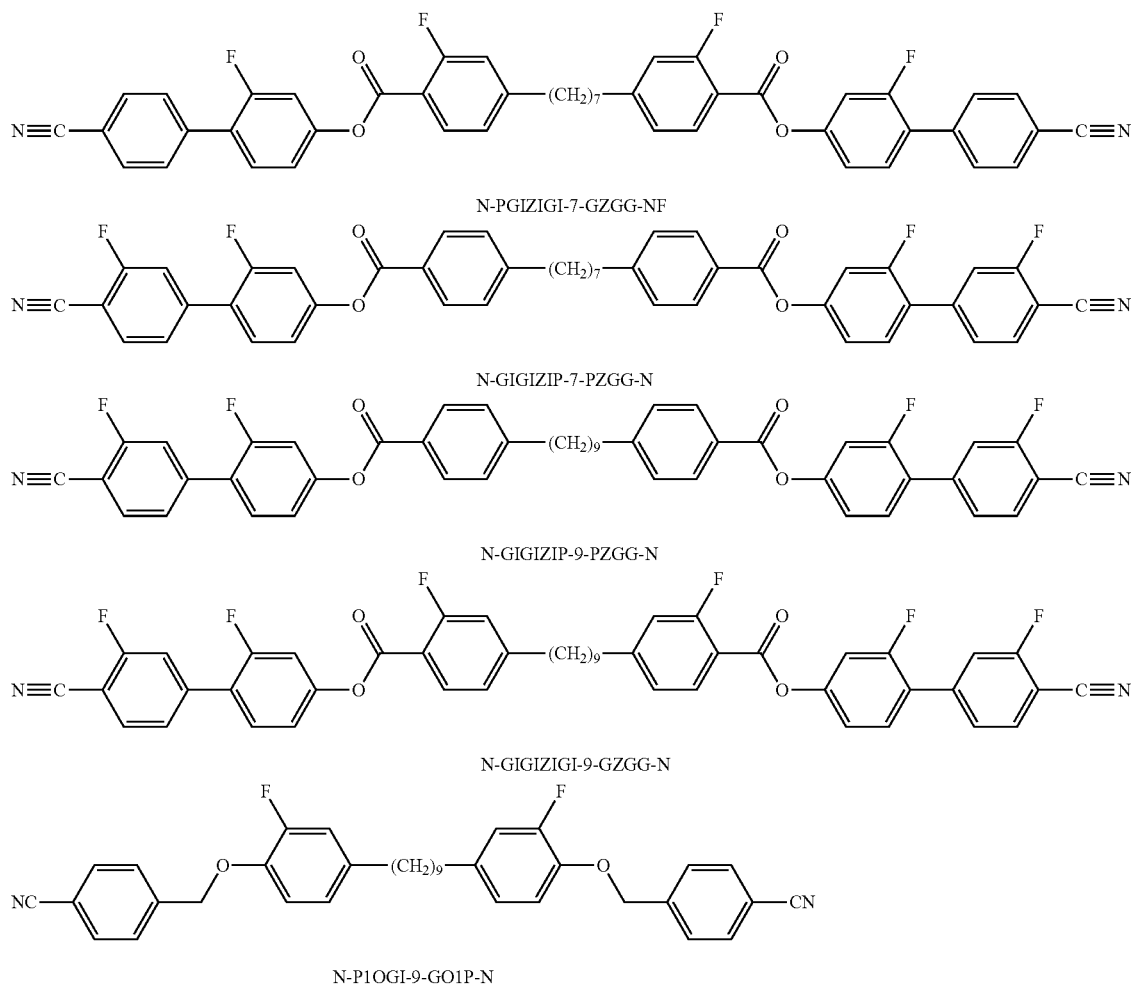
Phase sequence: K 109.81 I.
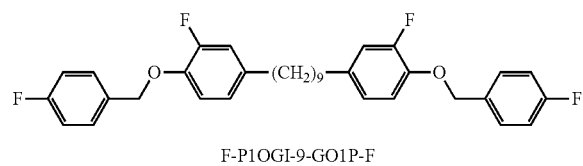
Phase sequence: K 77.5 I.
The materials in the above table generally showed increased performance in the screening mixtures, as compared to known, rather conventional bimesogenic compounds.
Example 25
General Synthesis Scheme for Compounds of Formula A-II Wherein $R^{21}$-$MG^{21}$- and $R^{22}$-$MG^{22}$- in Formula A-II are Identical to Each Other
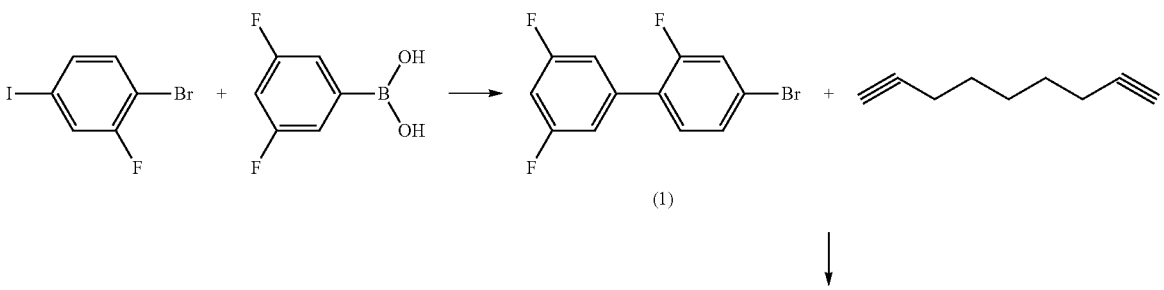

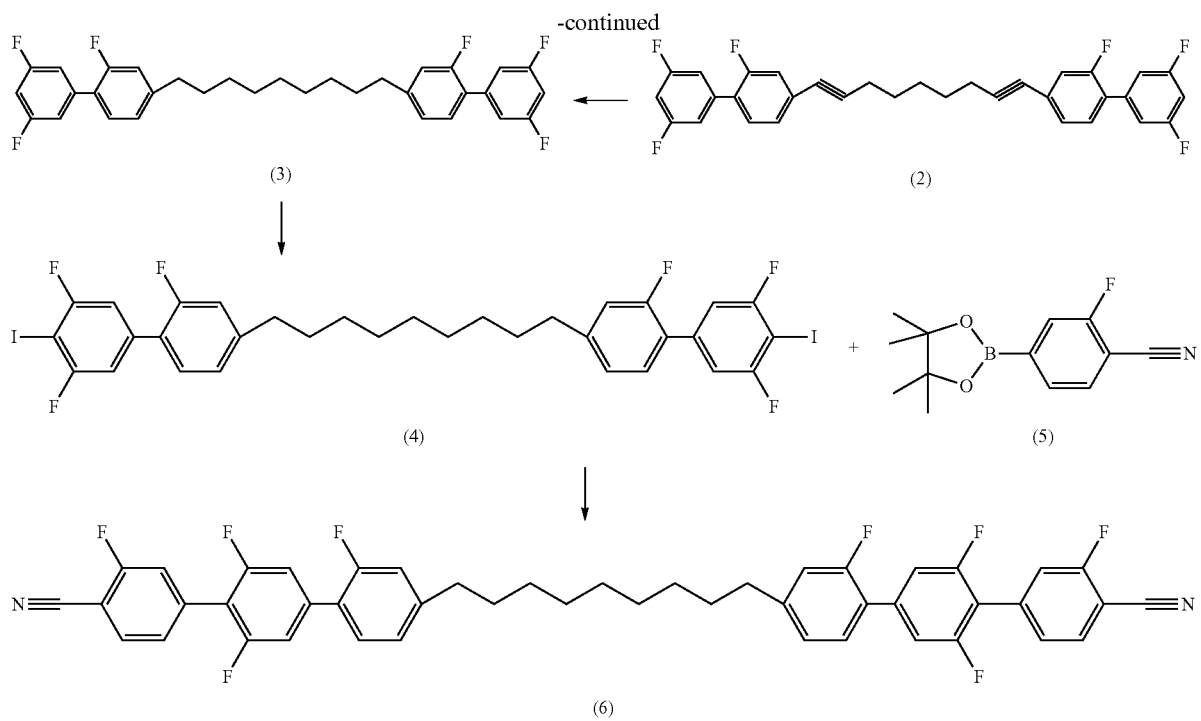

Step 25.1: Synthesis of (1)

1-bromo-3-fluoroiodobenzene (53.3 g, 0.177 mol) is added to a round bottom flask with 3,5-difluorobenzenboronic acid (29.0 g, 0.184 mol). Tetrahydrofuran (500 ml) is added and the mixture is stirred under nitrogen until dissolved. A solution of potassium carbonate (36.7 g, 0.265 mol) in water (100 ml) is added to the reaction. A catalyst, bis(triphenylphosphine)-palladium(II) dichloride (1.98 g, 2.83 mmol) is added and the reaction is heated to reflux for 18 hours. The reaction is cooled and diluted with water before being acidified with dilute Hydrochloric acid. The layers are separated and the organics are washed with water before being concentrated to obtain the product as a brown solid.

The crude solid is dissolved in Dichloromethane and adsorbed onto silica gel (100 g) by concentration. The material is purified by column chromatography, eluting with a mixture of petroleum spirit (40-60° C.) and dichloromethane to obtain a purified product as a yellow solid.

Step 25.2: Synthesis of (2)

2,-3'-5'-trifluoro-4-bromobiphenyl (26.1 g, 0.091 mol) is added to a round bottomed flask. Triethylamine (25.0 ml) and tetrahydrofuran (50.0 ml) is added and the whole evacuated and replaced with nitrogen. Copper(I)iodide (0.404 g, 2.12 mmol) and bis(triphenylphosphine)-palladium(II) dichloride (0.71 g, 1.01 mmol) are added, the reaction is evacuated and replaced with nitrogen. The reaction mixture is heated to 40° C. and 1,8-nonadiyne (5.25 g, 0.044 mol) is slowly added over 30 minutes. The mixture is heated for a further 24 hours at 40° C. followed by 48 hours at 80° C.

The reaction mixture is cooled and filtered under vacuum to remove precipitates. The filtrate is acidified with dilute Hydrochloric acid and extracted with diethyl ether. The organic material is washed with water before concentrating to afford the product as a black solid (26.0 g). The crude solid is dissolved in dichloromethane and adsorbed onto 50.0 g silica gel. The material is purified by column chromatography, eluting the product using a mixture of dichloromethane in petrol.

Step 25.3: Synthesis of (3)

The material (2) (21.5 g, 0.040 mol) is dissolved in Tetrahydrofuran (600 ml) and passed through a Thales nano hydrogenator. The material required conditions of 70 bar pressure and 60° C. to produce the product as pale colored solid.

Step 25.4: Synthesis of (4)

Material (3) (21.5 g, 0.04 mol) is added to a round bottom flask with Tetrahydrofuran (150 ml). The reaction is stirred under nitrogen and cooled to −70° C. n-Butyl Lithium solution (1.6 M in hexanes, 55.0 ml, 0.087 mol) is slowly added over 45 minutes, and the reaction stirred for a further hour at −70° C. A solution of Iodine (45.8 g, 00.179 mol) in tetrahydrofuran (125 ml) is slowly added keeping the temperature between −60 and −70° C. The reaction is stirred overnight and allowed to warm to room temperature. The reaction is quenched by slowly adding wet THF before water and then ethyl acetate is added. The layers are separated and the aqueous extracted three times with ethyl acetate. The organics are washed twice with sodium thiosulphate solution (100 ml, 2 M in water) then washed with water. Concentration afforded a brown solid. The material is purified by sequential recrystallisations from Industrial methylated spirits, acetone and acetonitrile/acetone.

Step 25.5: Synthesis of (5)

4-bromo-2-fluorobenzonitrile (42.4 g, 212 mmol) is added to a round bottom flask along with bis(pinacolato) diborane (59.8 g, 235 mmol). Potassium acetate (31.1 g, 317 mmol), tricyclohexylphosphine (3.57 g, 12.7 mmol), Tris (dibenzylideneacetone)dipalladium(0) (3.66 g, 6.36 mmol) and 1,4-dioxane (600 ml) are all added to the reaction flask and the mixture stirred under nitrogen at 80° C. for 72 hours. After cooling the reaction mixture, water and diethyl ether are added and the layers separated. The organic material is washed with brine and water before concentrating to a brown solid. The product is purified by recrystallisation from petrol/dichloromethane to obtain a brown crystalline solid.

Step 25.6: Synthesis of (6)

Material (4) (10.17 g, 12.8 mmol) and material (5) (7.70 g, 31.2 mmol) are added to a round bottom flask and dissolved in Tetrahydrofuran (250 ml). Bis(triphenylphosphine)-palladium(II) dichloride (450.6 mg, 0.642 mmol) is added along with a solution of sodium carbonate (1 M in water, 77.0 ml, 77.0 mmol). The reaction is heated to 85° C. for 24 hours, after which it is cooled and diluted with water before being acidified with dilute Hydrochloric acid. The layers are separated and the organic layer is washed with water before being concentrated to yield the product as a brown solid. The material is purified by column chromatography, eluting the product with 40% ethyl acetate in petrol. The product is further purified by recrystallisation from, first, acetone/methanol, then acetone and finally IPA/petrol.

Example 26 to 42

The following compounds of formula A-II are prepared analogously:

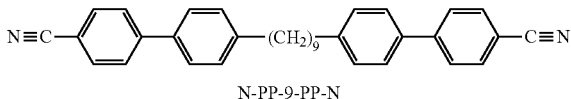

N-PP-9-PP-N

Phase sequence: K 84.1 SmC 105.7 N 122 I.

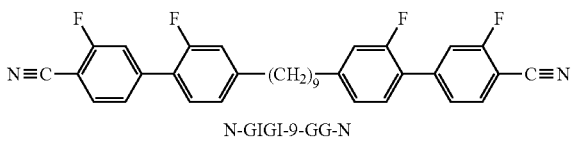

N-GIGI-9-GG-N

Phase sequence: to be determined.

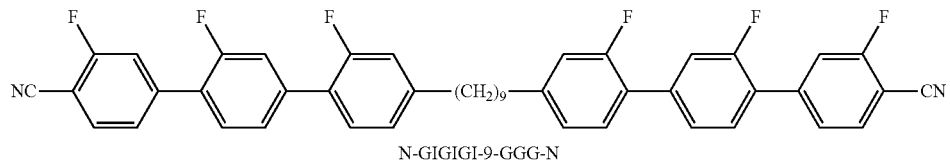

N-GIGIGI-9-GGG-N

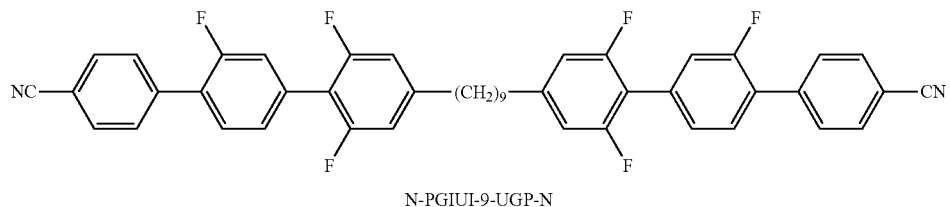

N-PGIUI-9-UGP-N

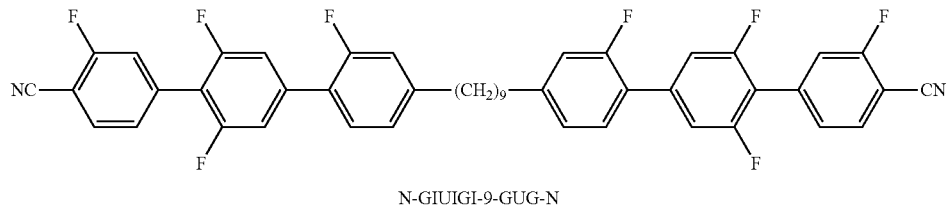

N-GIUIGI-9-GUG-N

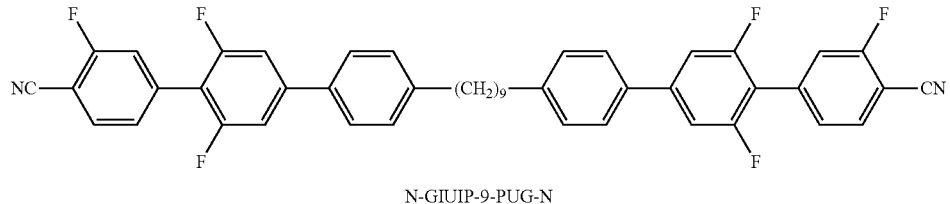

N-GIUIP-9-PUG-N

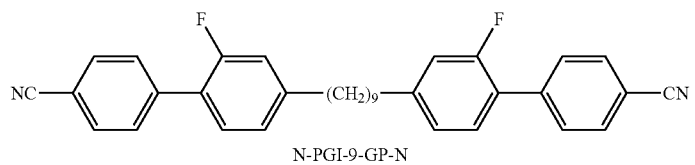

N-PGI-9-GP-N

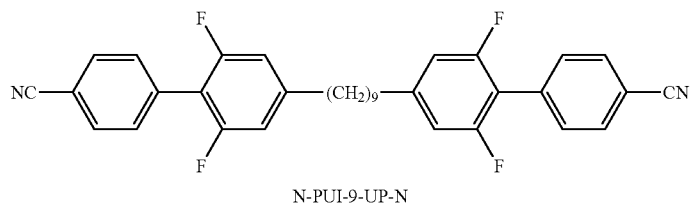

N-PUI-9-UP-N

-continued
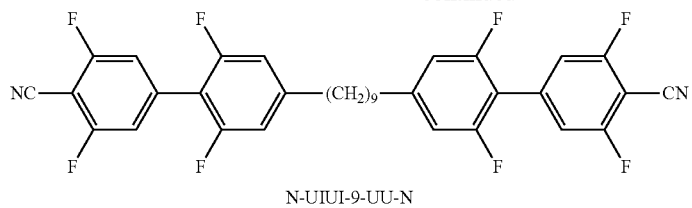
N-UIUI-9-UU-N
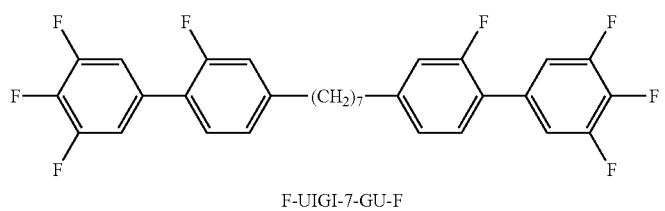
F-UIGI-7-GU-F
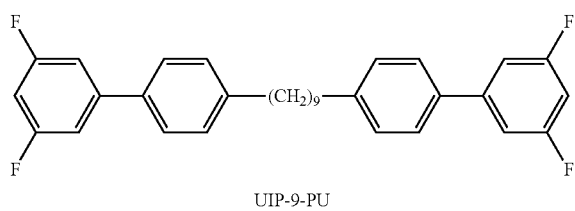
UIP-9-PU
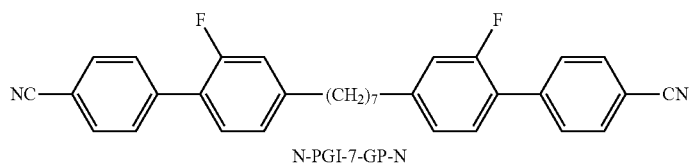
N-PGI-7-GP-N
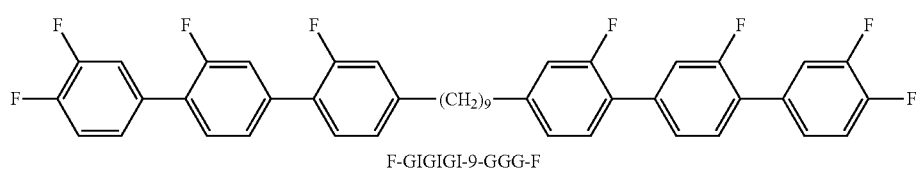
F-GIGIGI-9-GGG-F
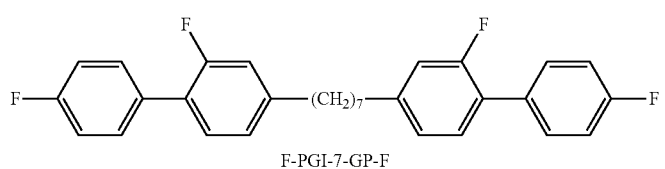
F-PGI-7-GP-F
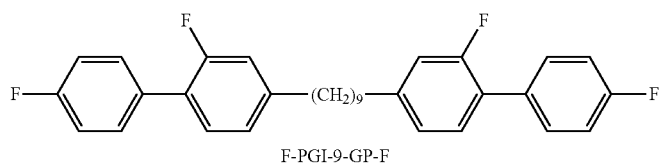
F-PGI-9-GP-F
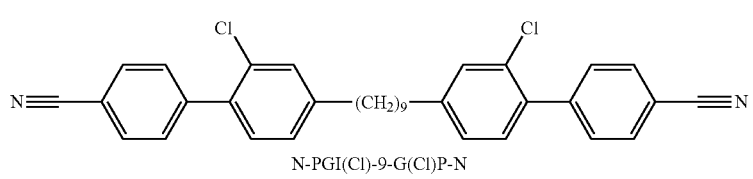
N-PGI(Cl)-9-G(Cl)P-N
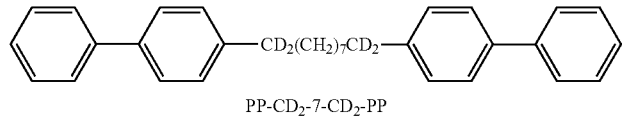
PP-CD$_2$-7-CD$_2$-PP

Example 43

General Synthesis for Compounds of Formula A-II Wherein $R^{21}$-$MG^{21}$- and $R^{22}$-$MG^{22}$- in Formula A-II are Different from One Another

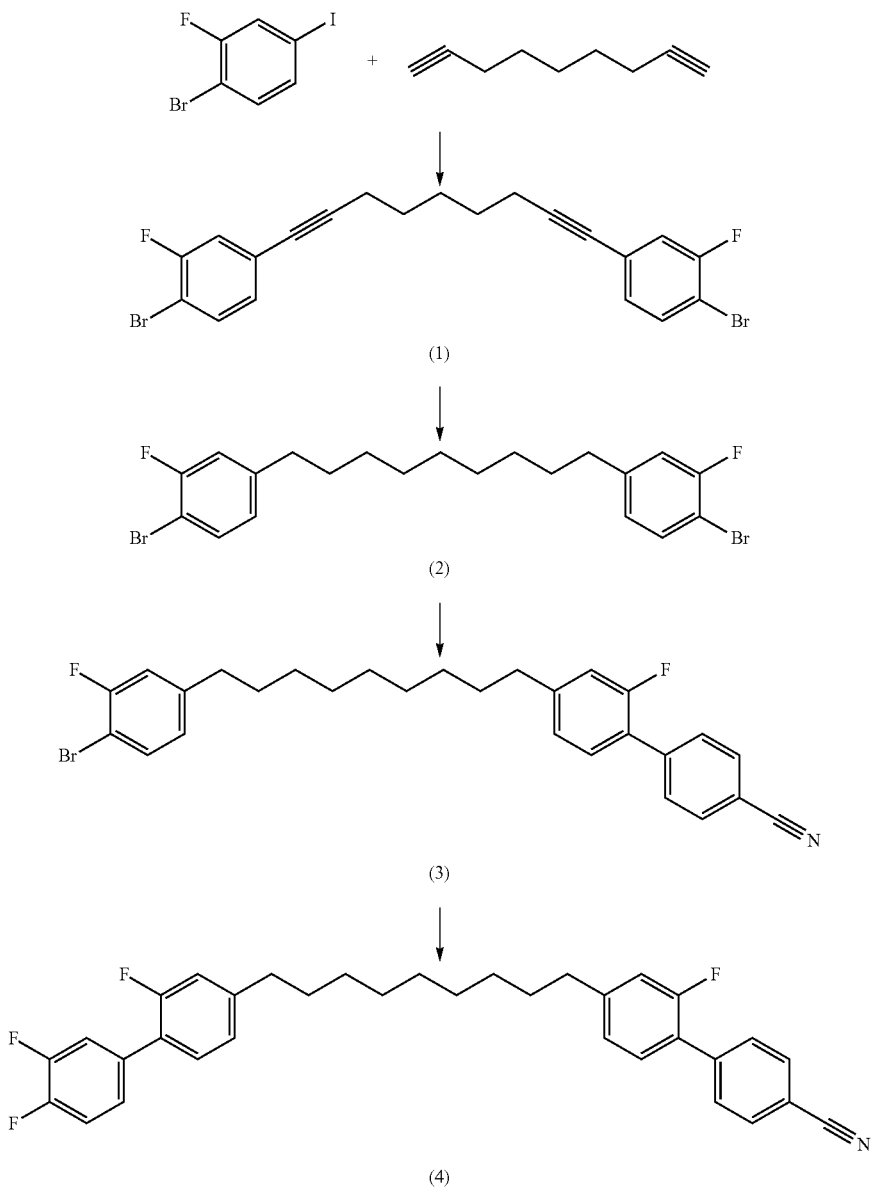

Step 43.1: Synthesis of (1)

1-bromo-3-fluoroiodobenzene (27.5 g, 92 mmol) is added to a round bottom flask with tetrahydrofuran (30 ml) and the mixture is stirred under nitrogen until dissolved. Diisopropylamine (30 ml) is added and the reaction placed in an ultrasonic bath for 10 minutes. Catalysts, bis(triphenylphosphine)palladium(II) dichloride (0.9 g, 1.28 mmol) and copper(I)iodide (0.2 g, 1.05 mmol) are added and the reaction is cooled in a water bath to 20° C. 1,8-nonadiyne (5.0 g, 41 mmol) is slowly added to the reaction and stirred for a further 20 hours. The reaction is cooled and filtered under vacuum to remove precipitates. The filtrate is acidified with diluted hydrochloric acid and extracted with diethyl ether. The organic material is washed with water before concentrating to afford the product as a black solid (19 g). The material is purified by column chromatography, eluting the product using a mixture of dichloromethane in petrol. This produces the desired product.

Step 43.2: Synthesis of (2)

Material (1) (21.5 g, 40 mmol) is dissolved in tetrahydrofuran (600 ml) and passed through a Thales nano hydrogenator. The material required conditions of 70 bar pressure and 60° C. to produce the product as pale coloured solid.

Step 43.3: Synthesis of (3)

Material (2) (14.35 g, 30.3 mmol), 4-cyanophenylboronic acid (4.45 g, 30.3 mmol), potassium phosphate (25.4 g, 120 mmol), dioxane (57.4 ml) and water (28.7 ml) are sonicated in an ultrasound bath for 30 minutes under a nitrogen atmosphere. The mixture is stirred at room temperature and Pd(DPPF)Cl$_2$-DCM complex (215 mg) are added. The mixture is heated to 90° C. for 2 hours. The mixture is cooled. The two layers are separated and the solvent from the organic layer removed in vacuo to giv a black oil. This is dissolved in a minimum of DCM and applied to a column of silica eluting with petrol: DCM, 1:1 to give the desired product.

Step 43.4: Synthesis of (4)

Material (3) (3.5 g, 7.05 mmol), 3,4-difluorobenzeneboronic acid (1.7 g, 8 mmol) potassium phosphate (1.7 g, 8 mmol), dioxane (10.6 ml) and water (5.3 ml) are sonicated in an ultrasound bath for 30 minutes under a nitrogen atmosphere. The mixture is stirred at room temperature and Pd(DPPF)Cl$_2$-DCM complex (59 mg) are added. The mixture is heated to 90° C. for 5 hours. The two layers are separated and the solvent from the organic layer removed in vacuo. This is dissolved in a minimum of DCM and applied to a column of silica, eluting with petrol: DCM, 2:1. The crude product is crystallized twice from DCM/acetonitrile (cooled with dry ice/acetone bath) and the product is dissolved in a minimum of DCM and applied to a column of silica eluting with petrol: DCM, 2:1. The crude product is crystallized from acetonitrile (cooled with dry ice/acetone bath) to give the desired product.

Another object of the invention is the use of bimesogenic compounds of formulae A-I and/or A-II and/or A-III in liquid crystalline media.

Compounds of formula A-II, when added to a nematic liquid crystalline mixture, producing a phase below the nematic. In this context, a first indication of the influence of bimesogenic compounds on nematic liquid crystal mixtures was reported by Barnes, P. J., Douglas, A. G., Heeks, S. K., Luckhurst, G. R., Liquid Crystals, 1993, Vol. 13, No. 4, 603-613. This reference exemplifies highly polar alkyl spacered dimers and perceives a phase below the nematic, concluding it is a type of smectic.

A photo evidence of an existing mesophase below the nematic phase was published by Henderson, P. A., Niemeyer, O., Imrie, C. T. in Liquid Crystals, 2001, Vol. 28, No. 3, 463-472, which was not further investigated.

In Liquid Crystals, 2005, Vol. 32, No. 11-12, 1499-1513 Henderson, P. A., Seddon, J. M. and Imrie, C. T. reported, that the new phase below the nematic belonged in some special examples to a smectic C phase. A additional nematic phase below the first nematic was reported by Panov, V. P., Ngaraj, M., Vij, J. K., Panarin, Y. P., Kohlmeier, A., Tamba, M. G., Lewis, R. A. and Mehl, G. H. in Phys. Rev. Lett. 2010, 105, 1678011-1678014.

In this context, liquid crystal mixtures comprising the new and inventive bimesogenic compounds of formulae A-I and/or A-II and/or A-III show also a novel mesophase that is being assigned as a second nematic phase. This mesophase exists at a lower temperature than the original nematic liquid crystalline phase and has been observed in the unique mixture concepts presented by this application.

Accordingly, the bimesogenic compounds of formula A-II according to the present invention allow the second nematic phase to be induced in nematic mixtures that do not have this phase normally. Furthermore, varying the amounts of compounds of formula A-II allow the phase behaviour of the second nematic to be tailored to the required temperature.

Some preferred embodiments of the mixtures according to the invention are indicated below.

Preferred are compounds of formulae A-I and/or A-II and/or A-III wherein the mesogenic groups MG$^{11}$ and MG$^{12}$, MG$^{21}$ and MG$^{22}$ and MG$^{31}$ and MG$^{32}$ at each occurrence independently from each other comprise one, two or three six-atomic rings, preferably two or three six-atomic rings.

Particularly preferred are the subformulae II-1, II-4, II-6, II-7, II-13, II-14, II-15, II-16, II-17 and II-18.

Especially preferred are the subformulae IIa, IId, IIg, IIh, IIi, IIk and IIo, in particular the subformulae IIa and IIg, wherein L is in each occurrence independently of each other preferably F, Cl, CN, OH, NO$_2$ or an optionally fluorinated alkyl, alkoxy or alkanoyl group with 1 to 7 C atoms, very preferably F, Cl, CN, OH, NO$_2$, CH$_3$, C$_2$H$_5$, OCH$_3$, OC$_2$H$_5$, COCH$_3$, COC$_2$H$_5$, COOCH$_3$, COOC$_2$H$_5$, CF$_3$, OCF$_3$, OCHF$_2$, OC$_2$F$_5$, in particular F, Cl, CN, CH$_3$, C$_2$H$_5$, OCH$_3$, COCH$_3$ and OCF$_3$, most preferably F, Cl, CH$_3$, OCH$_3$ and COCH$_3$.

Preferably R$^{11}$ and R$^{12}$, R$^{21}$ and R$^{22}$ and R$^{31}$ and R$^{32}$ in formula I are selected of H, F, Cl, CN, NO$_2$, OCH$_3$, COCH$_3$, COC$_2$H$_5$, COOCH$_3$, COOC$_2$H$_5$, CF$_3$, C$_2$F$_5$, OCF$_3$, OCHF$_2$, and OC$_2$F$_5$, in particular of H, F, Cl, CN, OCH$_3$ and OCF$_3$, especially of H, F, CN and OCF$_3$.

Typical spacer groups (Sp) are for example —(CH$_2$)$_o$—, —(CH$_2$CH$_2$O)$_p$—CH$_2$CH$_2$—, with o being an integer from 5 to 40, in particular from 5 to 25, very preferably from 5 to 15, and p being an integer from 1 to 8, in particular 1, 2, 3 or 4.

Especially media comprise one or more compounds of formula A-I wherein R$^{11}$-MG$^{11}$- and R$^{12}$-MG$^{12}$- are identical to each other.

In another preferred embodiment of the present invention the media media comprise one or more to compounds of formula A-I wherein R$^{11}$-MG$^{11}$- and R$^{12}$-MG$^{12}$- are different from one another.

Especially media comprise one or more compounds of formula A-II wherein R$^{21}$-MG$^{21}$- and R$^{22}$-MG$^{22}$- are identical to each other.

In another preferred embodiment of the present invention the media media comprise one or more to compounds of formula A-II wherein R$^{21}$-MG$^{21}$- and R$^{22}$-MG$^{22}$- are different from one another.

Especially media comprise one or more compounds of formula A-III wherein R$^{31}$-MG$^{31}$-X$^{31}$— and R$^{32}$-MG$^{32}$-X$^{32}$— are identical to each other.

In another preferred embodiment of the present invention the media comprise one or more to compounds of formula A-III wherein R$^{31}$-MG$^{31}$-X$^{31}$— and R$^{32}$-MG$^{32}$-X$^{32}$— are different from one another.

Especially preferred are compounds of formula A-III wherein the mesogenic groups MG$^{31}$ and MG$^{32}$ comprise one, two or three six-atomic rings very preferably are the mesogenic groups selected from formula II as listed below.

For MG$^{31}$ and MG$^{32}$ in formula A-III are particularly preferred are the subformulae II-1, II-4, II-6, II-7, II-13, II-14, II-15, II-16, II-17 and II-18. In these preferred groups Z in each case independently has one of the meanings of Z$^1$ as given in formula II. Preferably Z is —COO—, —OCO—, —CH$_2$CH$_2$—, —C≡C— or a single bond.

Very preferably the mesogenic groups MG$^{31}$ and MG$^{32}$ are selected from the formulae IIa to IIo and their mirror images.

Particularly preferred for MG$^{31}$ and MG$^{23}$ are the subformulae IId, IIg, IIh, IIi, IIk and IIo, in particular the subformulae IId and IIk.

In case of compounds with a non-polar group, R$^{11}$, R$^{12}$, R$^{21}$, R$^{22}$, R$^{31}$ and R$^{32}$ are preferably alkyl with up to 15 C atoms or alkoxy with 2 to 15 C atoms.

If In case of compounds with an non-polar group, R$^{11}$, R$^{12}$, R$^{21}$, R$^{22}$, R$^{31}$ or R$^{32}$ is an alkyl or alkoxy radical, i.e. where the terminal CH$_2$ group is replaced by —O—, this may be straight-chain or branched. It is preferably straight-chain, has 2, 3, 4, 5, 6, 7 or 8 carbon atoms and accordingly is preferably ethyl, propyl, butyl, pentyl, hexyl, heptyl, octyl, ethoxy, propoxy, butoxy, pentoxy, hexoxy, heptoxy, or octoxy, furthermore methyl, nonyl, decyl, undecyl, dodecyl, tridecyl, tetradecyl, pentadecyl, nonoxy, decoxy, undecoxy, dodecoxy, tridecoxy or tetradecoxy, for example.

Oxaalkyl, i.e. where one $CH_2$ group is replaced by —O—, is preferably straight-chain 2-oxapropyl (=methoxymethyl), 2- (=ethoxymethyl) or 3-oxabutyl (=2-methoxyethyl), 2-, 3-, or 4-oxapentyl, 2-, 3-, 4-, or 5-oxahexyl, 2-, 3-, 4-, 5-, or 6-oxaheptyl, 2-, 3-, 4-, 5-, 6- or 7-oxaoctyl, 2-, 3-, 4-, 5-, 6-, 7- or 8-oxanonyl or 2-, 3-, 4-, 5-, 6-, 7-, 8- or 9-oxadecyl, for example.

Preferred spacer groups are pentylene, hexylene, heptylene, octylene, nonylene, decylene, undecylene, dodecylene, octadecylene, diethyleneoxyethylene, dimethyleneoxybutylene, pentenylene, heptenylene, nonenylene and undecenylene, for example.

Especially preferred are inventive compounds of formula A-I and A-II and A-III wherein $Sp^1$ respectively $Sp^2$, respectively $Sp^3$ is denoting alkylene with 5 to 15 C atoms. Straight-chain alkylene groups are especially preferred.

Particularly preferred media according to the invention comprise at least one or more chiral dopants which themselves do not necessarily have to show a liquid crystalline phase and give good uniform alignment themselves.

The compounds of formula C-II and their synthesis are described in WO 98/00428. Especially preferred is the compound CD-1, as shown in table D below. The compounds of formula C-III and their synthesis are described in GB 2 328 207.

Especially preferred are chiral dopants with a high helical twisting power (HTP), in particular those disclosed in WO 98/00428.

Further typically used chiral dopants are e.g. the commercially available R/S-5011, CD-1, R/S-811 and CB-15 (from Merck KGaA, Darmstadt, Germany).

The above mentioned chiral compounds R/S-5011 and CD-1 and the (other) compounds of formulae C-I, C-II and C-III exhibit a very high helical twisting power (HTP), and are therefore particularly useful for the purpose of the present invention.

The liquid crystalline medium preferably comprises preferably 1 to 5, in particular 1 to 3, very preferably 1 or 2 chiral dopants, preferably selected from the above formula C-II, in particular CD-1, and/or formula C-III and/or R-5011 or S-5011, very preferably the chiral compound is R-5011, S-5011 or CD-1.

The amount of chiral compounds in the liquid crystalline medium is preferably from 1 to 20%, in particular from 1 to 15%, very preferably 1 to 10% by weight of the total mixture.

Further preferred are liquid crystalline media comprising in component B one or more nematogens of formula B-I selected from the from the group of formulae B-I-1 to B-I-, preferably of formula B-I-2 and/or B-I-4, most preferably B-I-4

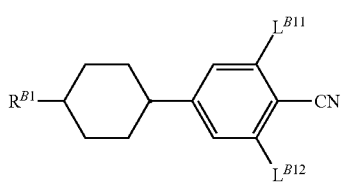

B-I-1

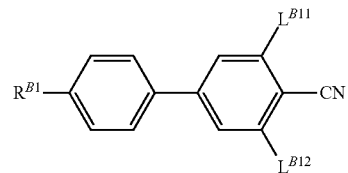

B-I-2

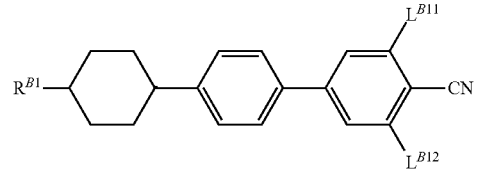

B-I-3

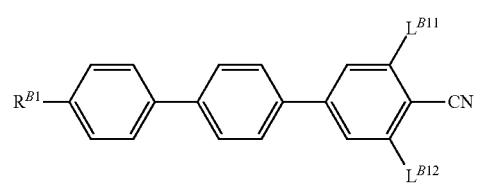

B-I-4 wherein the parameters have the meanings given above and preferably
$R^{B1}$ is alkyl, alkoxy, alkenyl or alkenyloxy with up to 12 C atoms, and
$L^{B1}$ and $L^{B1}$ are independently H or F, preferably one is H and the other H or F and most preferably both are H.

Further preferred are liquid crystalline media comprising in component B one or more nematogens of formula B-II selected from the from the group of formulae B-II-1 and B-II-2, preferably of formula B-II-2 and/or B-II-4, most preferably of formula B-II-1

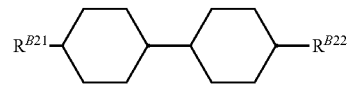

B-II-1

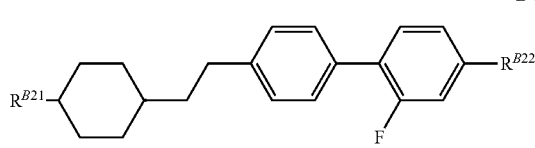

B-II-2 wherein the parameters have the meanings given above and preferably
$R^{B21}$ and $R^{B22}$ are independently alkyl, alkoxy, alkenyl or alkenyloxy with up to 12 C atoms, more preferably $R^{B21}$ is alkyl and $R^{B22}$ is alkyl, alkoxy or alkenyl and in formula B-II-1 most preferably alkenyl, in particular vinyl or 1-propenyl, and in formula B-II-2, most preferably alkyl.

Further preferred are liquid crystalline media comprising in component B one or more nematogens of formula B-III, preferably of formula B-III-1

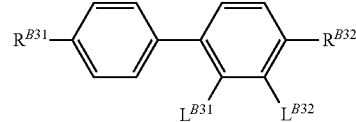

B-III-1 wherein the parameters have the meanings given above and preferably $R^{B31}$ and $R^{B32}$ are independently alkyl, alkoxy, alkenyl or alkenyloxy with up to 12 C atoms, more preferably $R^{B31}$ is alkyl and $R^{B32}$ is alkyl or alkoxy and most preferably alkoxy, and $L^{B31}$ and $L^{B32}$ are independently H or F, preferably one is F and the other H or F and most preferably both are F.

The liquid crystal media according to the present invention may contain further additives in usual concentrations. The total concentration of these further constituents is in the range of 0.1% to 10%, preferably 0.1% to 6%, based on the total mixture. The concentrations of the individual compounds used each are preferably in the range of 0.1% to 3%. The concentration of these and of similar additives is not taken into consideration for the values and ranges of the concentrations of the liquid crystal components and compounds of the liquid crystal media in this application. This also holds for the concentration of the dichroic dyes used in the mixtures, which are not counted when the concentrations of the compounds respectively the components of the host medium are specified. The concentration of the respective additives is always given relative to the final doped mixture.

The liquid crystal media according to the present invention consists of several compounds, preferably of 3 to 30, more preferably of 4 to 20 and most preferably of 4 to 16 compounds. These compounds are mixed in conventional way. As a rule, the required amount of the compound used in the smaller amount is dissolved in the compound used in the greater amount. In case the temperature is above the clearing point of the compound used in the higher concentration, it is particularly easy to observe completion of the process of dissolution. It is, however, also possible to prepare the media by other conventional ways, e.g. using so called pre-mixtures, which can be e.g. homologous or eutectic mixtures of compounds or using so called multi-bottle-systems, the constituents of which are ready to use mixtures themselves.

Particularly preferred mixture concepts are indicated below: (the acronyms used are explained in Table A).

The mixtures according to the invention preferably comprise as component A one or more compounds selected from the group of formulae A-I to A-III, preferably
one or more compounds of formula A-I and one or more compounds of formula A-II, or
one or more compounds of formula A-I and one or more compounds of formula A-III, or
one or more compounds of formula A-II and one or more compounds of formula A-III, or,
most preferred, one or more compounds of formula A-I and one or more compounds of formula A-II and one or more compounds of formula A-III,
preferably in a total concentration of 90% or less, more preferably in the range from 60 to 90%, more preferably from 70 to 90%, and most preferably from 70 to 85% by weight of the total mixture, preferably these compounds are selected from
one or more compounds of formula A-I (i.e. ether-linked dimers), preferably in a concentration of 40% or less, more preferably of 30% or less, based on component A, particularly preferred one or more compounds of formula A-I-1 to A-I-3, and especially preferred selected from the group of formulae N-GI-GIGI-O-n-O-GGG-N, in particular N-GIGIGI-9-GGG-N, if present, preferably in concentration >5%, in particular from 10 to 30%, based on component A, and/or one or more compounds of formula A-II (i.e. methylene-linked dimers), preferably in a concentration of 60% or less, more preferably of 40% or less, in exceptional cases also 80 to 100% and in these cases preferably 90 to 100%, based on component A, particularly preferred one or more compounds of formula A-II-1 to A-II-4, and especially preferred selected from the group of formulae F-UIZIP-n-PZU-F, preferably FUIZIP-7-PZU-F and/or F-UIZP-9-PZU-F, preferably in concentrations of 5% more, in particular of 10 to 20%, based on component A, and/or one or more compounds of formula A-III (e.g. ester-linked dimers), preferably in a concentration of 80% or less, more preferably of 70% or less, based on component A, particularly preferred one or more compounds of formula A-III-1 to A-III-11, and especially preferred selected from the group of formulae F-PGI-ZI-n-Z-GP-F and F-PGI-ZI-n-Z-GP-F, preferably F-PGI-7-GP-F and/or F-PGI-9-GP-F and/or N-PGI-7-GP-N and/or N-PGI-9-GP-N, preferably in concentrations of 5% or more, in particular of 15 to 30% per compound, based on component A, and/or as component B one or more compounds selected from the group of formulae B-I to B-III, preferably
one or more compounds of formula B-I and one or more compounds of formula B-II, or
one or more compounds of formula B-I and one or more compounds of formula B-III, or
one or more compounds of formula B-II and one or more compounds of formula B-III, or
one or more compounds of formula B-I and one or more compounds of formula B-II and one or more compounds of formula B-III,
preferably in a total concentration of 40% or less, preferably in the range from 5 to 40%, more preferably from 10 to 30%, and most preferably from 10 to 20% by weight of the total mixture, preferably these compounds are selected from formulae B-I and/or B-II and/or B-III, and especially preferred selected from the group of formulae PP-n-N, PPP-n-N, CC-n-V, CC-n-V1, CEPGI-n-m, PY-n-Om, CCY-n-Om, CPY-n-Om and PYP-n-(O)m, preferably PP-5-N and/or PPP-3-N and/or CC-3-V and/or CC-4-V and/or CC-5-V and/or CC-3-V1 and/or CC-4-V1 and/or CEPGI-3-2 and/or CEPGI-5-2 and/or PY-3-O4, preferably in concentrations of 1% or more, in particular in the range from 2 to 10% per compound, based on the mixture as a whole, and/or as component C one or more chiral compounds preferably in a total concentration in the range from 1 to 20%, in particular from 1 to 15%, very preferably 1 to 10% by weight of the total mixture, preferably these compounds are selected from formulae C-I, C-I I, and C-III, in particular R-5011 or S-5011 or CD-1, especially preferred they comprise
R-5011, S-5011 or CD-1, preferably in a concentration of 1% or more, in particular 1-20%, based on the mixture as a whole particularly preferred
between 1 and 3%, in particular 2%, of R-5011 or S-5011 for displays in the ULH mode and 3.5 to 5.5%, in particular 4.5%, of R-5011 or S-5011 for displays in the USH mode, or a another chiral material in a concentration leading to the same cholesteric pitch as R-5011 or S-5011 in the preferred concentrations mentioned.

Further preferred conditions for the mesogenic media are the following. They are fulfilled independently from one another and from the conditions mentioned above. Preferably, however, two, three four or more of these conditions and of the conditions mentioned above are fulfilled simultaneously.

The media preferably comprise 40% or more, preferably 60% or more, based on component B, of bimesogens comprising exactly two rings in each of their mesogenic groups.

The media preferably comprise one or more bimesogens comprising exactly three rings in each of their mesogenic groups and/or one or more bimesogens comprising exactly two rings in one of their mesogenic groups and comprising exactly three rings in their other mesogenic group.

The media preferably comprise one or more non-symmetrical bimesogens, preferably in a total concentration of 50% or more, based on component A, preferably based on the mixture as a whole.

A further, especially preferred condition is that the mixture has a low absolute value of $\Delta\in$, but preferably is dielectrically positive, especially at the temperatures between T(N,I) and 0.8 T(N,I). Preferably $\Delta\in$ preferably is dielectrically positive at the temperatures from T(N,I) to the temperatures at which the ULH texture is still stable, preferably at least down to 40° C. Preferably the value of $\Delta\in$ at these temperatures is 3 or less, more preferably in the range from 0 or more to 2 or less. In this respect it is not very important, if the value of $\Delta\in$ becomes negative at lower temperatures, then it preferably is the in the range from between −1 or more to 0 or less.

The bimesogenic compounds of formulae A-I, A-II and A-III and the liquid crystalline media comprising them can be used in liquid crystal displays, such as STN, TN, AMD-TN, temperature compensation, guest-host, phase change or surface stabilized or polymer stabilized cholesteric texture (SSCT, PSCT) displays, in particular in flexoelectric devices, in active and passive optical elements like polarizers, compensators, reflectors, alignment layers, color filters or holographic elements, in adhesives, synthetic resins with anisotropic mechanical properties, cosmetics, diagnostics, liquid crystal pigments, for decorative and security applications, in nonlinear optics, optical information storage or as chiral dopants.

The compounds of formulae A-I and/or A-II and/or A-III and the mixtures obtainable thereof are particularly useful for flexoelectric liquid crystal display. Thus, another object of the present invention is a flexoelectric display comprising one or more compounds of formulae A-I and/or A-II and/or A-III, or comprising a liquid crystal medium comprising one or more compounds of formulae A-I and/or A-II and/or A-III.

The inventive mesogenic mixtures comprising compounds of formulae A-I and/or A-II and/or A-III can be aligned in their cholesteric phase into different states of orientation by methods that are known to the expert, such as surface treatment or electric fields. For example, they can be aligned into the planar (Grandjean) state, into the focal conic state or into the homeotropic state. Inventive compounds of formula I comprising polar groups with a strong dipole moment can further be subjected to flexoelectric switching, and can thus be used in electrooptical switches or liquid crystal displays.

The switching between different states of orientation according to a preferred embodiment of the present invention is exemplarily described below in detail for a sample of an inventive mixture comprising compounds of formulae A-I and/or A-II and/or A-III.

The total concentration of all compounds in the media according to this application is 100%.

According to this preferred embodiment, the sample is placed into a cell comprising two plane-parallel glass plates coated with electrode layers, e.g. ITO layers, and aligned in its cholesteric phase into a planar state wherein the axis of the cholesteric helix is oriented normal to the cell walls. This state is also known as Grandjean state, and the texture of the sample, which is observable e.g. in a polarization microscope, as Grandjean texture. Planar alignment can be achieved e.g. by surface treatment of the cell walls, for example by rubbing and/or coating with an alignment layer such as polyimide.

A Grandjean state with a high quality of alignment and only few defects can further be achieved by heating the sample to the isotropic phase, subsequently cooling to the chiral nematic phase at a temperature close to the chiral nematic-isotropic phase transition, and rubbing the cell.

In the planar state, the sample shows selective reflection of incident light, with the central wavelength of reflection depending on the helical pitch and the mean refractive index of the material.

When an electric field is applied to the electrodes, for example with a frequency from 10 Hz to 1 kHz, and an amplitude of up to 12 $V_{rms}$/μm, the sample is being switched into a homeotropic state where the helix is unwound and the molecules are oriented parallel to the field, i.e. normal to the plane of the electrodes. In the homeotropic state, the sample is transmissive when viewed in normal daylight, and appears black when being put between crossed polarizers.

Upon reduction or removal of the electric field in the homeotropic state, the sample adopts a focal conic texture, where the molecules exhibit a helically twisted structure with the helical axis being oriented perpendicular to the field, i.e. parallel to the plane of the electrodes. A focal conic state can also be achieved by applying only a weak electric field to a sample in its planar state. In the focal conic state the sample is scattering when viewed in normal daylight and appears bright between crossed polarizers.

A sample of an inventive compound in the different states of orientation exhibits different transmission of light. Therefore, the respective state of orientation, as well as its quality of alignment, can be controlled by measuring the light transmission of the sample depending on the strength of the applied electric field. Thereby it is also possible to determine the electric field strength required to achieve specific states of orientation and transitions between these different states.

In a sample of an inventive compound of formula I, the above described focal conic state consists of many disordered birefringent small domains. By applying an electric field greater than the field for nucleation of the focal conic texture, preferably with additional shearing of the cell, a uniformly aligned texture is achieved where the helical axis is parallel to the plane of the electrodes in large, well-aligned areas. In accordance with the literature on state of the art chiral nematic materials, such as P. Rudquist et al., Liq. Cryst. 23 (4), 503 (1997), this texture is also called uniformly-lying helix (ULH) texture. This texture is required to characterize the flexoelectric properties of the inventive compound.

The sequence of textures typically observed in a sample of an inventive compound of formula I on a rubbed polyimide substrate upon increasing or decreasing electric field is given below:

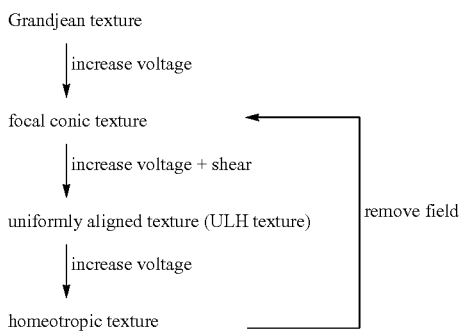

Starting from the ULH texture, the inventive flexoelectric compounds and mixtures can be subjected to flexoelectric switching by application of an electric field. This causes rotation of the optic axis of the material in the plane of the cell substrates, which leads to a change in transmission when placing the material between crossed polarizers. The flexoelectric switching of inventive materials is further described in detail in the introduction above and in the examples.

It is also possible to obtain the ULH texture, starting from the focal conic texture, by applying an electric field with a high frequency, of for example 10 kHz, to the sample whilst cooling slowly from the isotropic phase into the cholesteric phase and shearing the cell. The field frequency may differ for different compounds.

The bimesogenic compounds of formula I are particularly useful in flexoelectric liquid crystal displays as they can easily be aligned into macroscopically uniform orientation, and lead to high values of the elastic constant $k_{11}$ and a high flexoelectric coefficient e in the liquid crystal medium.

The liquid crystal medium preferably exhibits a $k_{11} < 1 \times 10^{-10}$ N, preferably $<2 \times 10^{-11}$ N and a flexoelectric coefficient $e > 1 \times 10^{-11}$ C/m, preferably $>1 \times 10^{-10}$ C/m.

Apart from the use in flexoelectric devices, the inventive bimesogenic compounds as well as mixtures thereof are also suitable for other types of displays and other optical and electrooptical applications, such as optical compensation or polarizing films, color filters, reflective cholesterics, optical rotatory power and optical information storage.

A further aspect of the present invention relates to a display cell wherein the cell walls exhibit hybrid alignment conditions. The term "hybrid alignment" or orientation of a liquid crystal or mesogenic material in a display cell or between two substrates means that the mesogenic groups adjacent to the first cell wall or on the first substrate exhibit homeotropic orientation and the mesogenic groups adjacent to the second cell wall or on the second substrate exhibit planar orientation.

The term "homeotropic alignment" or orientation of a liquid crystal or mesogenic material in a display cell or on a substrate means that the mesogenic groups in the liquid crystal or mesogenic material are oriented substantially perpendicular to the plane of the cell or substrate, respectively.

The term "planar alignment" or orientation of a liquid crystal or mesogenic material in a display cell or on a substrate means that the mesogenic groups in the liquid crystal or mesogenic material are oriented substantially parallel to the plane of the cell or substrate, respectively.

A flexoelectric display according to a preferred embodiment of the present invention comprises two plane parallel substrates, preferably glass plates covered with a transparent conductive layer such as indium tin oxide (ITO) on their inner surfaces, and a flexoelectric liquid crystalline medium provided between the substrates, characterized in that one of the inner substrate surfaces exhibits homeotropic alignment conditions and the opposite inner substrate surface exhibits planar alignment conditions for the liquid crystalline medium.

Planar alignment can be achieved e.g. by means of an alignment layer, for example a layer of rubbed polyimide or sputtered $SiO_x$, that is applied on top of the substrate.

Alternatively it is possible to directly rub the substrate, i.e. without applying an additional alignment layer. For example, rubbing can be achieved by means of a rubbing cloth, such as a velvet cloth, or with a flat bar coated with a rubbing cloth. In a preferred embodiment of the present invention rubbing is achieved by means of a at least one rubbing roller, like e.g. a fast spinning roller that is brushing across the substrate, or by putting the substrate between at least two rollers, wherein in each case at least one of the rollers is optionally covered with a rubbing cloth. In another preferred embodiment of the present invention rubbing is achieved by wrapping the substrate at least partially at a defined angle around a roller that is preferably coated with a rubbing cloth.

Homeotropic alignment can be achieved e.g. by means of an alignment layer coated on top of the substrate. Suitable aligning agents used on glass substrates are for example alkyltrichlorosilane or lecithine, whereas for plastic substrate thin layers of lecithine, silica or high tilt polyimide orientation films as aligning agents may be used. In a preferred embodiment of the invention silica coated plastic film is used as a substrate.

Further suitable methods to achieve planar or homeotropic alignment are described for example in J. Cognard, Mol. Cryst. Liq. Cryst. 78, Supplement 1, 1-77 (1981).

By using a display cell with hybrid alignment conditions, a very high switching angle of flexoelectric switching, fast response times and a good contrast can be achieved.

The flexoelectric display according to present invention may also comprise plastic substrates instead of glass substrates. Plastic film substrates are particularly suitable for rubbing treatment by rubbing rollers as described above.

Another object of the present invention is that compounds of formula I, when added to a nematic liquid crystalline mixture, produce a phase below the nematic.

Accordingly, the bimesogenic compounds of formula I according to the present invention allow the second nematic phase to be induced in nematic mixtures that do not show evidence of this phase normally. Furthermore, varying the amounts of compounds of formula I allow the phase behaviour of the second nematic to be tailored to the required temperature.

Examples for this are given and the mixtures obtainable thereof are particularly useful for flexoelectric liquid crystal display. Thus, another object of the present invention is liquid crystal media comprising one or more compounds of formula I exhibiting a second nematic phase.

Without further elaboration, it is believed that one skilled in the art can, using the preceding description, utilize the present invention to its fullest extent. The following examples are, therefore, to be construed as merely illustrative and not limitative of the remainder of the disclosure in any way whatsoever.

Unless the context clearly indicates otherwise, as used herein plural forms of the terms herein are to be construed as including the singular form and vice versa.

Throughout the description and claims of this specification, the words "comprise" and "contain" and variations of the words, for example "comprising" and "comprises", mean "including but not limited to", and are not intended to (and do not) exclude other components.

Throughout the present application it is to be understood that the angles of the bonds at a C atom being bound to three adjacent atoms, e.g. in a C=C or C=O double bond or e.g. in a benzene ring, are 120° and that the angles of the bonds at a C atom being bound to two adjacent atoms, e.g. in a C≡C or in a C≡N triple bond or in an allylic position C=C=C are 180°, unless these angles are otherwise restricted, e.g. like being part of small rings, like 3-, 5- or 5-atomic rings, notwithstanding that in some instances in some structural formulae these angles are not represented exactly.

It will be appreciated that variations to the foregoing embodiments of the invention can be made while still falling within the scope of the invention. Each feature disclosed in this specification, unless stated otherwise, may be replaced by alternative features serving the same, equivalent or similar purpose. Thus, unless stated otherwise, each feature disclosed is one example only of a generic series of equivalent or similar features.

All of the features disclosed in this specification may be combined in any combination, except combinations where at least some of such features and/or steps are mutually exclusive. In particular, the preferred features of the invention are applicable to all aspects of the invention and may be used in any combination. Likewise, features described in non-essential combinations may be used separately (not in combination).

In the foregoing and in the following examples, unless otherwise indicated, all temperatures are set forth uncorrected in degrees Celsius and all parts and percentages are by weight.

The following abbreviations are used to illustrate the liquid crystalline phase behavior of the compounds: K=crystalline; N=nematic; N2=second nematic; S=smectic; Ch=cholesteric; I=isotropic; Tg=glass transition. The numbers between the symbols indicate the phase transition temperatures in ° C.

In the present application and especially in the following examples, the structures of the liquid crystal compounds are represented by abbreviations, which are also called "acronyms". The transformation of the abbreviations into the corresponding structures is straight forward according to the following three tables A to C.

All groups $C_nH_{2n+1}$, $C_mH_{2m+1}$, and $C_lH_{2l+1}$ are preferably straight chain alkyl groups with n, m and l C-atoms, respectively, all groups $C_nH_{2n}$, $C_mH_{2m}$ and $C_lH_{2l}$ are preferably $(CH_2)_n$, $(CH_2)_m$ and $(CH_2)_l$, respectively and —CH=CH— preferably is trans-respectively E vinylene.

Table A lists the symbols used for the ring elements, table B those for the linking groups and table C those for the symbols for the left hand and the right hand end groups of the molecules.

Table D lists exemplary molecular structures together with their respective codes.

TABLE A

Ring Elements

C 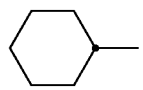

TABLE A-continued

Ring Elements

P 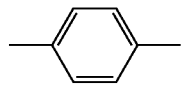

D 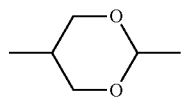

DI 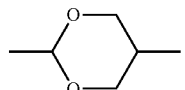

A 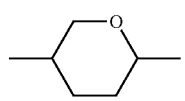

AI 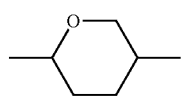

G 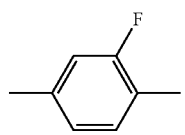

GI 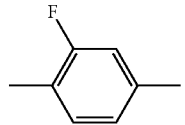

G(Cl) 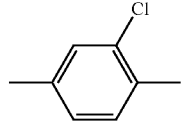

GI(Cl) 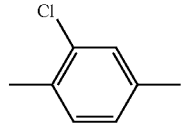

G(1) 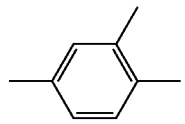

GI(1) 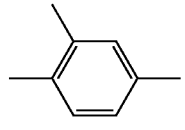

U 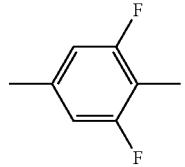

TABLE A-continued
| Ring Elements | | |
|---|---|---|
| Ul | 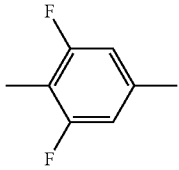 | |
| Y | 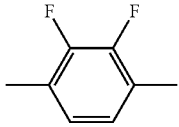 | |
| M | 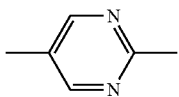 | |
| Ml | 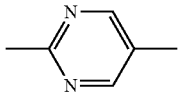 | |
| N | 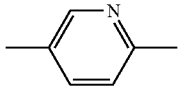 | |
| Nl | 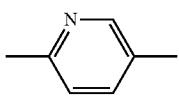 | |
| np | 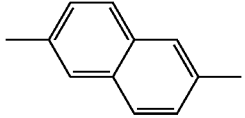 | |
| n3f | 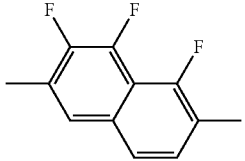 | |
| n3fl | 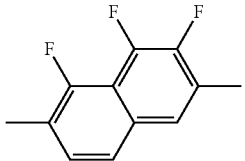 | |
| th | 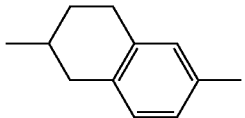 | |
| thl | 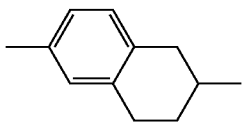 | |
| th2f | 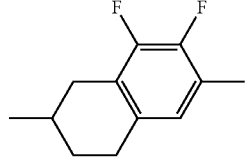 | |
| th2fl | 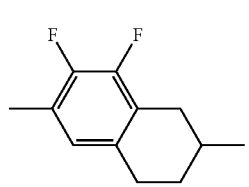 | |
| o2f | 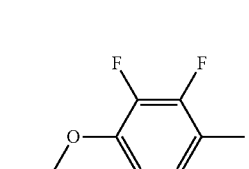 | |
| o2fl | 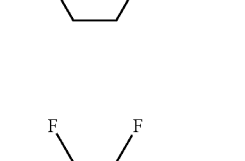 | |
| dh | 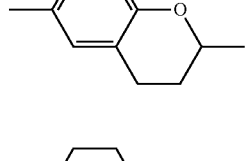 | |
| K | 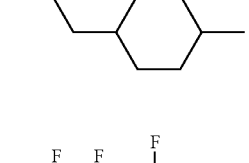 | |
| Kl | 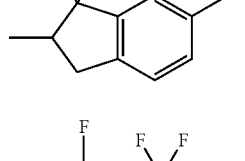 | |
| L | 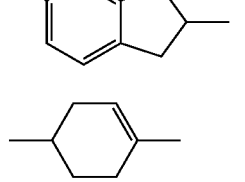 | |
| Ll | 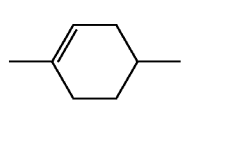 | |

TABLE A-continued

Ring Elements

F (difluoro cyclohexene ring structure)

FI (difluoro cyclohexene ring structure, alternate)

TABLE B

Linking Groups

| | | |
|---|---|---|
| n | $(-CH_2-)_n$ | "n" is an integer except 0 and 2 |
| E | $-CH_2-CH_2-$ | |
| V | $-CH=CH-$ | |
| T | $-C\equiv C-$ | |
| W | $-CF_2-CF_2-$ | |
| B | $-CF=CF-$ | |
| Z | $-CO-O-$ | ZI    $-O-CO-$ |
| X | $-CF=CH-$ | XI    $-CH=CF-$ |
| O | $-CH_2-O-$ | OI    $-O-CH_2-$ |
| Q | $-CF_2-O-$ | QI    $-O-CF_2-$ |

TABLE C

End Groups

| Left hand side, used alone or in combination with others | | Right hand side, used alone or in combination with others | |
|---|---|---|---|
| -n- | $C_nH_{2n+1}-$ | -n | $-C_nH_{2n+1}$ |
| -nO- | $C_nH_{2n+1}-O-$ | -On | $-O-C_nH_{2n+1}$ |
| -V- | $CH_2=CH-$ | -V | $-CH=CH_2$ |
| -nV- | $C_nH_{2n+1}-CH=CH-$ | -nV | $-C_nH_{2n}-CH=CH_2$ |
| -Vn- | $CH_2=CH-C_nH_{2n}-$ | -Vn | $-CH=CH-C_nH_{2n+1}$ |
| -nVm- | $C_nH_{2n+1}-CH=CH-C_mH_{2m}-$ | -nVm | $-C_nH_{2n}-CH=CH-C_mH_{2m+1}$ |
| -N- | $N\equiv C-$ | -N | $-C\equiv N$ |
| -S- | $S=C=N-$ | -S | $-N=C=S$ |
| -F- | $F-$ | -F | $-F$ |
| -CL- | $Cl-$ | -CL | $-Cl$ |
| -M- | $CFH_2-$ | -M | $-CFH_2$ |
| -D- | $CF_2H-$ | -D | $-CF_2H$ |
| -T- | $CF_3-$ | -T | $-CF_3$ |
| -MO- | $CFH_2O-$ | -OM | $-OCFH_2$ |
| -DO- | $CF_2HO-$ | -OD | $-OCF_2H$ |
| -TO- | $CF_3O-$ | -OT | $-OCF_3$ |
| -A- | $H-C\equiv C-$ | -A | $-C\equiv C-H$ |
| -nA- | $C_nH_{2n+1}-C\equiv C-$ | -An | $-C\equiv C-C_nH_{2n+1}$ |
| -NA- | $N\equiv C-C\equiv C-$ | -AN | $-C\equiv C-C\equiv N$ |

| Left hand side, used in combination with others only | | Right hand side, used in combination with others only | |
|---|---|---|---|
| -...n...- | $-C_nH_{2n}-$ | -...n... | $-C_nH_{2n}-$ |
| -...M...- | $-CFH-$ | -...M... | $-CFH-$ |
| -...D...- | $-CF_2-$ | -...D... | $-CF_2-$ |
| -...V...- | $-CH=CH-$ | -...V... | $-CH=CH-$ |
| -...Z...- | $-CO-O-$ | -...Z... | $-CO-O-$ |
| -...ZI...- | $-O-CO-$ | -...ZI... | $-O-CO-$ |
| -...K...- | $-CO-$ | -...K... | $-CO-$ |
| -...W...- | $-CF=CF-$ | -...W... | $-CF=CF-$ | wherein n and m each are integers and three points " . . . " indicate a space for other symbols of this table.

Preferably the liquid crystalline media according to the present invention comprise, besides the compound(s) of formula I one or more compounds selected from the group of compounds of the formulae of the following table.

TABLE D (Structure: F-substituted biphenyl—O—(CH$_2$)$_n$—O—biphenyl-F)

F-PGI-O-n-O-GP-F

TABLE D-continued
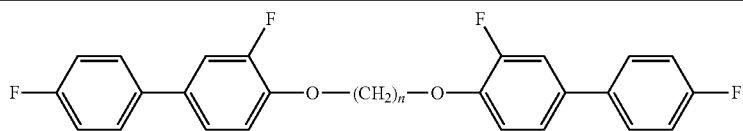
F-PG-O-n-O-GIP-F
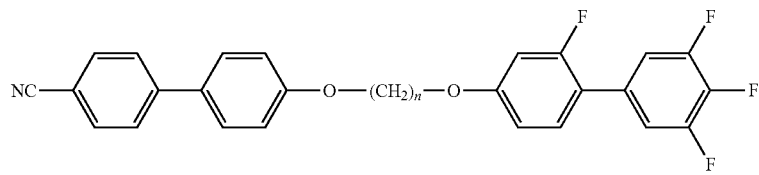
N-PP-O-n-O-GU-F
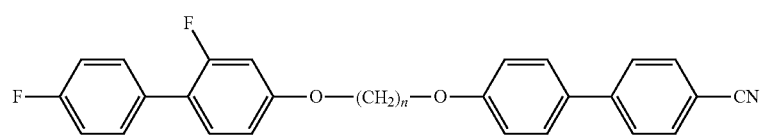
F-PGI-O-n-O-PP-N
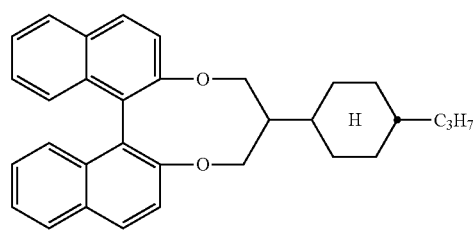
R-5011 respectively S-5011
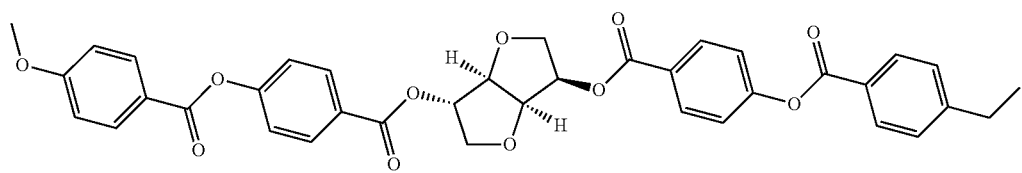 [SMILES: CCc1ccc(C(=O)Oc2ccc(C(=O)O[C@@H]3CO[C@H]4[C@@H]3OC[C@@H]4OC(=O)c3ccc(OC(=O)c4ccc(OC)cc4)cc3)cc2)cc1]
CD-1
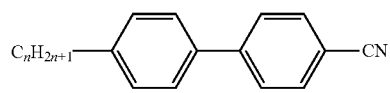
PP-n-N
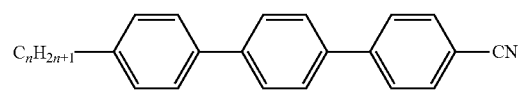
PPP-n-N
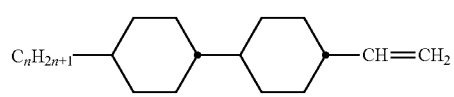
CC-n-V
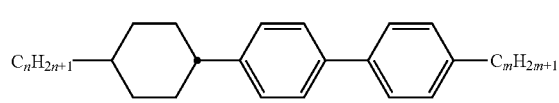
CPP-n-m TABLE D-continued
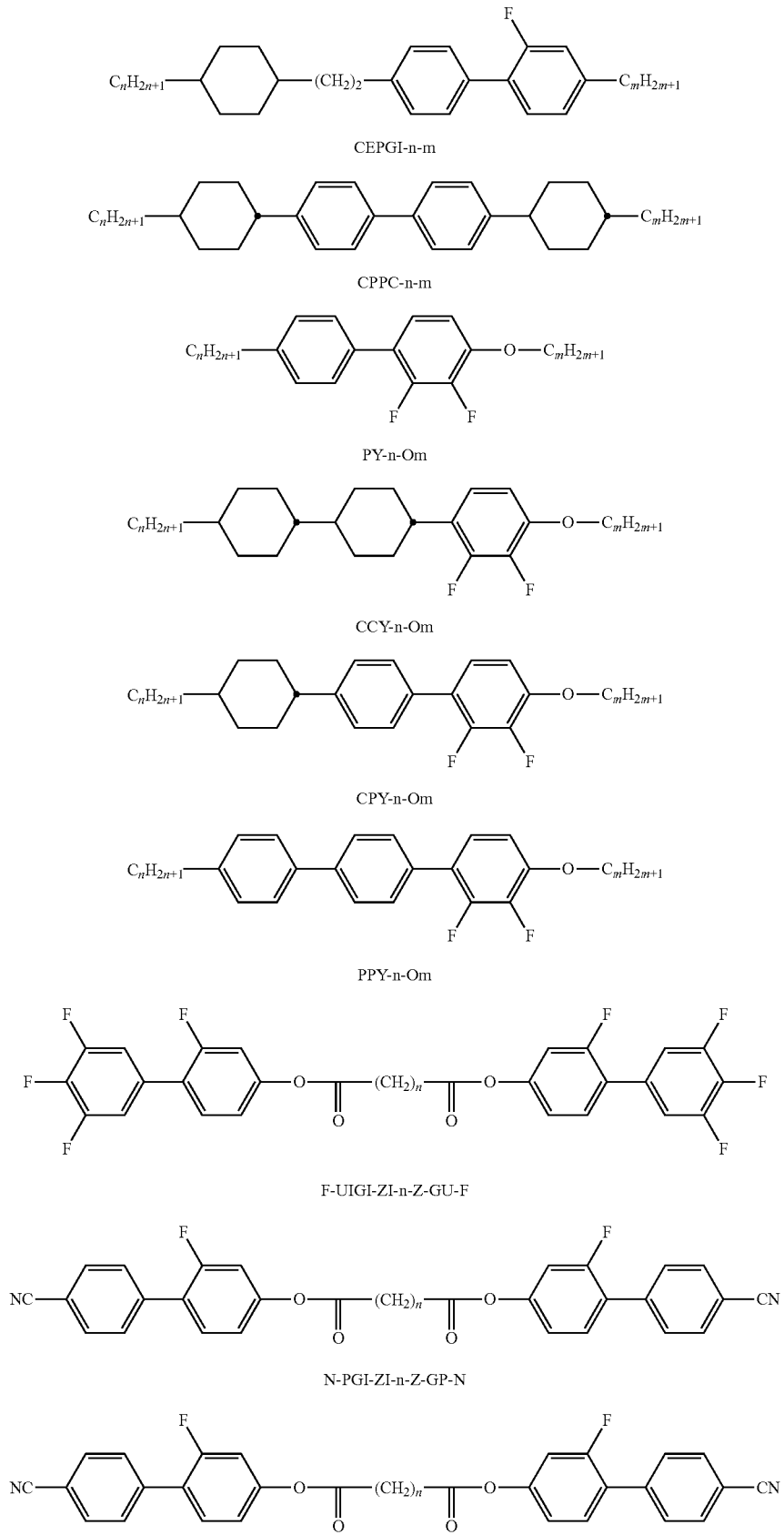

TABLE D-continued
F-PGI-ZI-n-Z-GP-F
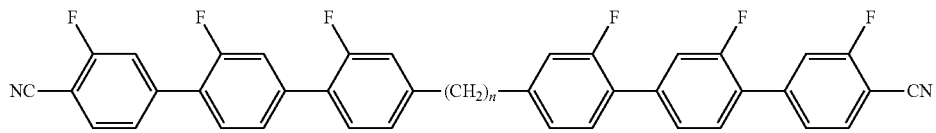
N-GIGIGI-n-GGG-N
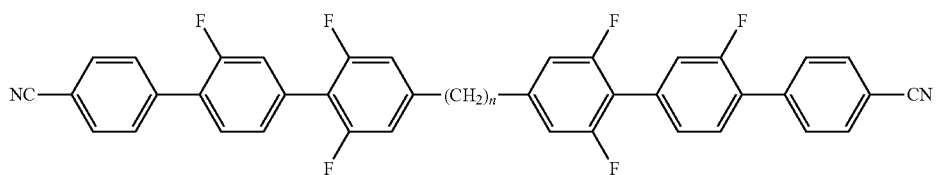
N-PGIUI-n-UGP-N
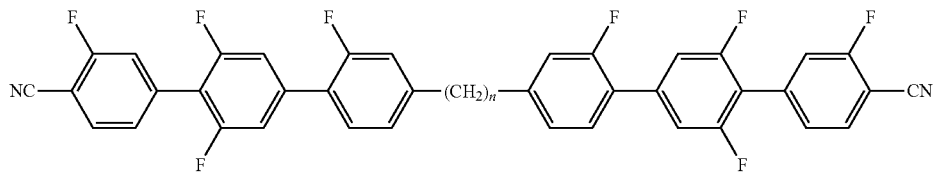
N-GIUIGI-n-GUG-N
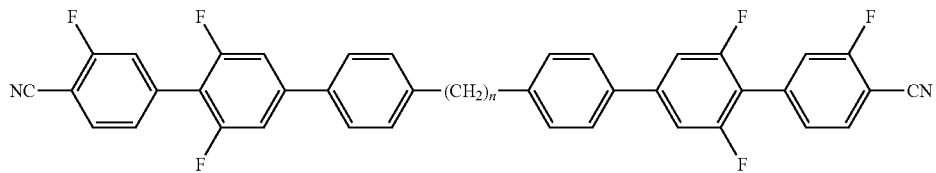
N-GIUIP-n-PUG-N
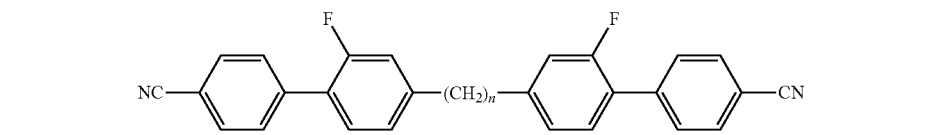
N-PGI-n-GP-N
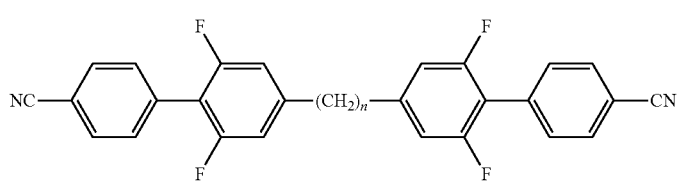
N-PUI-n-UP-N
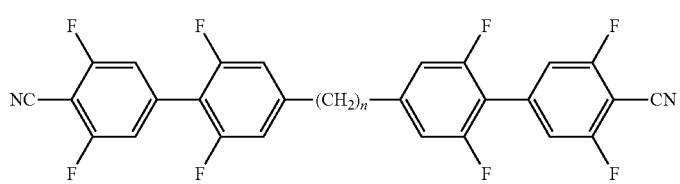
N-UIUI-n-UU-N TABLE D-continued
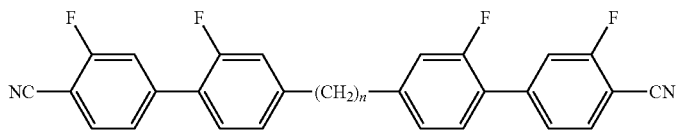
N-GIGI-n-GG-N
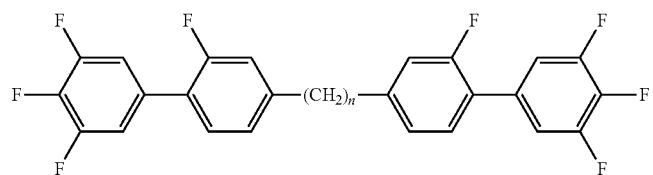
F-UIGI-n-GU-F
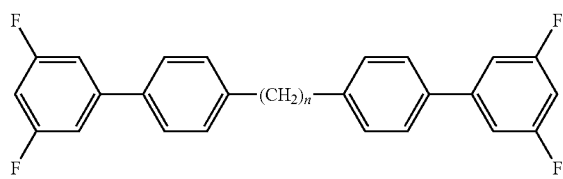
UIP-n-PU
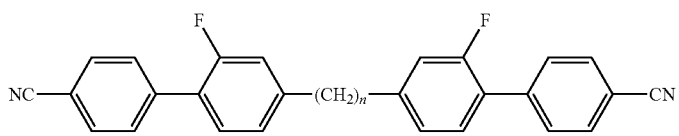
N-PGI-n-GP-N
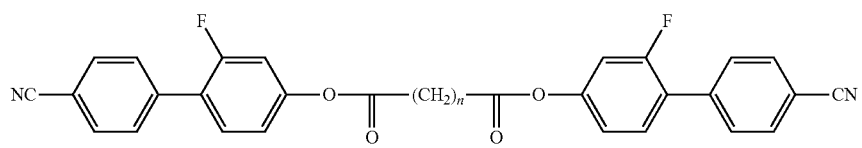
N-PGI-ZI-n-Z-GP-N
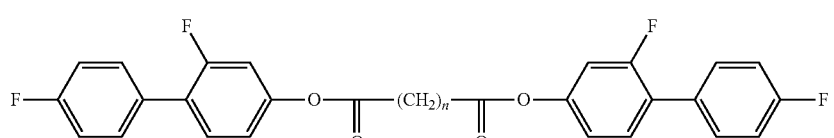
F-PGI-ZI-n-Z-GP-F
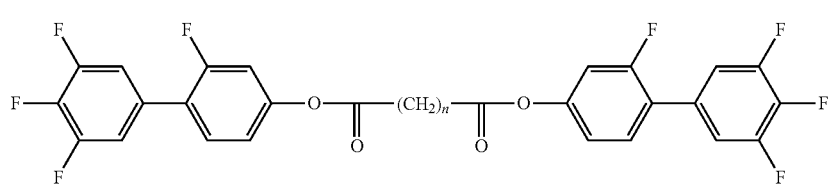
F-UIGI-ZI-n-Z-GU-F
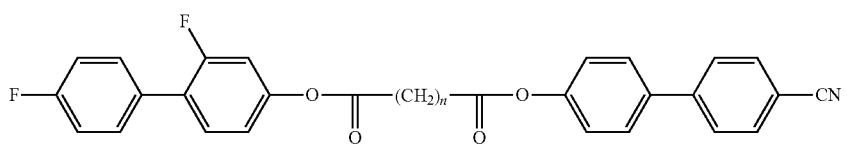
F-PGI-ZI-n-Z-PP-N TABLE D-continued
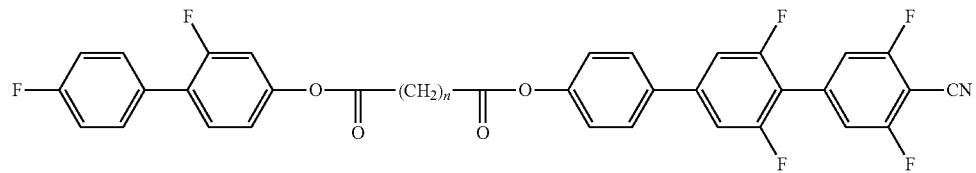
F-PGI-ZI-n-Z-PUU-N
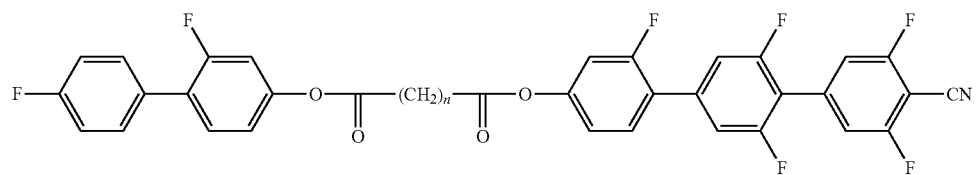
F-PGI-ZI-n-Z-GUU-N
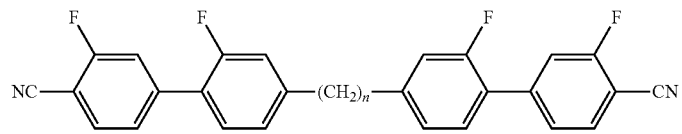
N-GIGI-n-GG-N
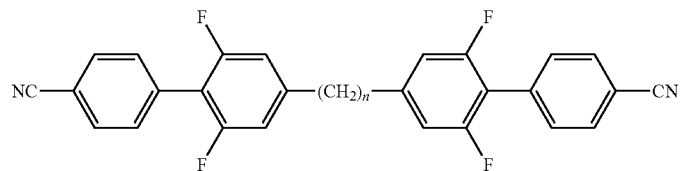
N-PUI-n-UP-N
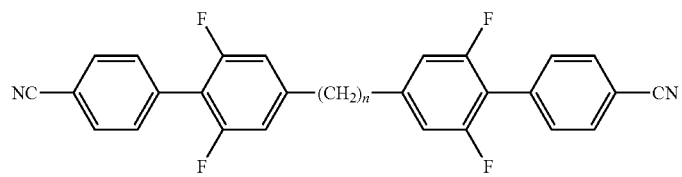
N-PUI-n-UP-N
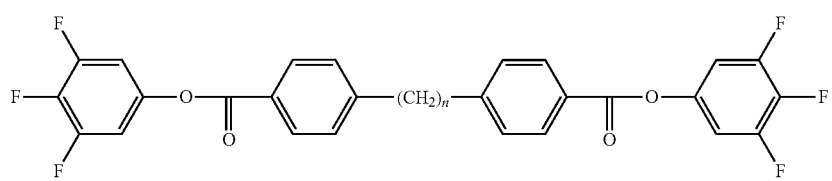
F-UIP-ZI-n-Z-PZU-F

MIXTURE EXAMPLES

Mixture Example 1

Mixture M1

| No. | Composition Compound Abbreviation | Conc./% |
|---|---|---|
| 1 | R-5011 | 2.0 |
| 2 | F-PGI-ZI-7-Z-PP-N | 29.0 |
| 3 | F-PGI-ZI-9-Z-PUU-N | 29.0 |
| 4 | N-PGI-ZI-7-Z-GP-N | 15.0 |
| 5 | F-UIZIP-7-PZU-F | 15.0 |
| 6 | CC-3-V | 5.0 |
| 7 | PPP-3-N | 5.0 |
| Σ | | 100.0 |

This mixture is particularly well suitable for the ULH-mode. It is investigated in antiparallel rubbed cells with polyimide orientation layers (e.g. AL3046) of appropriate cell gap, typically of 5.4 μm.

It has a range of the (chiral) nematic phase from 20° C. to 90° C. The cholesteric pitch (P) is 300 nm and the flexoelectric ratio (e/K) is 3.6 $V^{-1}$, both determined at a temperature of 35° C. The electric field has been varied from 0 V/μm to about 3.0 V/μm), leading to a tilt angle (Θ) increasing from 0° to about 27.5° over that range of electric fields.

It has a double response time for switching on ($T_{on}$) of about 1 ms at an electric field of 3.0 V/μm and of about 0.5 ms at an electric field of 3.5 V/μm. I.e. the sum of the response times ($\tau_{on,driven}+\tau_{off,driven}$) is below 1 ms at electrical fields of 3.0 V/μm and more. The sum of the response times for switching off by relaxation only ($\tau_{on,driven}+\tau_{off,driven}$) is below 5 ms at electrical fields of 3.0 V/μm and more. Here the double of the response time for switching on ($\tau_{on}$) is the decisive feature for several applications, as the mixture can be actively switched on as well as off.

The transmission under crossed polarizers of this mixture relative to an empty cell (for reference of 100%) has a maximum value switched at an electric field of 3.0 V/μm with 60%. At an electric field of 3.5 V/μm the relative transmission of this mixture is about 58%. Probably the maximum the transmission is limited by the insufficient alignment of the helix: some of the ULH is at an undesired angle to the direction required.

Mixture Example 2 and Comparative Mixture Example 2

Comparative Mixture Example 2

Mixture C2

| No. | Composition Compound Abbreviation | Conc./% |
|---|---|---|
| 1 | R-5011 | 2.0 |
| 2 | F-PGI-ZI-7-Z-PP-N | 29.6 |
| 3 | F-PGI-ZI-9-Z-PP-N | 19.4 |
| 4 | F-UIGI-ZI-9-Z-GP-N | 31.6 |
| 5 | F-PGI-ZI-9-Z-PUU-N | 17.4 |
| Σ | | 100.0 |

This comparative mixture is investigated as described under mixture example 1.

It has a range of the (chiral) nematic phase from below 20° C. to 97° C. The cholesteric pitch (P) is 310 nm and the flexoelectric ratio (e/K) is 4.41 $V^{-1}$, both determined at a temperature of 35° C. The total response time for switching driven both on and off ($\tau_{on,driven}+\tau_{off,driven}$) is 3.9 ms at an electric field of 3.33 V/μm.

Mixture Example 2

Mixture M2

10% of the following mixture (mixture N1),

| No. | Composition Compound Abbreviation | Conc./% |
|---|---|---|
| 1 | PY-3-O2 | 14.5 |
| 2 | CCY-3-O2 | 3.5 |
| 3 | CCY-4-O2 | 13.5 |
| 4 | CPY-2-O2 | 11.0 |
| 5 | CPY-3-O2 | 11.0 |
| 6 | CC-3-V | 29.0 |
| 7 | CPP-3-2 | 13.5 |
| 5 | CPPC-3-3 | 4.0 |
| Σ | | 100.0 | which has the following physical properties:

$T_{N,I}$=103.6 C;

Δn=0.124 @25 C;

Δε=−2.8 @25 C; and $\gamma_1$=114 mPa·s, are added to 90% of the mixture C2 of the respective comparative example.

The resultant mixture (M2) is investigated as described under mixture example 1. It has a range of the (chiral) nematic phase from 2° C. to 102° C. The cholesteric pitch (P) is 363 nm and the flexoelectric ratio (e/K) is 3.21 $V^{-1}$, both determined at a temperature of 35° C. The total response time ($\tau_{on,driven}+\tau_{off,driven}$) is 2 ms and the total response time ($\tau_{on,driven}+\tau_{off,driven}$) is 6 ms ($\tau_{on,driven}$=1 ms and $\tau_{off,driven}$=5.2 ms), all at an electric field of 3.33 V/μm.

Mixture Example 3 and Comparative Mixture Example 3

Comparative Mixture Example 3

Mixture C3

| No. | Composition Abbreviation | Conc./% |
|---|---|---|
| 1 | R-5011 | 1.8 |
| 2 | N-GIGI-ZI-9-Z-GG-N | 8.5 |
| 3 | N-PGI-ZI-9-Z-GP-N | 8.5 |
| 4 | F-PGI-ZI-9-Z-GP-F | 16.8 |
| 5 | F-UIGI-ZI-9-Z-GP-N | 22.6 |
| 6 | F-PGI-ZI-9-Z-PUU-N | 8.4 |
| 7 | N-GIGI-9-GG-N | 25.1 |
| 8 | N-UIUI-9-UU-N | 8.4 |
| Σ | | 100.0 |

This comparative mixture is investigated as described under mixture examples 1 and 2.

It has a clearing point from the (chiral) nematic phase of 64° C. The cholesteric pitch (P) is 348 nm and the flexoelectric ratio (e/K) is 5.2 $V^{-1}$, both determined at a temperature of 35° C. The total response time ($\tau_{on,driven}+\tau_{off,driven}$) is 8.4 ms at an electric field of 3.33 V/µm.

Mixture Example 3

Mixture M3

10% of the following binary mixture (mixture N2),

| No. | Composition Abbreviation | Conc./% |
|---|---|---|
| 1 | PP-5-N | 50.0 |
| 2 | PPP-5-N | 50.0 |
| Σ | | 100.0 | are added to 90% of the mixture C3 of the respective comparative example.

The resultant mixture (M3) is investigated as described under mixture examples 1 and 2. It has a clearing point from the (chiral) nematic phase of 70° C. The cholesteric pitch (P) is 283 nm and the flexoelectric ratio (e/K) is 3.7 $V^{-1}$, both determined at a temperature of 35° C. The total response time ($\tau_{on,driven}+\tau_{off,driven}$) is 5.5 m sat an electric field of 3.33 V/µm.

Mixture Example 4

Mixture M4

| No. | Composition Abbreviation | Conc./% |
|---|---|---|
| 1 | R-5011 | 2.0 |
| 2 | N-PGI-ZI-9-Z-PUU-N | 25.0 |
| 3 | N-PGI-ZI-7-Z-GP-N | 9.0 |
| 4 | N-PGI-ZI-9-Z-GP-N | 15.0 |
| 5 | F-GIP-ZI-9-Z-PG-F | 10.0 |
| 6 | F-UIGI-ZI-9-Z-GP-N | 15.0 |
| 7 | TO-GIGI-ZI-9-Z-GP-N | 9.0 |
| 8 | CC-3-V | 7.5 |
| 9 | PYP-2-3 | 7.5 |
| Σ | | 100.0 |

This mixture is investigated as described under mixture example 1.

Mixture Example 5

Mixture M5

| No. | Composition Abbreviation | Conc./% |
|---|---|---|
| 1 | R-5011 | 2.0 |
| 2 | F-PGI-O-9-O-GP-F | 16.0 |
| 3 | F-PG-O-9-O-PP-N | 21.4 |
| 4 | F-PI-ZI-7-Z-PP-N | 12.7 |
| 5 | F-PI-ZI-9-Z-PP-N | 10.4 |
| 6 | N-GIGI-ZI-9-Z-GG-N | 8.0 |
| 7 | F-UIGI-ZI-9-Z-GP-N | 9.5 |
| 8 | CP-3-N | 1.4 |
| 9 | CY-3-O2 | 1.3 |
| 10 | PGIGI3-F | 2.0 |
| 11 | CP-3-O1 | 2.2 |
| 12 | PTP-1-O2 | 0.7 |
| 13 | CCG-V-F | 1.0 |
| 14 | PPTUI-3-2 | 4.0 |
| 15 | PPTUI-3-4 | 7.4 |
| Σ | | 100.0 |

This mixture is investigated as described under mixture example 1.

Mixture Example 6

Mixture M6

| No. | Composition Abbreviation | Conc./% |
|---|---|---|
| 1 | R-5011 | 2.0 |
| 2 | N-PGI-ZI-9-Z-PUU-N | 25.0 |
| 3 | N-PGI-ZI-9-Z-GP-N | 15.0 |
| 4 | N-PGI-ZI-7-Z-GP-N | 9.0 |
| 5 | F-GIP-ZI-9-Z-PG-F | 10.0 |
| 6 | F-UIGI-ZI-9-Z-GP-N | 15.0 |
| 7 | TO-GIGI-ZI-9-Z-GP-N | 9.0 |
| 8 | CC-3-V | 5.0 |
| 9 | PYP-2-3 | 5.0 |
| Σ | | 100.0 |

This mixture is investigated as described under mixture example 1.

BRIEF DESCRIPTION OF DRAWINGS

FIG. 1: Schematic illustration of the "2Θmode"
FIG. 2: Schematic illustration of the "Θmode"

The invention claimed is:
1. A mesogenic medium comprising
a first component, component A, consisting of bimesogenic compounds selected from the group consisting of compounds of formulae A-I, A-II and A-III, wherein at least one compound of formula A-II and at least one compound of formula A-III are present in component A,

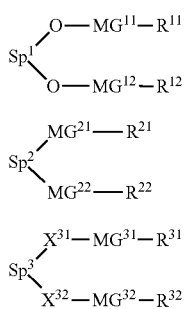

wherein
$R^{11}$ and $R^{12}$,
$R^{21}$ and $R^{22}$ and
$R^{31}$ and $R^{32}$ are each independently H, F, Cl, CN, NCS or a straight-chain or branched alkyl group with 1 to 25 C atoms which is unsubstituted, or mono- or polysubstituted by halogen or CN, in which optionally one or more non-adjacent CH$_2$ groups are replaced, in each occurrence independently from one another, by —O—, —S—, —NH—, —N(CH$_3$)—, —CO—, —COO—, —OCO—, —O—CO—O—, —S—CO—, —CO—S—, —CH=CH—, —CH=CF—, —CF=CF— or —C≡C— in such a manner that oxygen atoms are not linked directly to one another,
MG$^{11}$ and MG$^{12}$,
MG$^{21}$ and MG$^{22}$ and
MG$^{31}$ and MG$^{32}$ are each independently a mesogenic group,
Sp$^1$, Sp$^2$ and Sp$^3$ are each independently a spacer group comprising 5 to 40 C atoms, wherein one or more non-adjacent CH$_2$ groups, with the exception of the CH$_2$ groups of Sp$^1$ linked to O-MG$^{11}$ and/or O-MG$^{12}$, of Sp$^2$ linked to MG$^{21}$ and/or MG$^{22}$ and of Sp$^3$ linked to X$^{31}$ and X$^{32}$, are optionally replaced by —O—, —S—, —NH—, —N(CH$_3$)—, —CO—, —O—CO—, —S—CO—, —O—COO—, —CO—S—, —CO—O—, —CH(halogen)-, —CH(CN)—, —CH=CH— or —C≡C—, in such a way that no two O-atoms are adjacent to one another, no two —CH=CH— groups are adjacent to each other, and no two groups selected from the group consisting of —O—CO—, —S—CO—, —O—COO—, —CO—S—, —CO—O— and —CH=CH— are adjacent to each other, and
X$^{31}$ and X$^{32}$ are independently from one another a linking group selected from the group consisting of —CO—O—, —O—CO—, —CH=CH—, —C≡C— and —S—, and wherein alternatively one of X$^{31}$ and X$^{32}$ is —O— or a single bond, or one of X$^{31}$ and X$^{32}$ is —O— and the other one is a single bond,
wherein the medium comprises component A in a concentration of 60 to 90% by weight of the medium,
a second component, component B, consisting of one or more nematogenic compounds, which are of formulae B-I to B-III

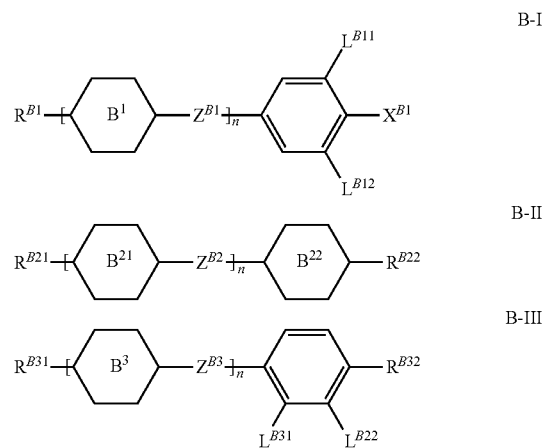

wherein
$L^{B11}$, $L^{B12}$, $L^{B31}$
and $L^{B32}$ are independently H or F,
$B^{B1}$, $R^{B21}$, $R^{B22}$,
$R^{B31}$ and $R^{B32}$ are each independently H, F, Cl, CN, NCS or a straight-chain or branched alkyl group with 1 to 25 C atoms which is optionally unsubstituted, mono- or polysubstituted by halogen or CN, in which optionally one or more non-adjacent CH$_2$ groups are replaced, in each occurrence independently from one another, by —O—, —S—, —NH—, —N(CH$_3$)—, —CO—, —COO—, —OCO—, —O—CO—O—, —S—CO—, —CO—S—, —CH=CH—, —CH=CF—, —CF=CF— or —C≡C— in such a manner that oxygen atoms are not linked directly to one another,
X$^{B1}$ is F, Cl, CN or NCS,
$Z^{B1}$, $Z^{B2}$ and $Z^{B3}$ are in each occurrence independently —CH$_2$—CH$_2$—, —CO—O—, —O—CO—, —CF$_2$—O—, —O—CF$_2$—, —CH=CH— or a single bond,

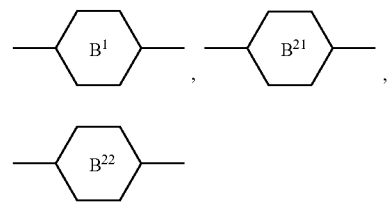

and

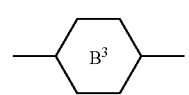

are in each occurrence independently

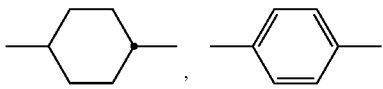

or

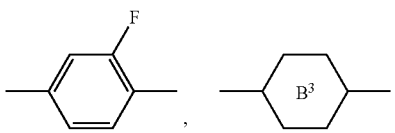

or alternatively one or more of are

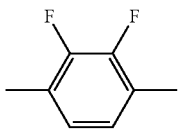

and
n is 1, 2 or 3, and a third component, component C, consisting of one or more chiral molecules, which are of formulae C-I to C-III,

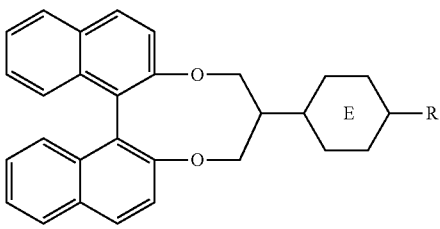

C-I

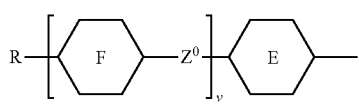

C-II

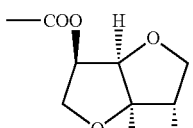

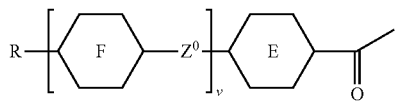

C-III

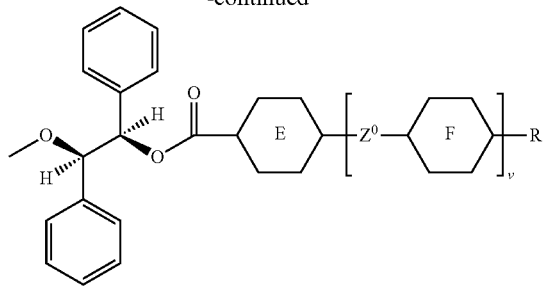

including the respective (S,S) enantiomers,
wherein
E and F are each independently 1,4-phenylene or trans-1,4-cyclohexylene,
v is 0 or 1,
$Z^0$ is —COO—, —OCO—, —CH$_2$CH$_2$— or a single bond, and
R is alkyl, alkoxy or alkanoyl with 1 to 12 C atoms.

2. The mesogenic medium according to claim 1, comprising one or more compounds of formulae A-I to A-III, wherein MG$^{11}$ and MG$^{12}$, MG$^{21}$ and MG$^{22}$ and MG$^{31}$ and MG$^{32}$ are independently of each other of formula II $$-A^1-(Z^1-A^2)_m- \qquad \text{II}$$

wherein
$Z^1$ is —COO—, —OCO—,—O—CO—O—, —OCH$_2$—, —CH$_2$O—, —CH$_2$CH$_2$—, —(CH$_2$)$_4$—, —CF$_2$CF$_2$—, —CH=CH—, —CF=CF—, —CH=CH—COO—, —OCO—CH=CH—, —C≡C— or a single bond,
$A^1$ and $A^2$ are each independently in each occurrence 1,4-phenylene, in which one or more CH groups are optionally replaced by N, trans- 1,4-cyclohexylene, in which one or two non-adjacent CH$_2$ groups are optionally replaced by O and/or S, 1,4—cyclohexenylene, 1,4-bicyclo-(2,2,2)-octylene, piperidine-1,4-diyl, naphthalene-2,6-diyl, decahydro-naphthalene-2,6-diyl, 1,2,3,4-tetrahydro-naphthalene-2,6-diyl, cyclobutane-1,3-diyl, spiro[3.3]heptane-2,6-diyl or dispiro[3.1.3.1]decane-2,8-diyl, wherein the preceding groups are each unsubstituted, or mono-, di-, tri- or tetrasubstituted with F, Cl, CN or alkyl, alkoxy, alkylcarbonyl or alkoxycarbonyl groups with 1 to 7 C atoms, wherein one or more H atoms may be substituted by F or Cl, and
m is 0, 1, 2 or 3.

3. The mesogenic medium according to claim 1, comprising one or more compounds selected from formulae A-I to A-III, wherein MG$^{11}$ and MG$^{12}$, MG$^{21}$ and MG$^{22}$ and MG$^{31}$ and MG$^{32}$ are each independently one of the following formulae or their mirror images

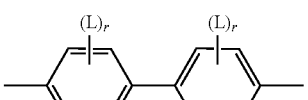

IIa

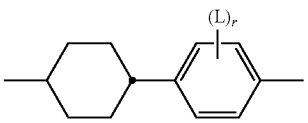

IIb

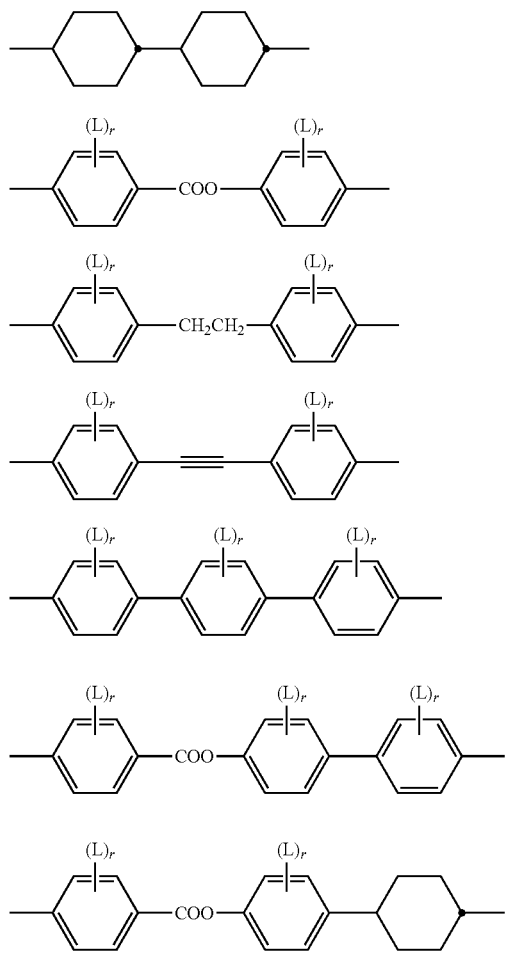
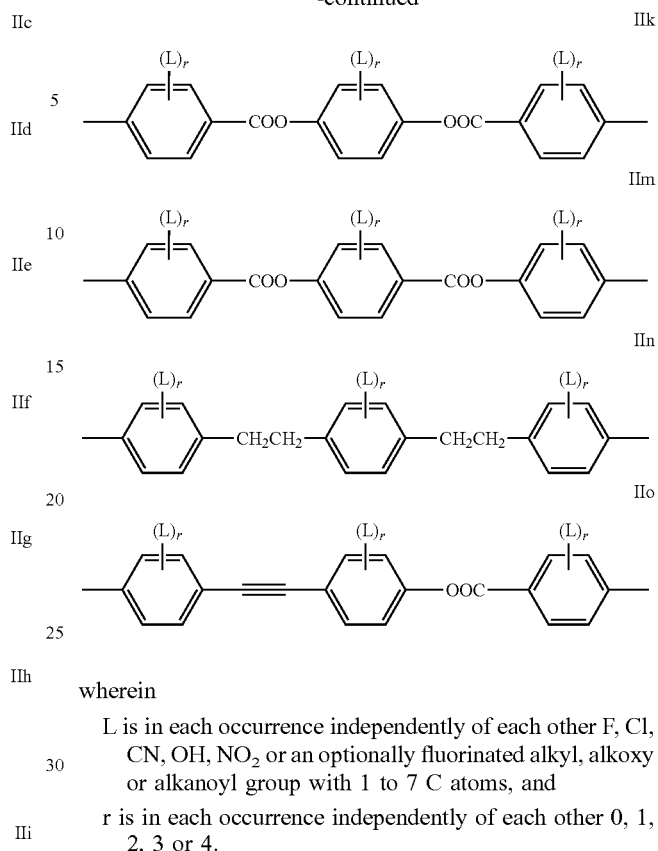

wherein
L is in each occurrence independently of each other F, Cl, CN, OH, NO₂ or an optionally fluorinated alkyl, alkoxy or alkanoyl group with 1 to 7 C atoms, and
r is in each occurrence independently of each other 0, 1, 2, 3 or 4.

4. The mesogenic medium according to claim 1, which comprises one or more compounds of formula A-I.

5. The mesogenic medium according to claim 1, which comprises one or more compounds of formula A-II, which are of formulae A-II-1 to A-II-4

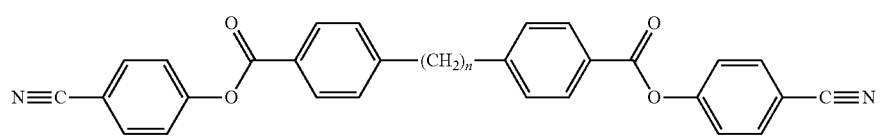

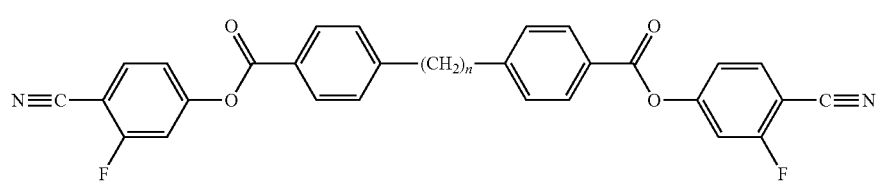

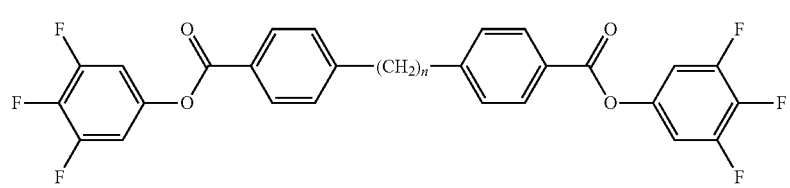

-continued
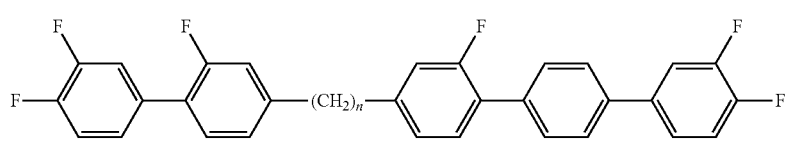
A-II-4
wherein n is 1 to 15.
6. The mesogenic medium according to claim 1, which comprises one or more compounds of formula A-III, which are of formulae A-III-1 to A-III-11
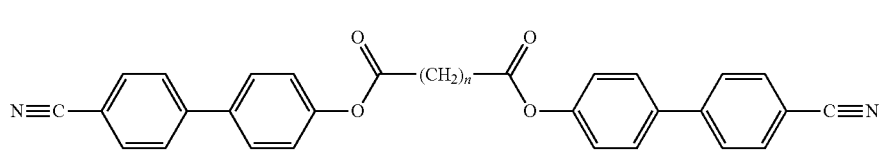
A-III-1
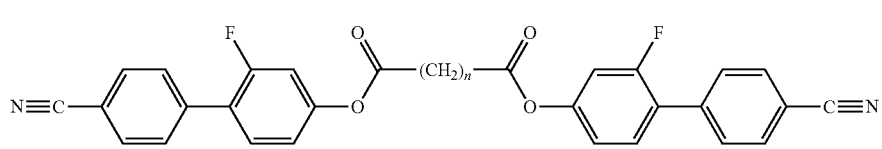
A-III-2
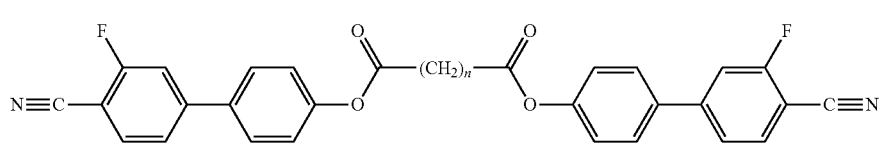
A-III-3
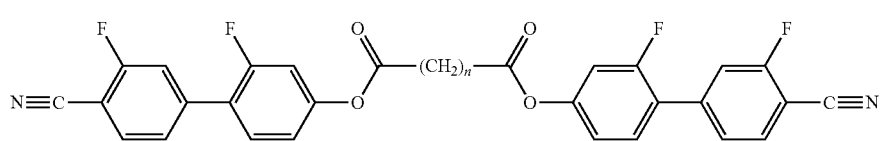
A-III-4
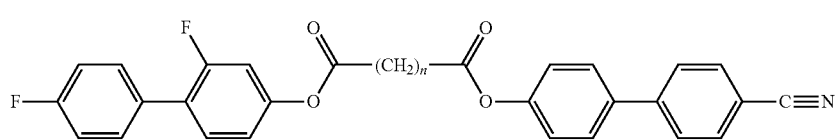
A-III-5
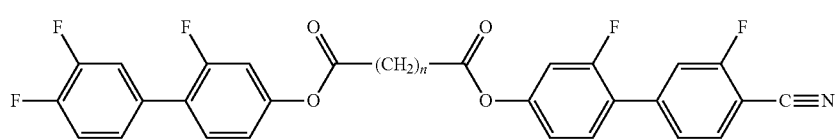
A-III-6
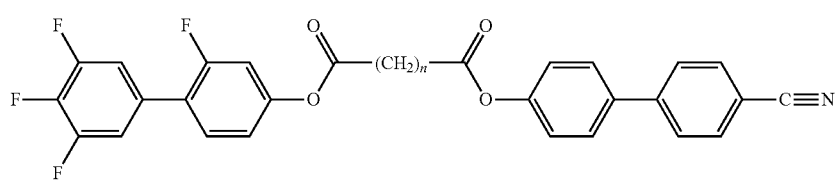
A-III-7
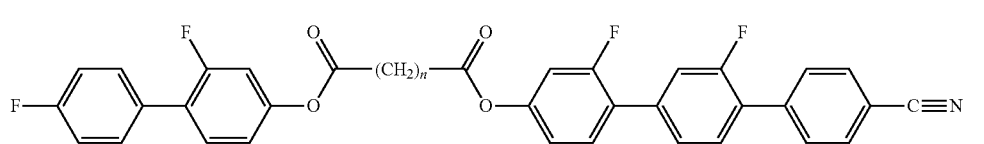
A-III-8

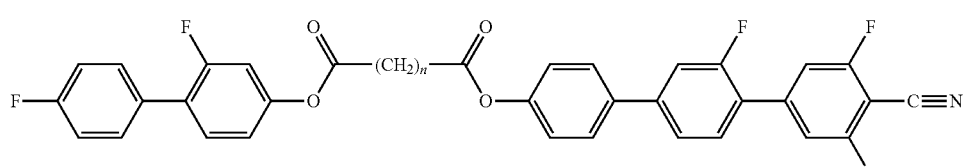

A-III-9

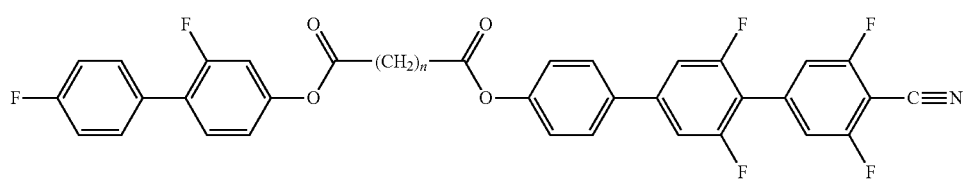

A-III-10

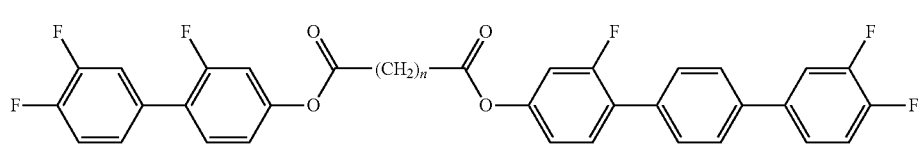

A-III-11 wherein n is 1 to 15.

7. The mesogenic medium according to claim 1, which comprises one or more compounds of formula B-I.

8. The mesogenic medium according to claim 1, which comprises one or more compounds of formula B-II.

9. The mesogenic medium according to claim 1, which comprises one or more compounds of formula B-III.

10. The mesogenic medium according to claim 1, which comprises component B, consisting of compounds selected from the group consisting of compound of formulae B-I, B-II and B-III, which are present in a concentration 40% or less by weight based on the medium as a whole.

11. The mesogenic medium according to claim 1, which exhibits first and second nematic phases.

12. A liquid crystal device comprising a mesogenic medium according to claim 1.

13. The liquid crystal device according to claim 12, which is a flexoelectric device.

14. A liquid crystal device according to claim 12, which comprises two plane parallel electrodes, the inner surfaces of which exhibit planar, anti-parallel alignment conditions.

15. The mesogenic medium according to claim 1, wherein $X^{B1}$ is CN.

16. The mesogenic medium according to claim 1, wherein $X^{31}$ and $X^{32}$ are independently from one another a linking group selected from the group consisting of —CH=CH—, —C≡C— and —S—.

17. The mesogenic medium according to claim 1, wherein the medium comprises component A in a concentration of 70 to 90% by weight of the medium.

18. The mesogenic medium according to claim 1, wherein $X^{31}$ and $X^{32}$ are independently from one another a linking group selected from the group consisting of —CO—O—, —O—CO—, —CH=CH—, —C≡C— and —S—.

19. The mesogenic medium according to claim 1, which contains the compound C-I in component C.

20. The mesogenic medium according to claim 1, which contains at least one of the following compounds of formulae A-II

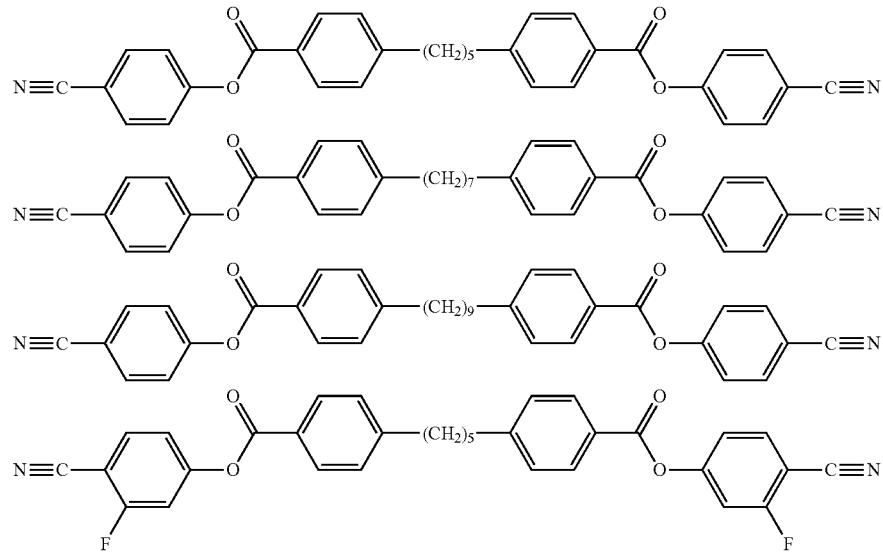

-continued
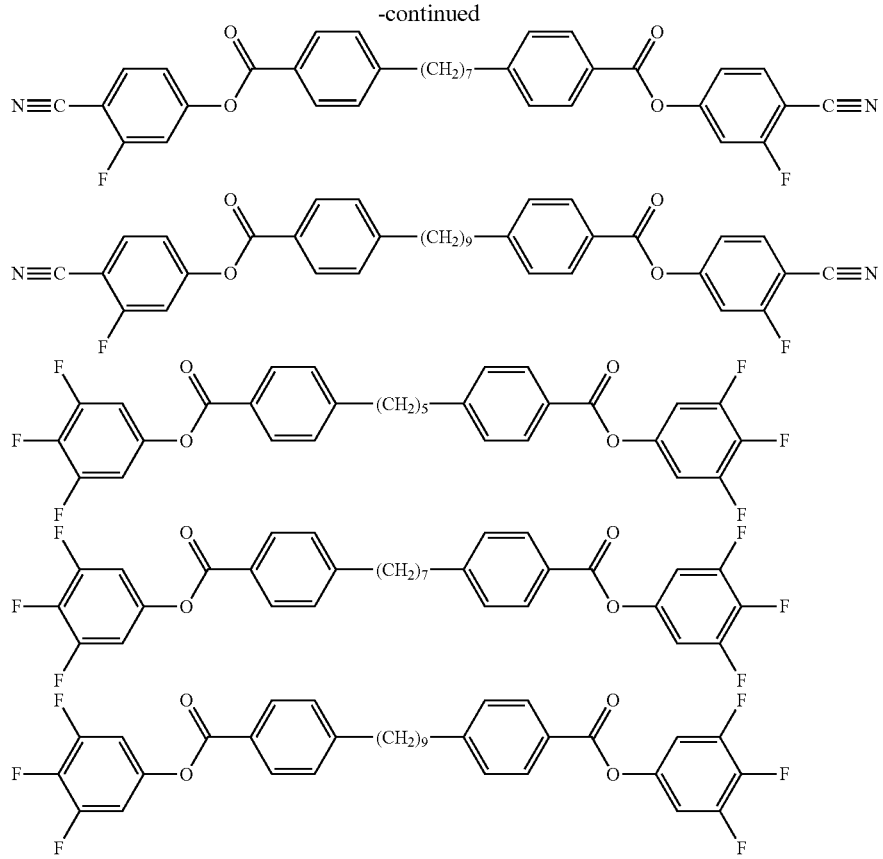
and at least one of the following compounds of formulae A-III
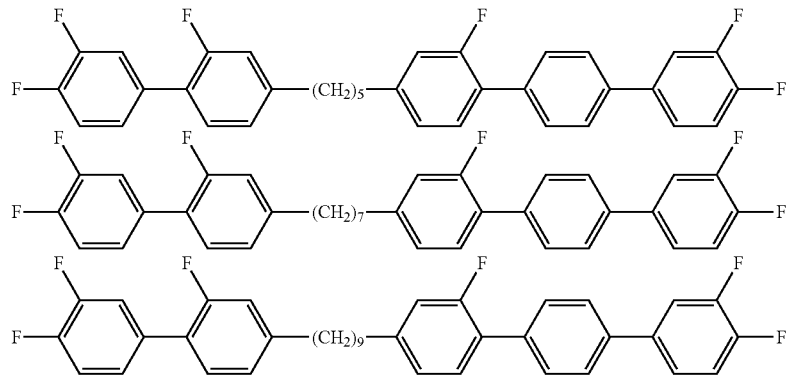
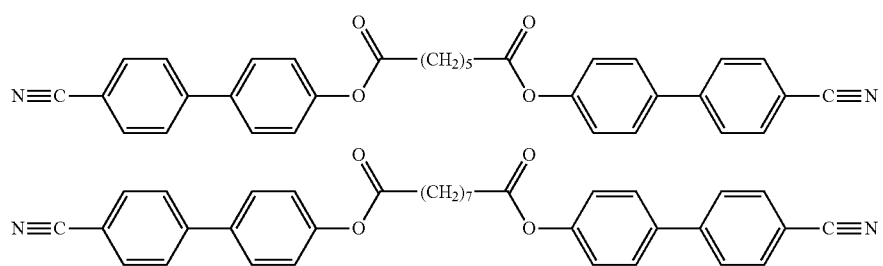

-continued
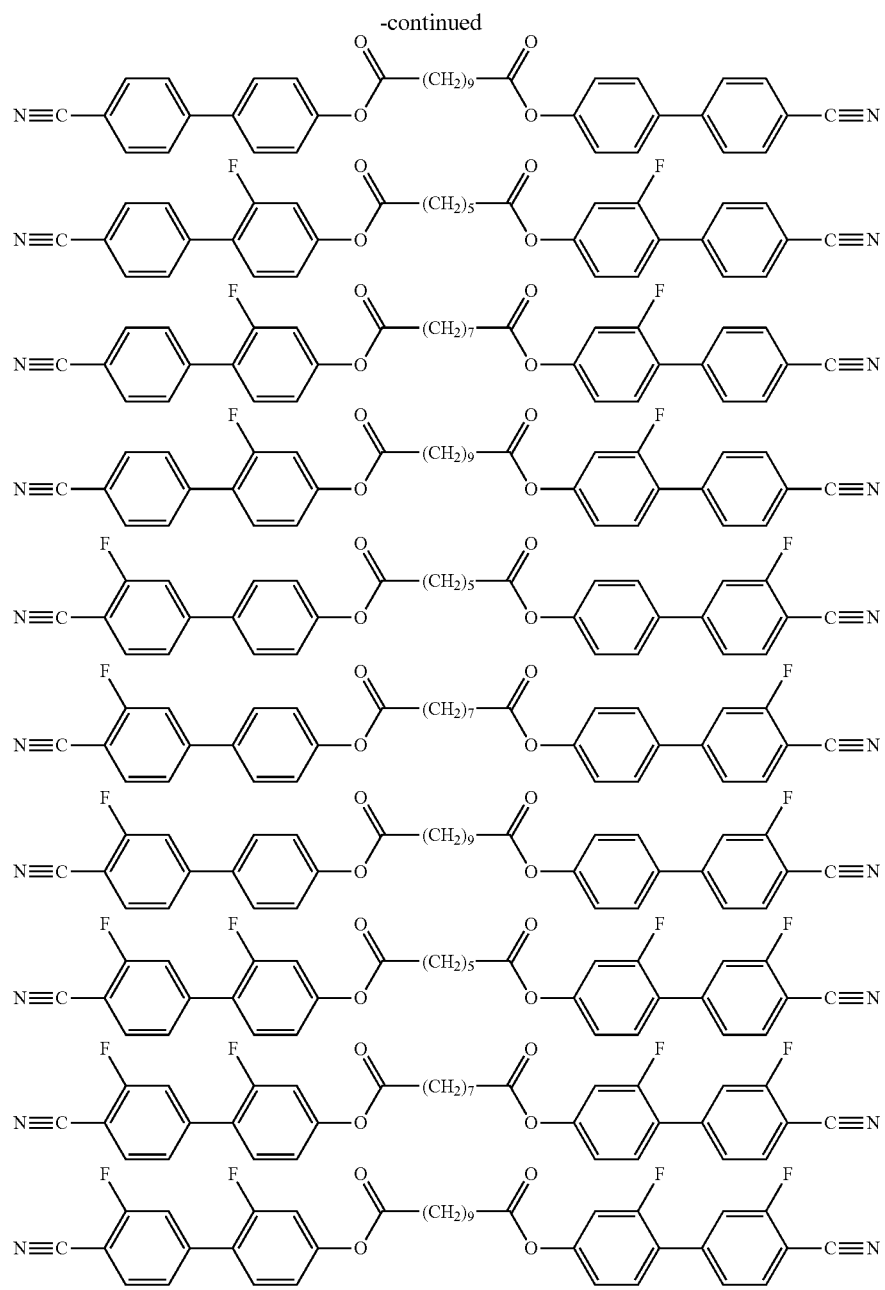
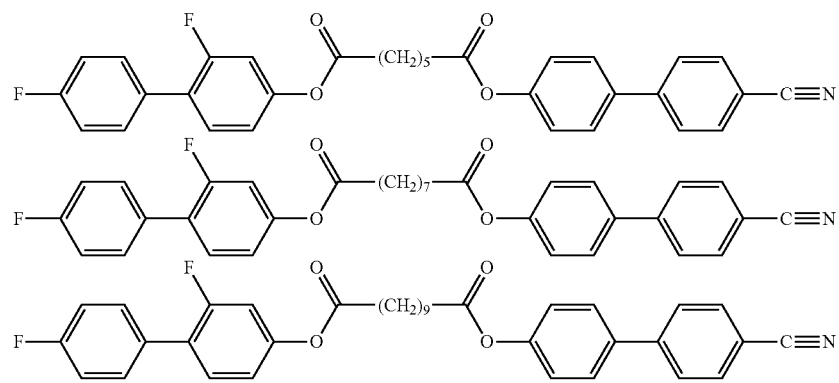

-continued
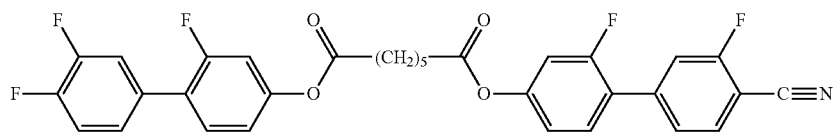
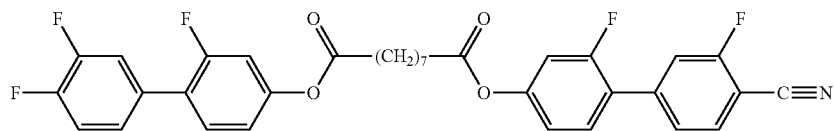
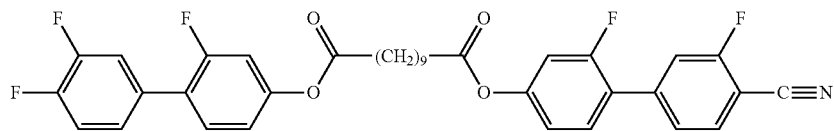
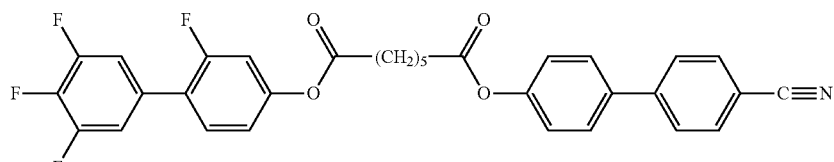
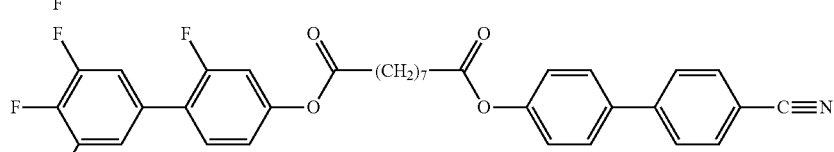
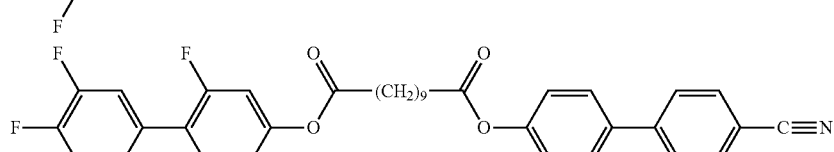
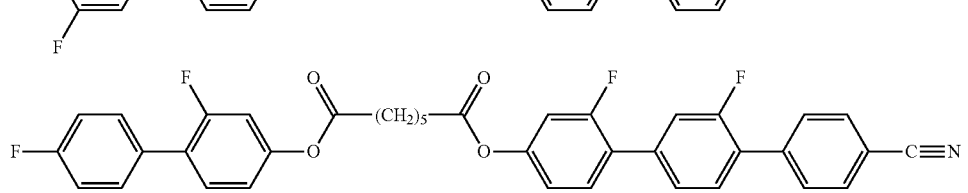
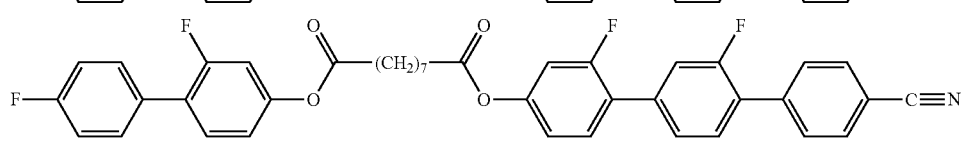
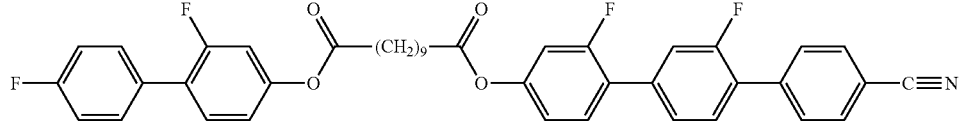
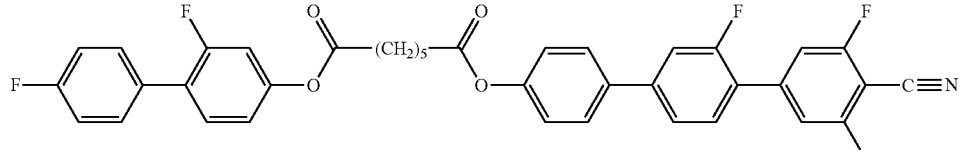
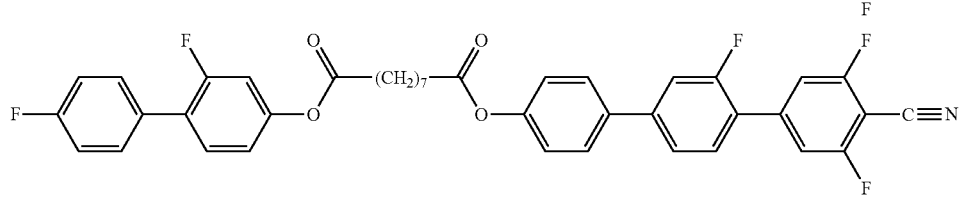

-continued
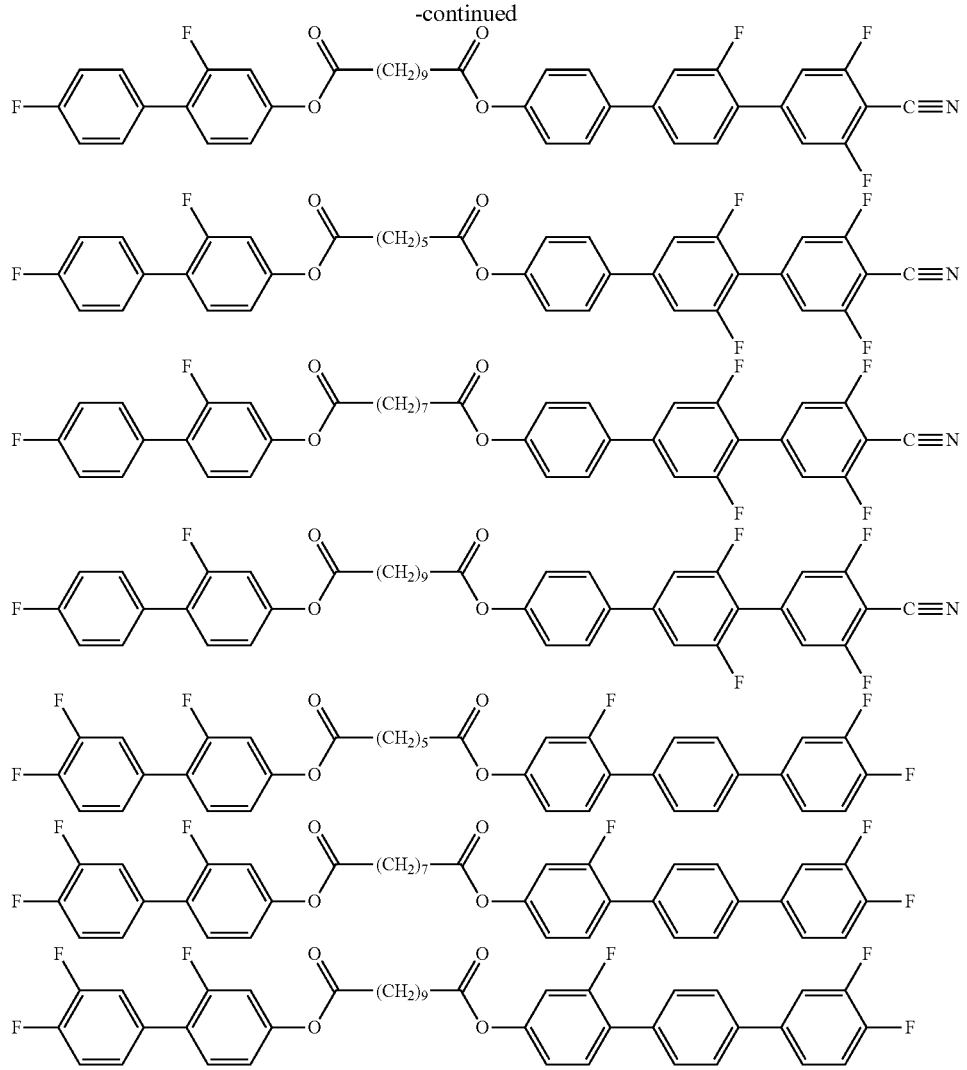
* * * * *